(12) United States Patent   (10) Patent No.: US 7,409,472 B2
Iwatani et al.   (45) Date of Patent: Aug. 5, 2008

(54) DEVICE CONTROLLER AND INPUT/OUTPUT SYSTEM

(75) Inventors: Sawao Iwatani, Kawasaki (JP); Sanae Kamakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 10/914,335

(22) Filed: Aug. 10, 2004

(65) Prior Publication Data

US 2005/0021878 A1  Jan. 27, 2005

Related U.S. Application Data

(60) Division of application No. 09/930,158, filed on Aug. 16, 2001, now Pat. No. 6,792,482, which is a continuation of application No. PCT/JP99/03366, filed on Jun. 24, 1999.

(51) Int. Cl.
*G06F 3/00* (2006.01)
*G06F 9/26* (2006.01)

(52) U.S. Cl. .......................... 710/36; 711/204; 711/217

(58) Field of Classification Search .................. 710/36; 711/204, 217
See application file for complete search history.

(56) References Cited

U.S. PATENT DOCUMENTS

| 5,231,485 | A |   | 7/1993  | Israelsen et al. |         |
|-----------|---|---|---------|------------------|---------|
| 5,253,351 | A | * | 10/1993 | Yamamoto et al.  | 711/118 |
| 5,341,493 | A |   | 8/1994  | Yanai et al.     |         |
| 5,640,596 | A |   | 6/1997  | Takamoto et al.  |         |

(Continued)

FOREIGN PATENT DOCUMENTS

JP    59005359    1/1984

(Continued)

OTHER PUBLICATIONS

"Disk Array System", Mitsuhiko Yashiro et al., Fujitsu .50, 1, pp. 6-13 (Jan. 1999) including Abstract.

*Primary Examiner*—Tonia L. M. Dollinger
*Assistant Examiner*—David E Martinez
(74) *Attorney, Agent, or Firm*—Staas & Halsey LLP

(57) ABSTRACT

An input/output request sent from a host is once cued through a channel adapter and is then transferred to a resource manager and is cued, and the cuing is distributed. Even if sequential input/output requests of the host are separated through a distribution processing to a plurality of paths, they are recognized on the device controller side and a countermeasure is taken. In the case in which a path from the host to the device controller is caused to be redundant into an operation system and a standby system, a path confirmation command is issued to the device drivers of a standby system path in order to confirm that the standby system path is normally operated or not. When the issuance of the input/output request is transferred to another path, a command for releasing the reserve of a transfer path is issued from another path. In the case in which one path of a device driver of an operation system causes a fault, switching to the use of the path of the device driver of the standby system is carried out to implement a load balance through the same processing distribution driver as that obtained before the generation of the fault. Even if a difference in a channel transfer rate is made between the host and the device controller, a higher transfer rate can be maintained.

5 Claims, 49 Drawing Sheets

U.S. PATENT DOCUMENTS

| | | |
|---|---|---|
| 5,694,619 A | 12/1997 | Konno |
| 5,761,531 A | 6/1998 | Ohmura et al. |
| 5,901,334 A | 5/1999 | Banks et al. |
| 6,421,711 B1 | 7/2002 | Blumenau et al. |
| 6,425,023 B1 | 7/2002 | Batchelor et al. |
| 6,453,356 B1 | 9/2002 | Sheard et al. |

FOREIGN PATENT DOCUMENTS

| | | |
|---|---|---|
| JP | 60183660 | 9/1985 |
| JP | 62-256161 | 11/1987 |
| JP | 2-83757 | 3/1990 |
| JP | 03233744 | 10/1991 |
| JP | 05020250 | 1/1993 |
| JP | 6-4453 | 1/1994 |
| JP | 6-97940 | 4/1994 |
| JP | 7-147599 | 6/1995 |

\* cited by examiner

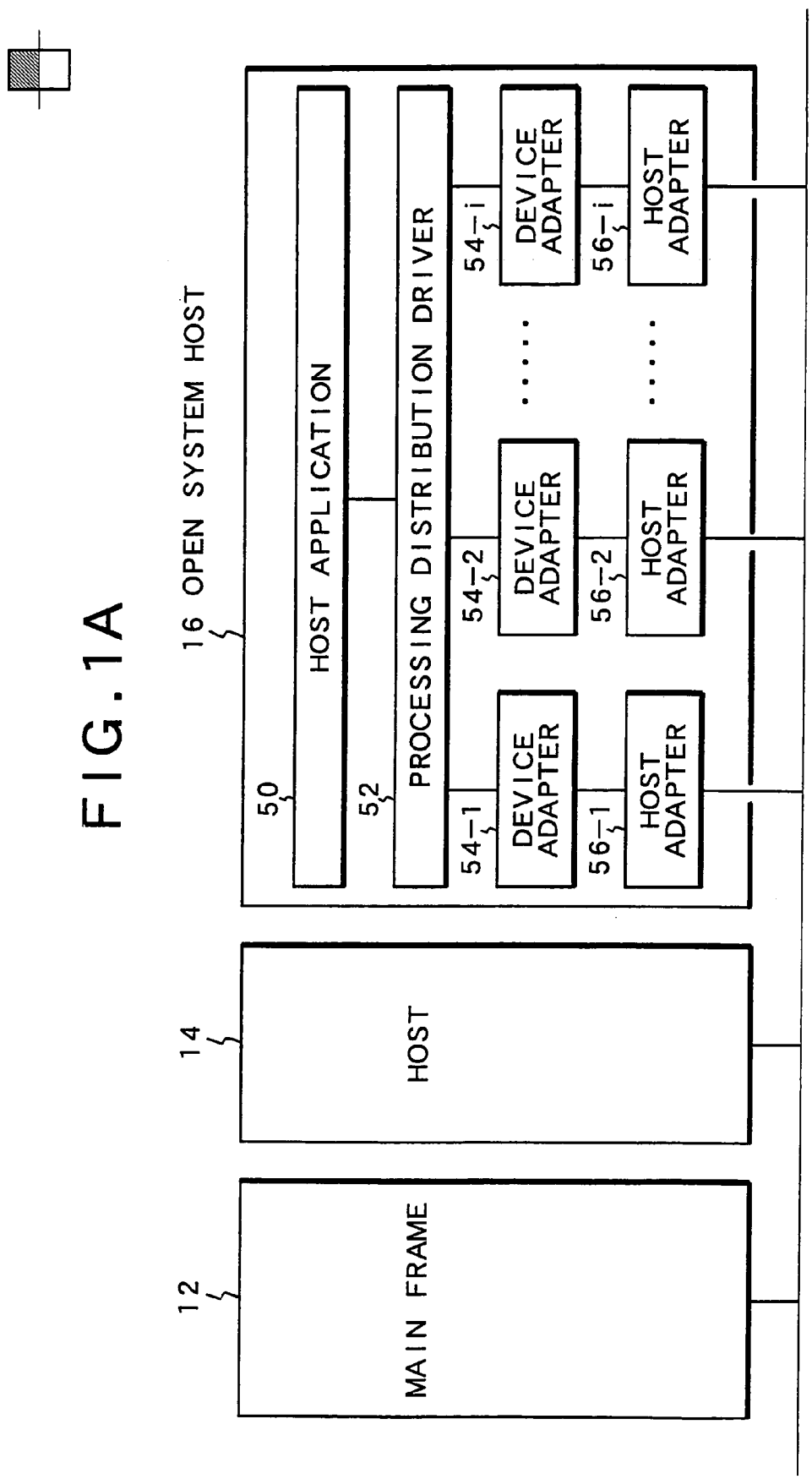

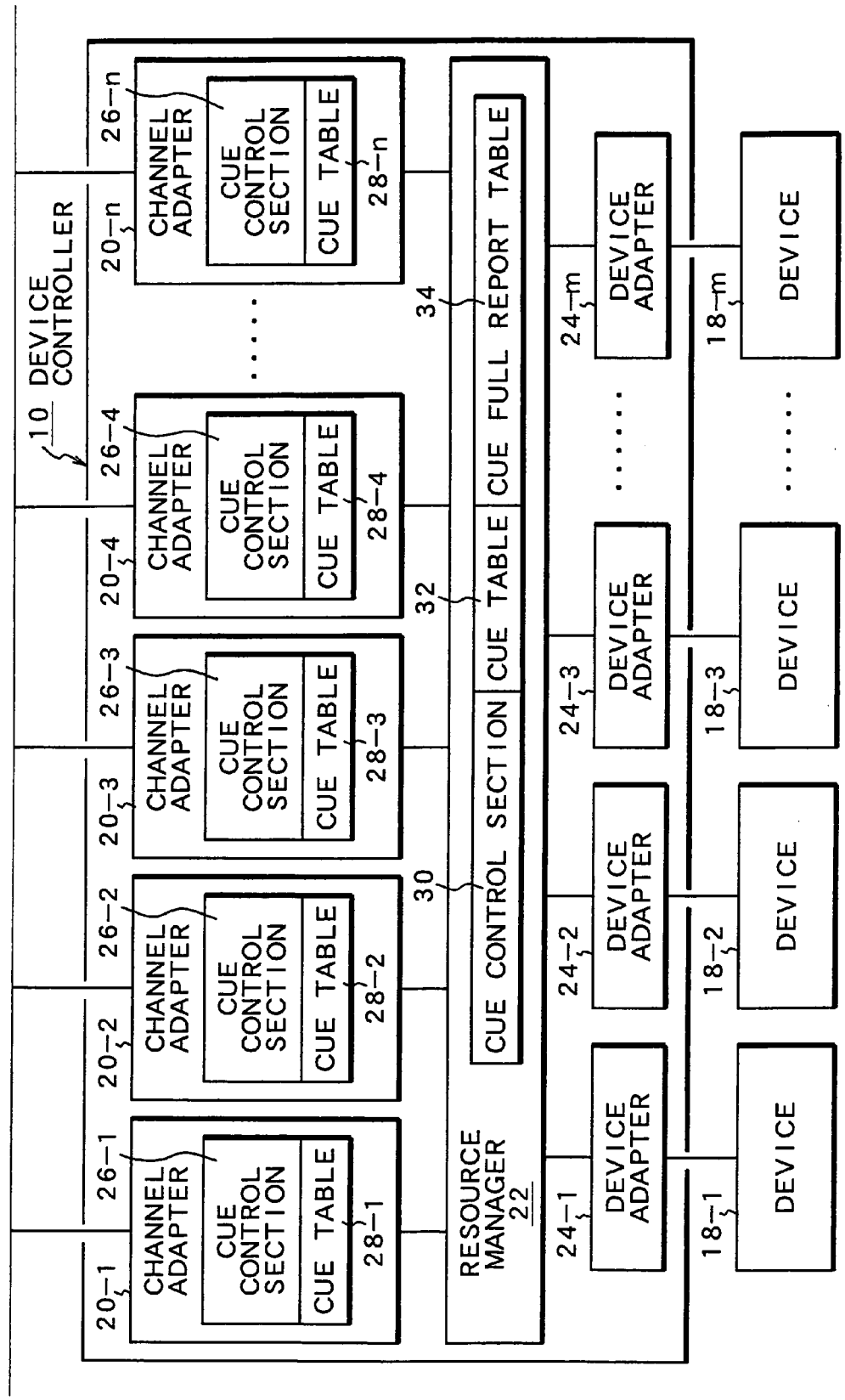

FIG. 4

34 CUE FULL REPORT TABLE

| | | | | | |
|---|---|---|---|---|---|
| CHANNEL ADAPTER (44-1) | CHANNEL ADAPTER (46-11) | CHANNEL ADAPTER | ...... | CHANNEL ADAPTER | CHANNEL ADAPTER (46-1n) |
| — — — (48-11) | CUE FULL REPORT COMPLETED | — — — | ...... | — — — | — — — (48-1n) |
| CHANNEL ADAPTER (44-2) | CHANNEL ADAPTER (46-21) | CHANNEL ADAPTER | ...... | CHANNEL ADAPTER | CHANNEL ADAPTER (46-2n) |
| — — — (48-21) | — — — | — — — | ...... | CUE FULL REPORT COMPLETED | — — — (48-2n) |
| CHANNEL ADAPTER (44-m) | CHANNEL ADAPTER (46-m1) | CHANNEL ADAPTER | ...... | CHANNEL ADAPTER | CHANNEL ADAPTER (46-mn) |
| CUE FULL REPORT COMPLETED (48-m1) | — — — | — — — | ...... | — — — | — — — (48-mn) |

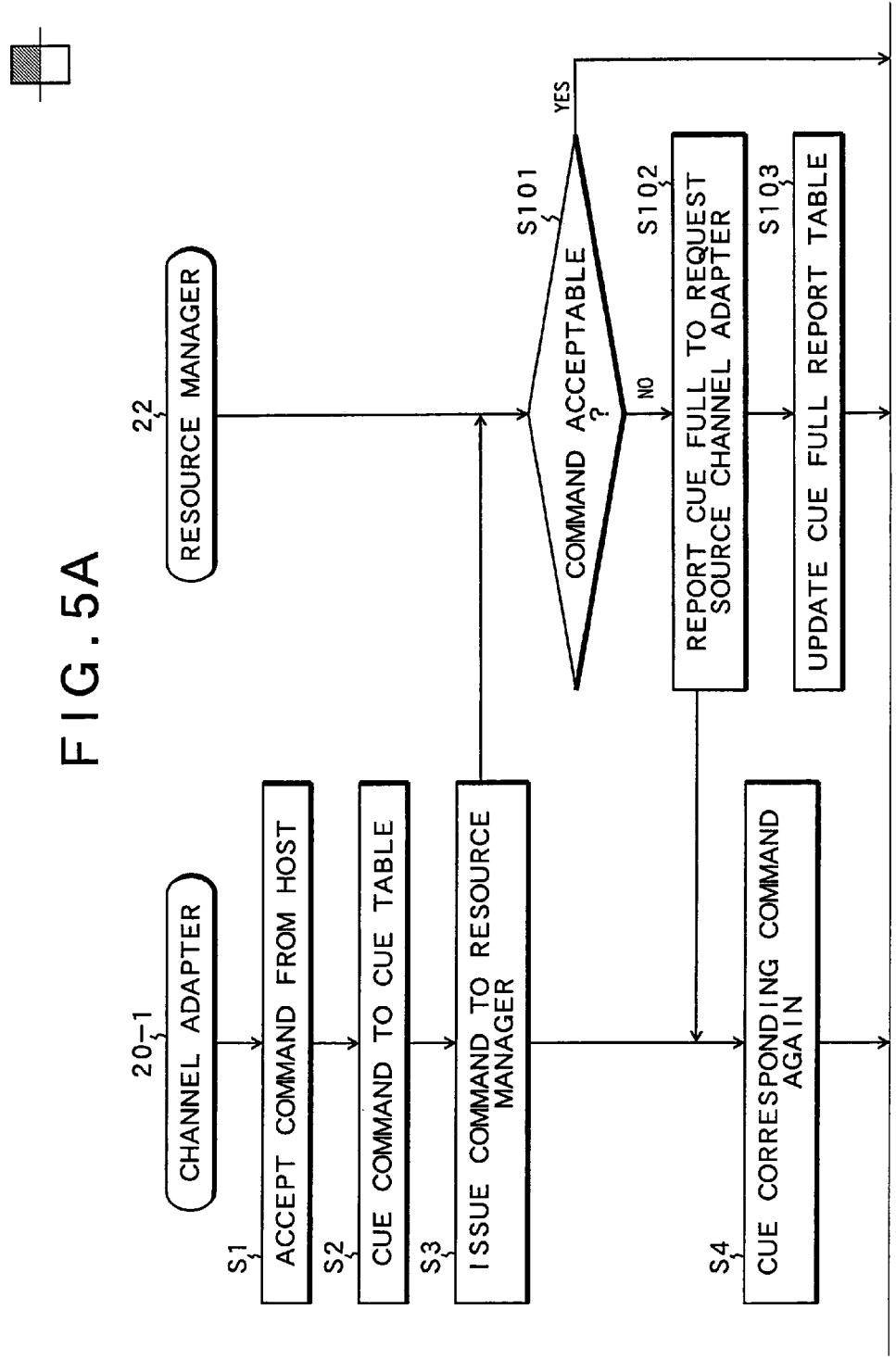

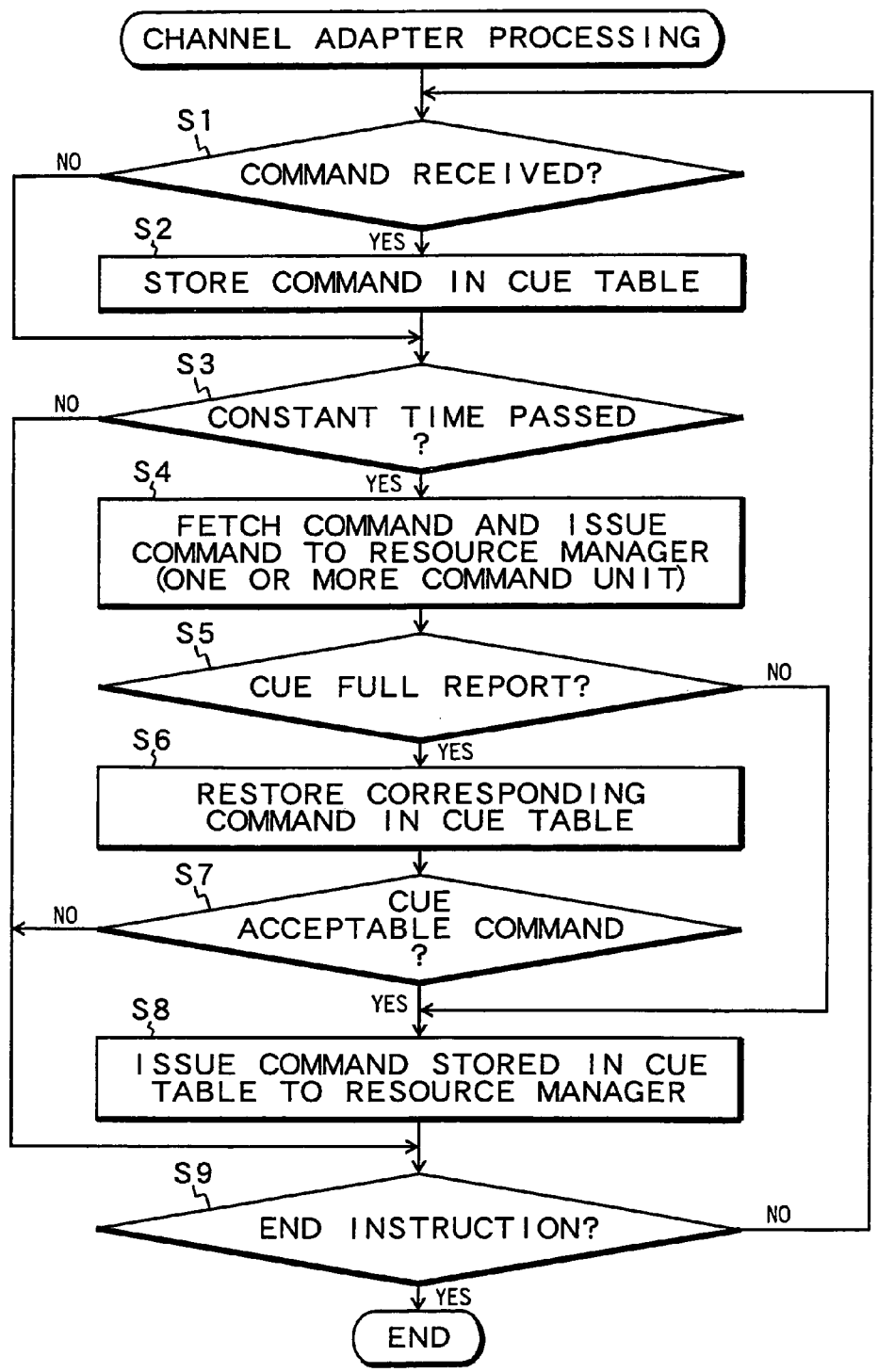

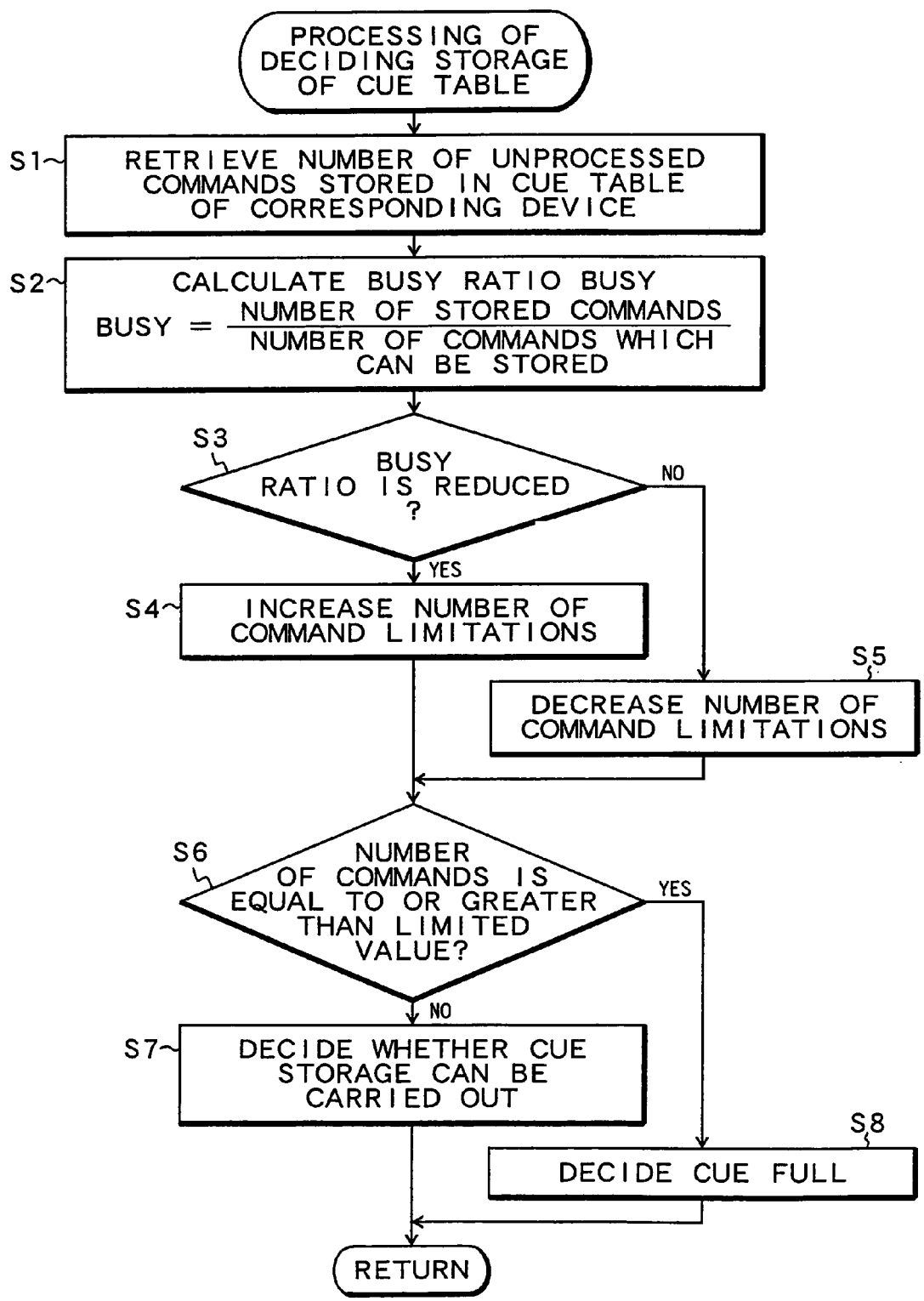

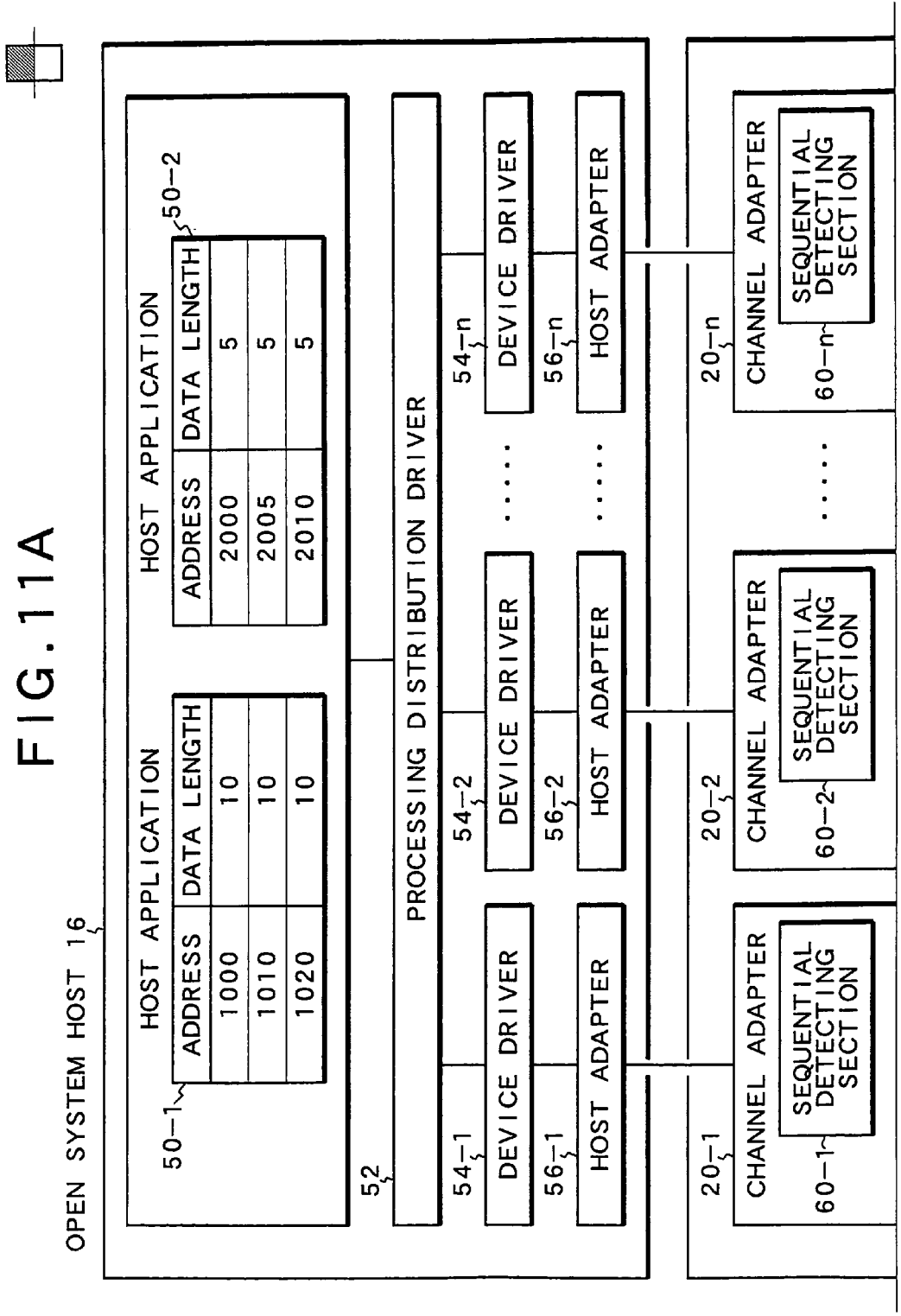

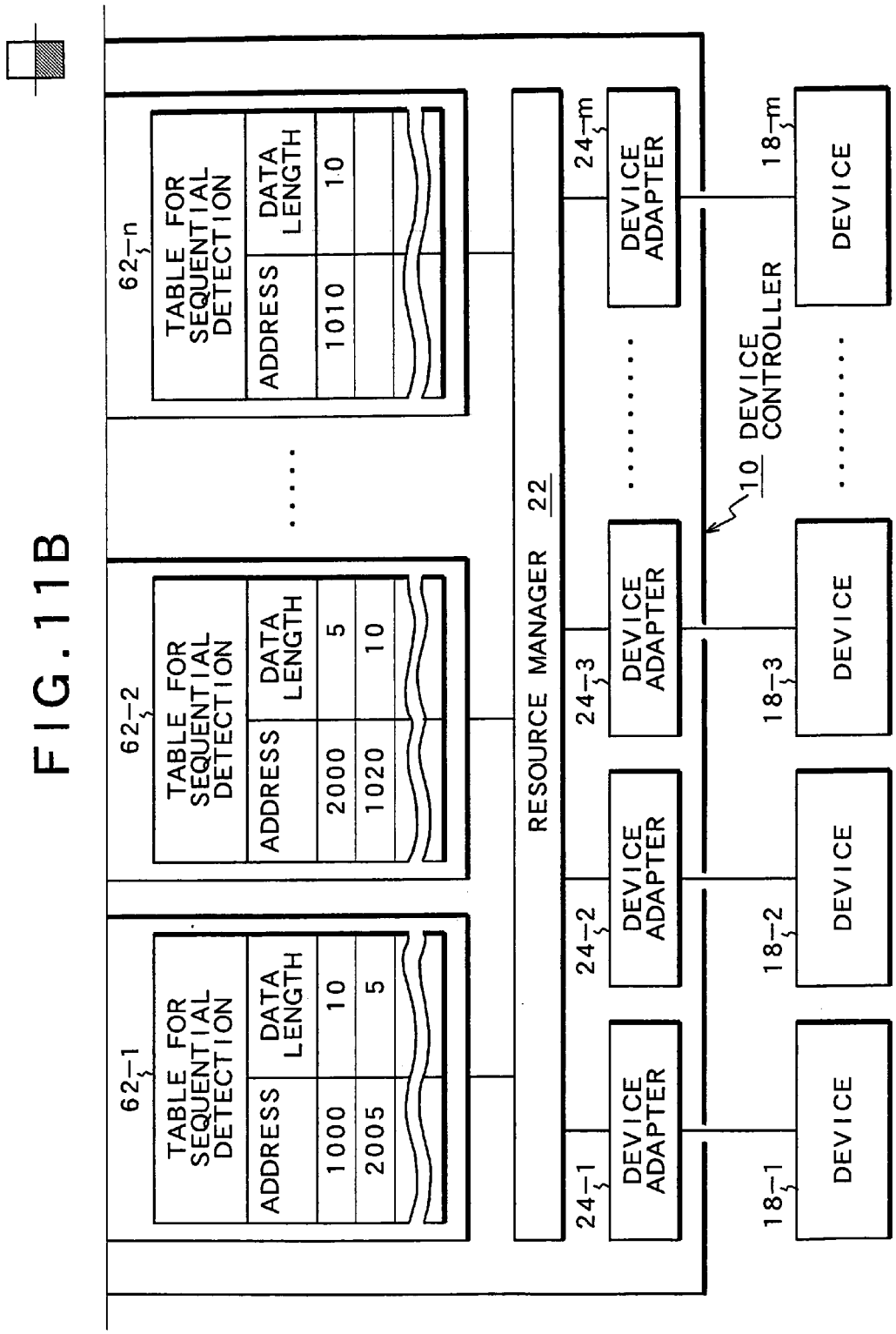

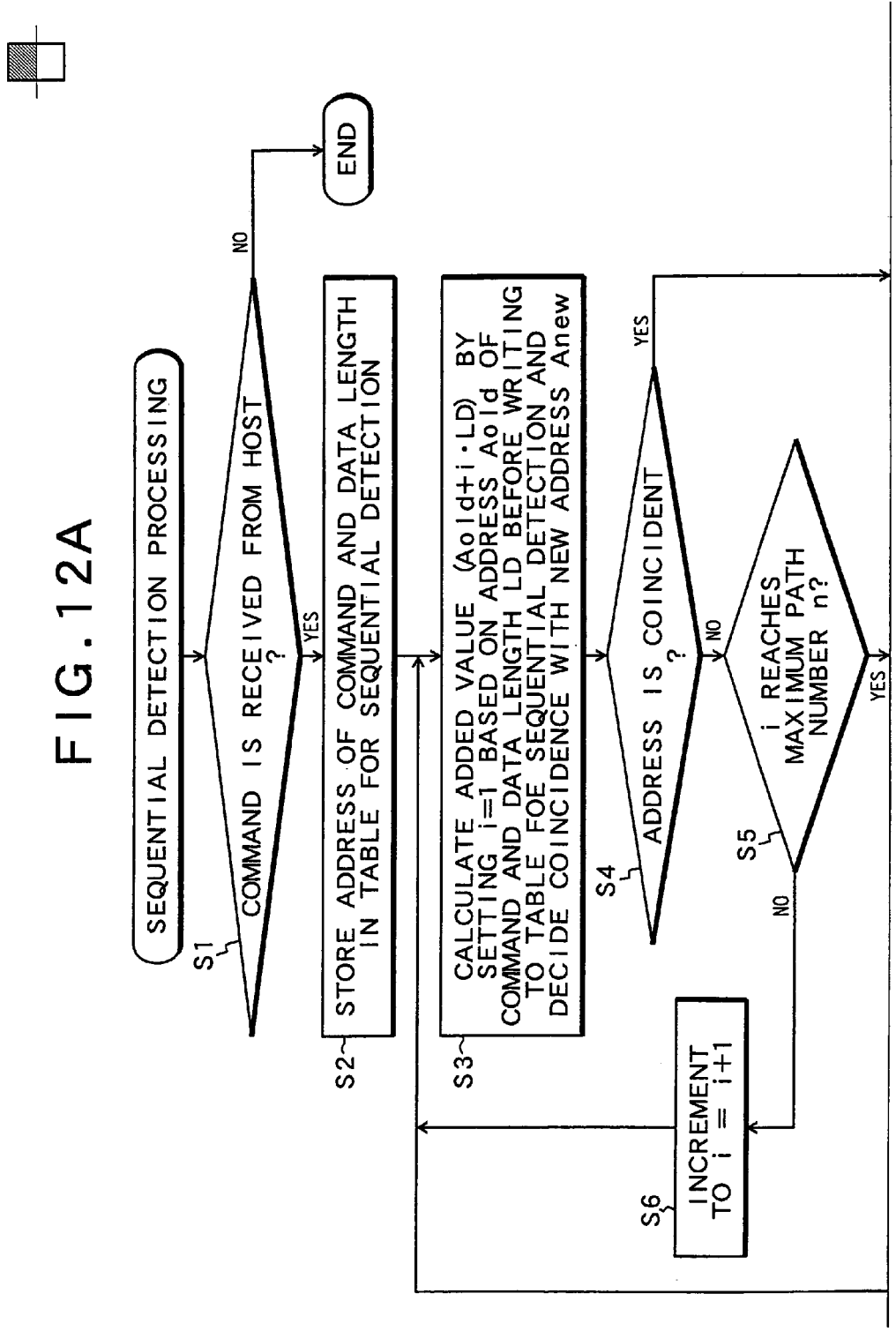

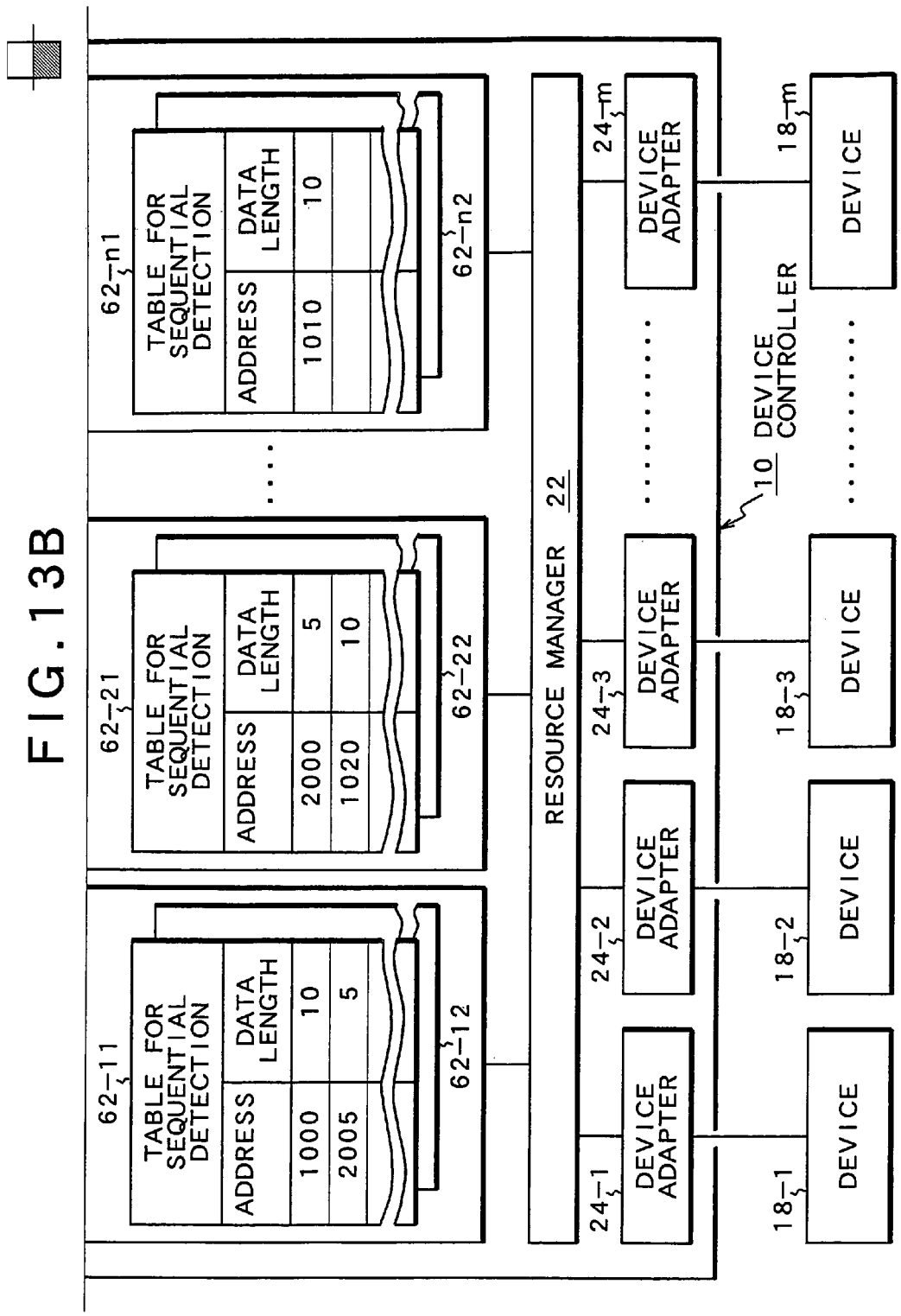

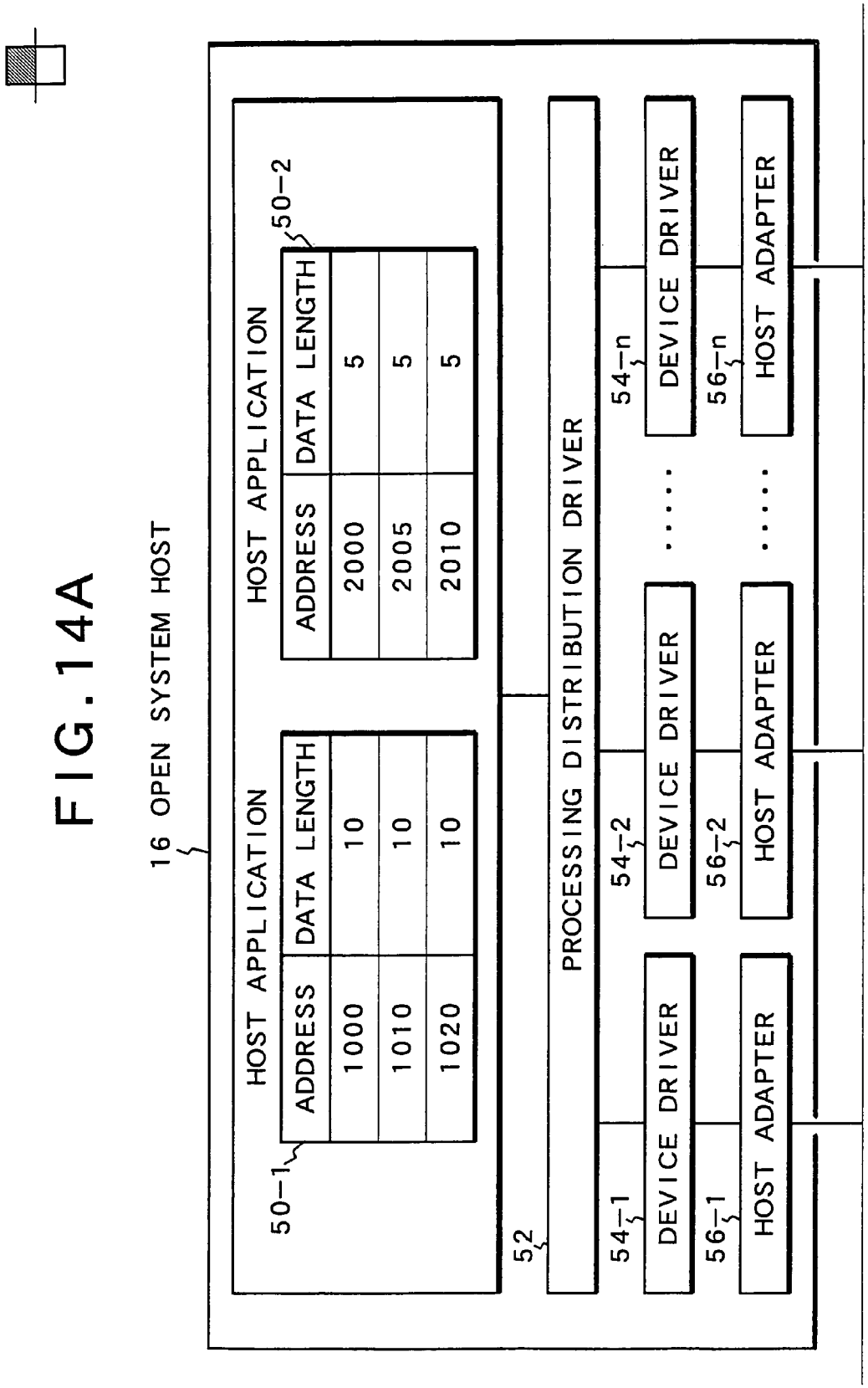

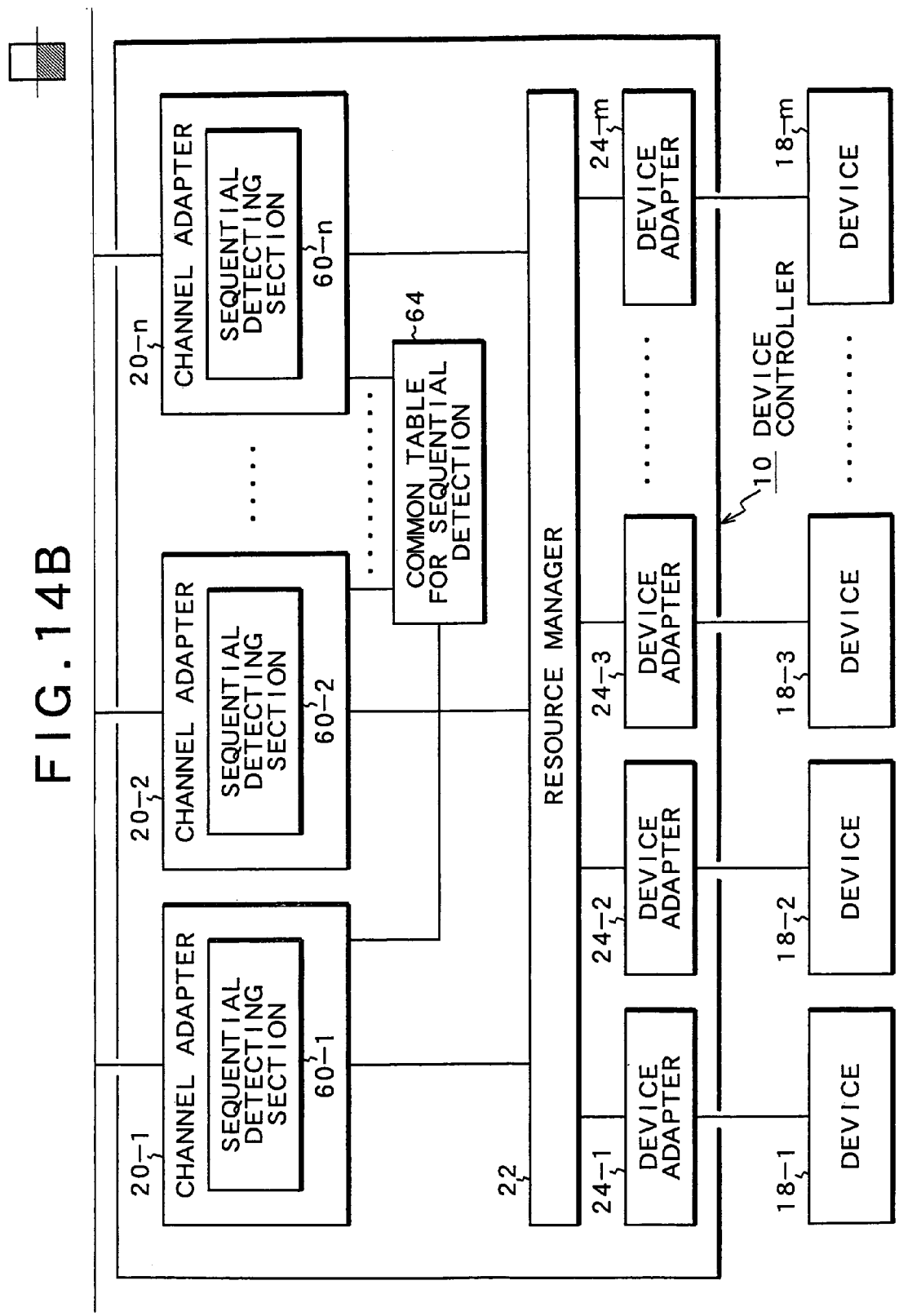

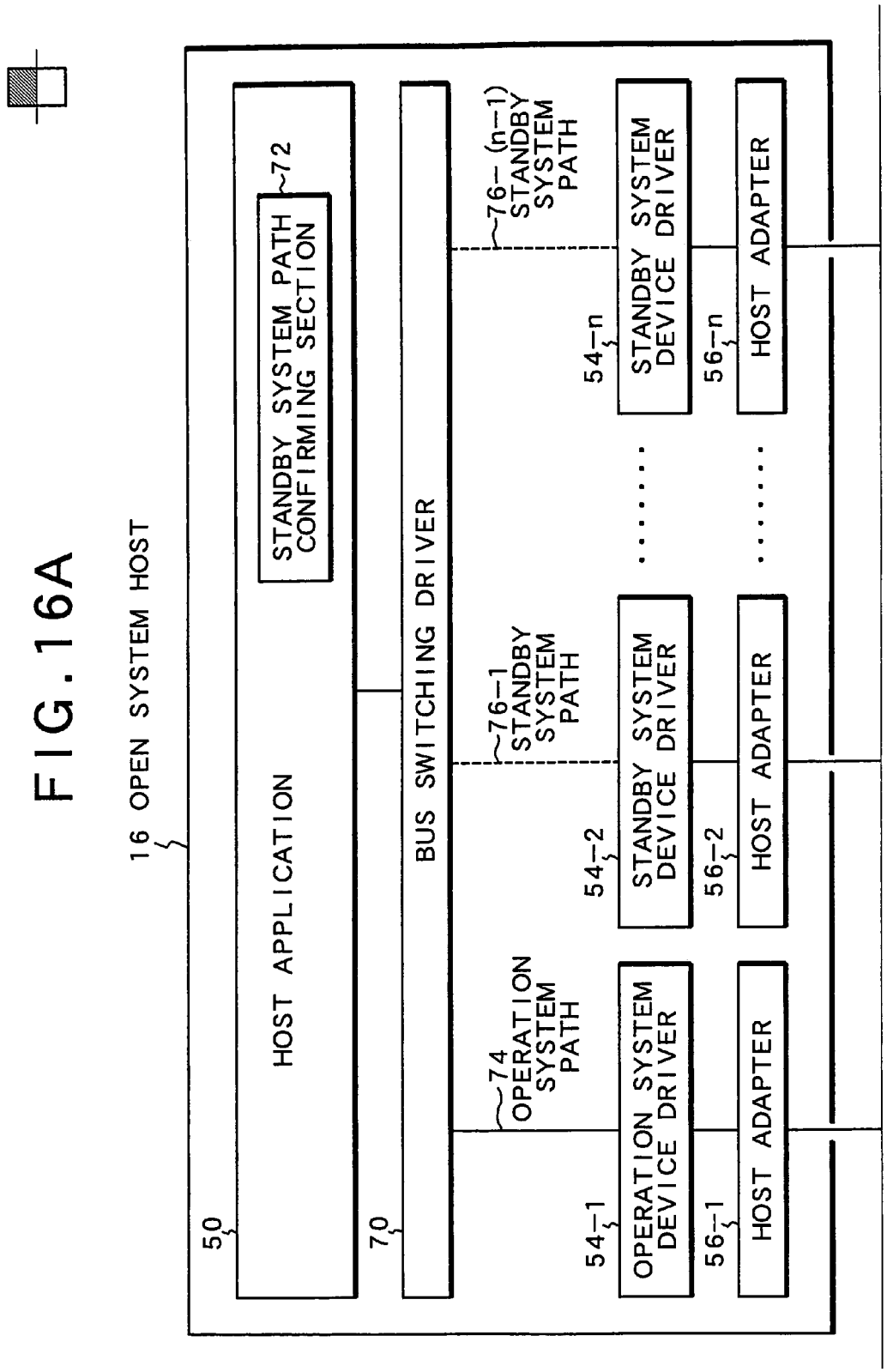

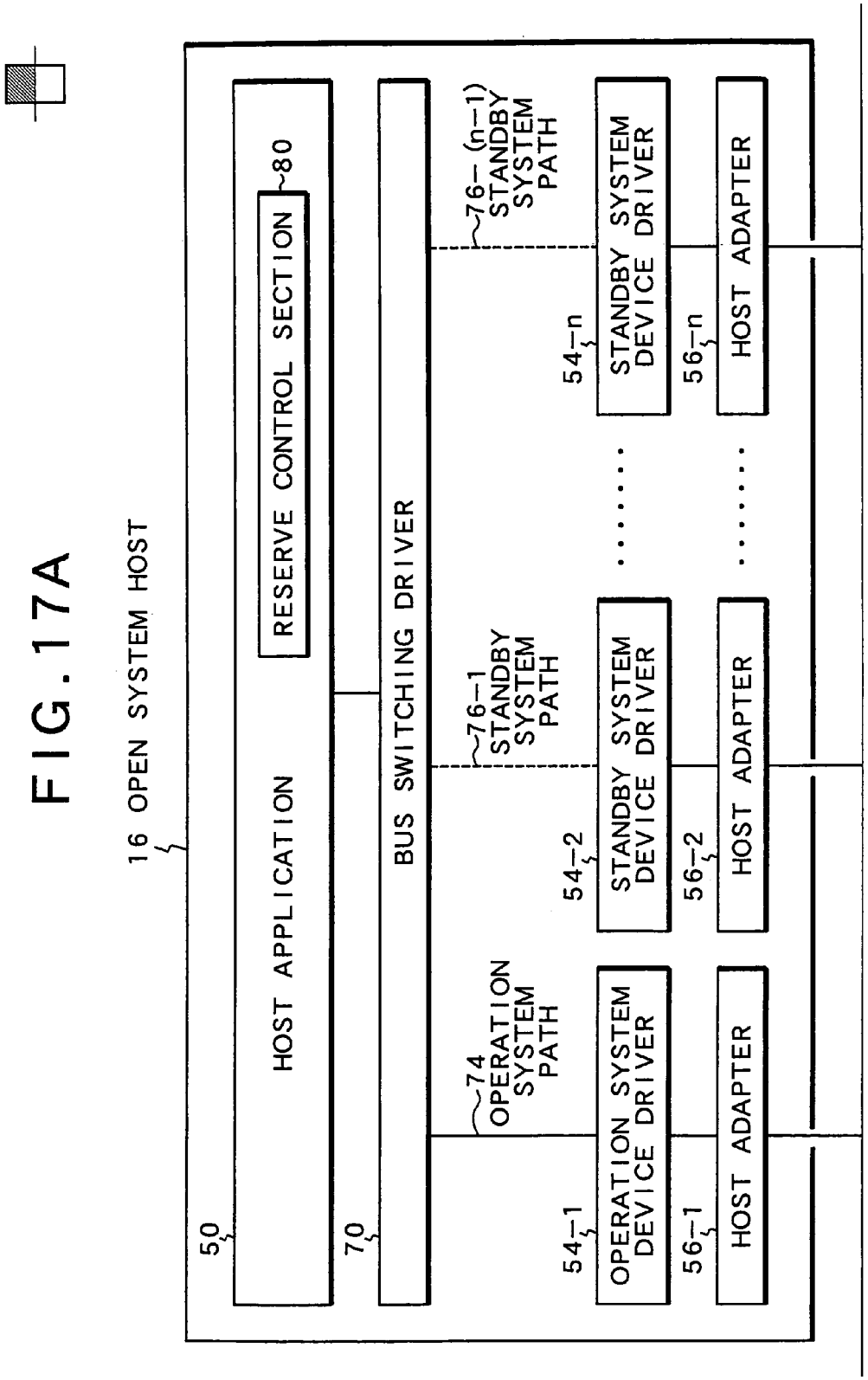

FIG. 18

84 RESERVE MANAGEMENT TABLE

DEVICE 18-1 — 86-1

| DURING RESERVE OR NOT | CHANNEL ADAPTER NUMBER | HOST NUMBER |
|---|---|---|
| DURING RESERVE | 20-1 | 1 |

DEVICE 18-2 — 86-2

| DURING RESERVE OR NOT | CHANNEL ADAPTER NUMBER | HOST NUMBER |
|---|---|---|
| NOT RESERVE | — — — | — — |

⋮

DEVICE 18-m — 86-m

| DURING RESERVE OR NOT | CHANNEL ADAPTER NUMBER | HOST NUMBER |
|---|---|---|
| NOT RESERVE | — — — | — — |

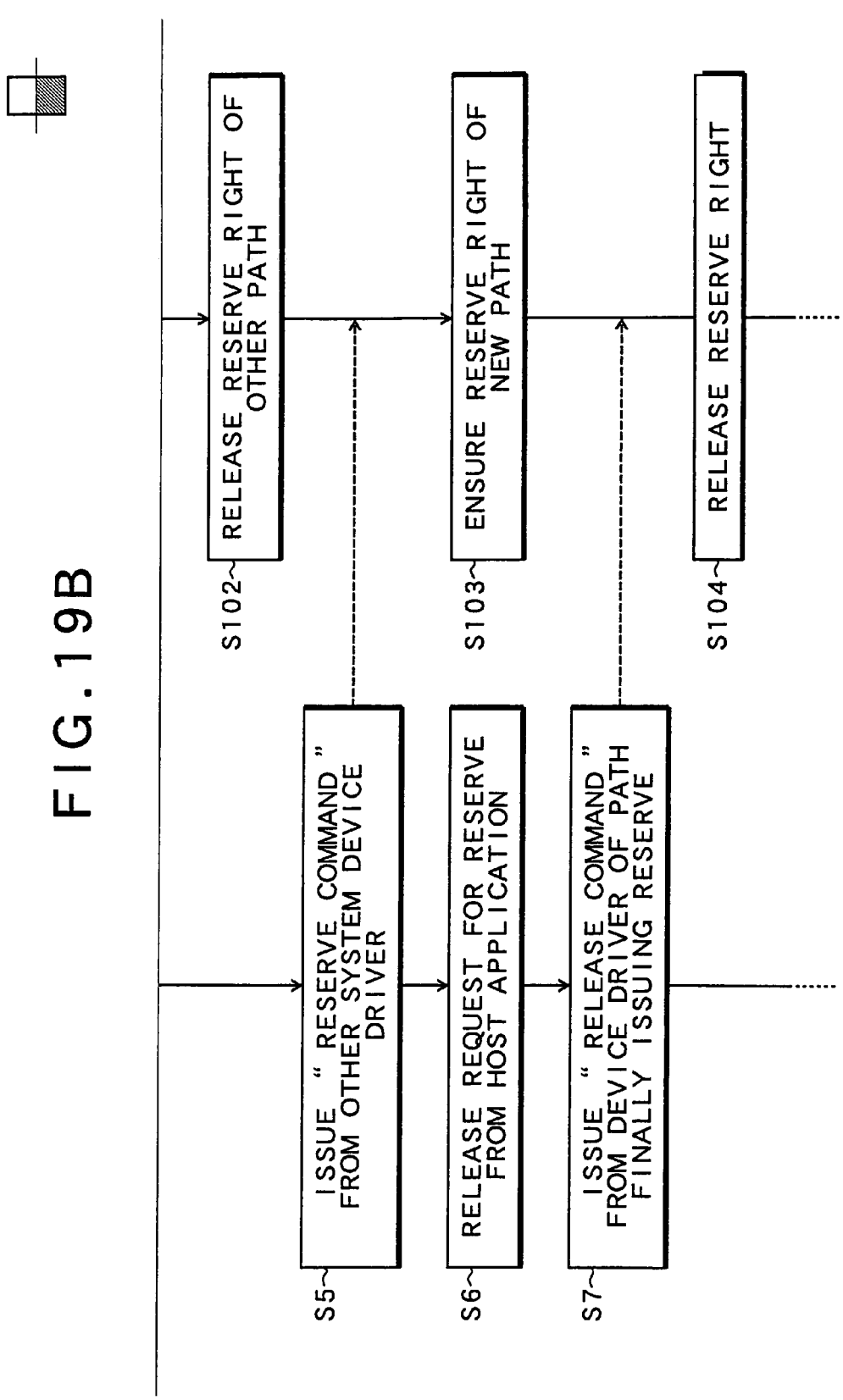

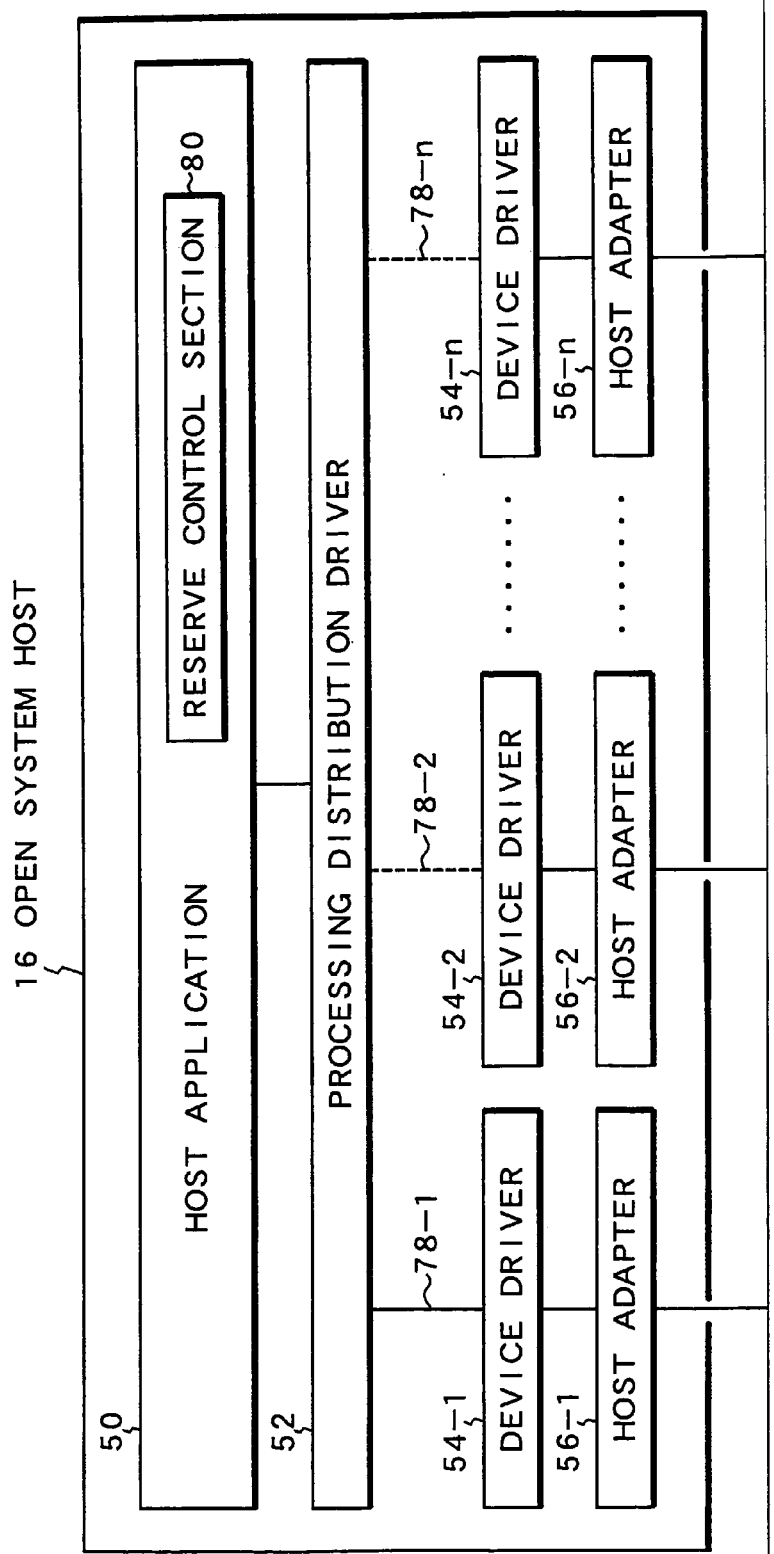
FIG. 20A

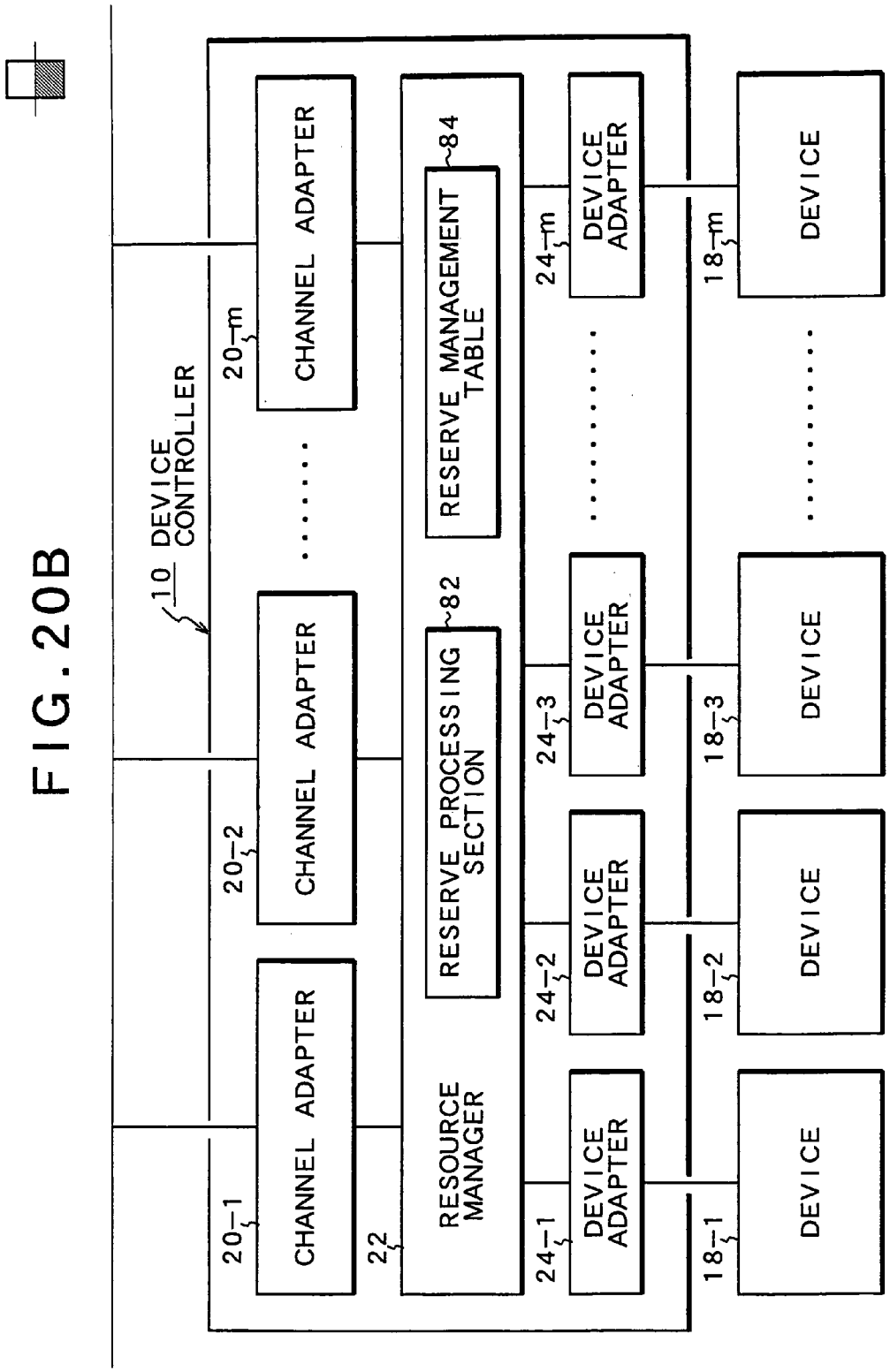

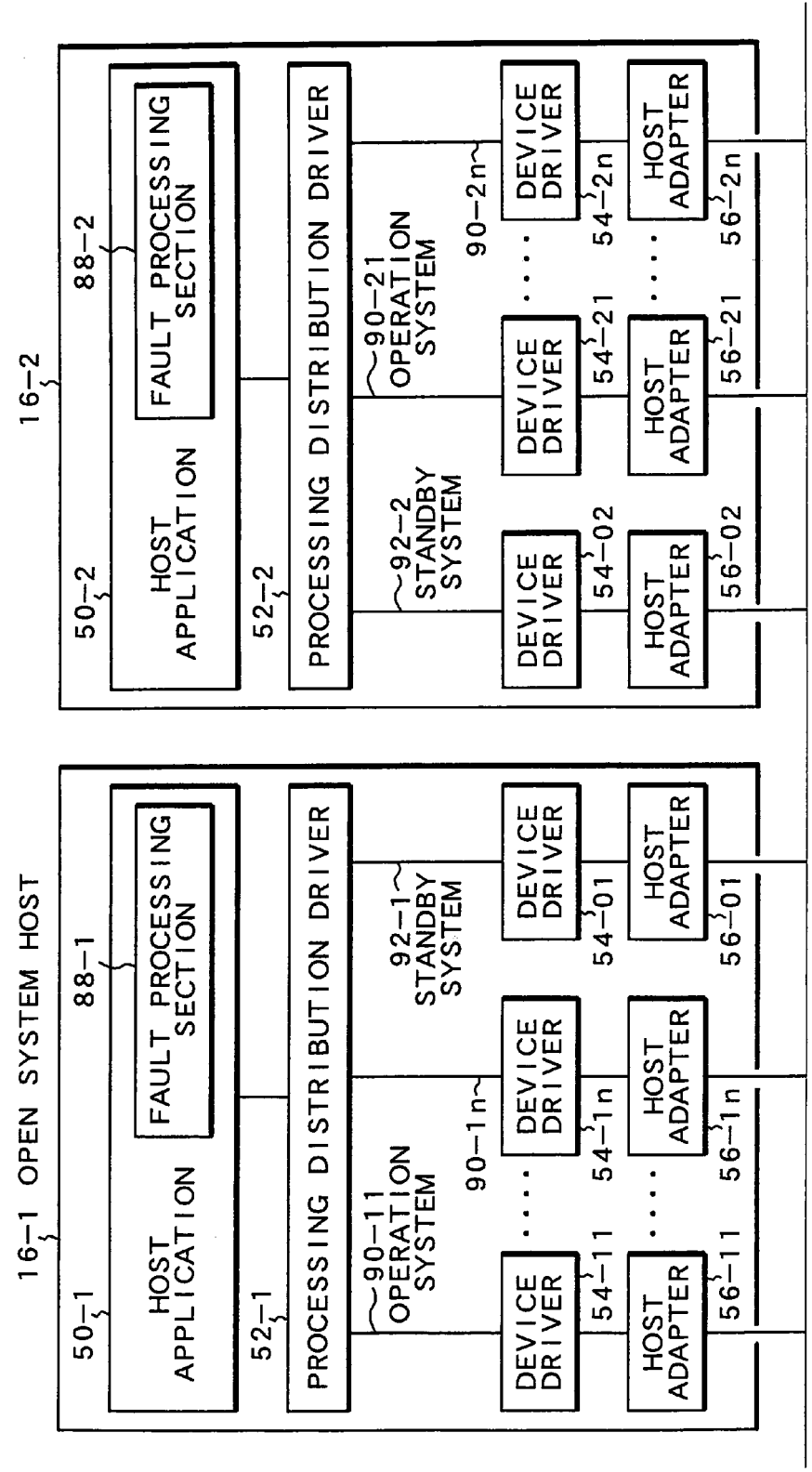

FIG.23

94 ID MANAGEMENT TABLE

DEVICE 18-1 — 96-1

| ID NUMBER | CHANNEL ADAPTER NUMBER | HOST NUMBER |
|---|---|---|
| 1 | 20-11~20-1n,20-01 | 1 |

DEVICE 18-2 — 96-2

| ID NUMBER | CHANNEL ADAPTER NUMBER | HOST NUMBER |
|---|---|---|
| 2 | 20-21~20-2n,20-02 | 2 |

⋮

DEVICE 18-m — 96-m

| ID NUMBER | CHANNEL ADAPTER NUMBER | HOST NUMBER |
|---|---|---|
| m | | |

FIG. 26

104 CHANNEL ADAPTER MANAGEMENT TABLE

| CHANNEL ADAPTER NUMBER | TRANSFER ENDING POSITION |
|---|---|
| CHANNEL ADAPTER 20-1 | 100th BYTE OF DATA TRANSFER OF OPERATION 1 |
| CHANNEL ADAPTER 20-2 | 100th BYTE OF DATA TRANSFER OF OPERATION 2 |
| CHANNEL ADAPTER 20-3 | — — — |
| CHANNEL ADAPTER 20-4 | — — — |

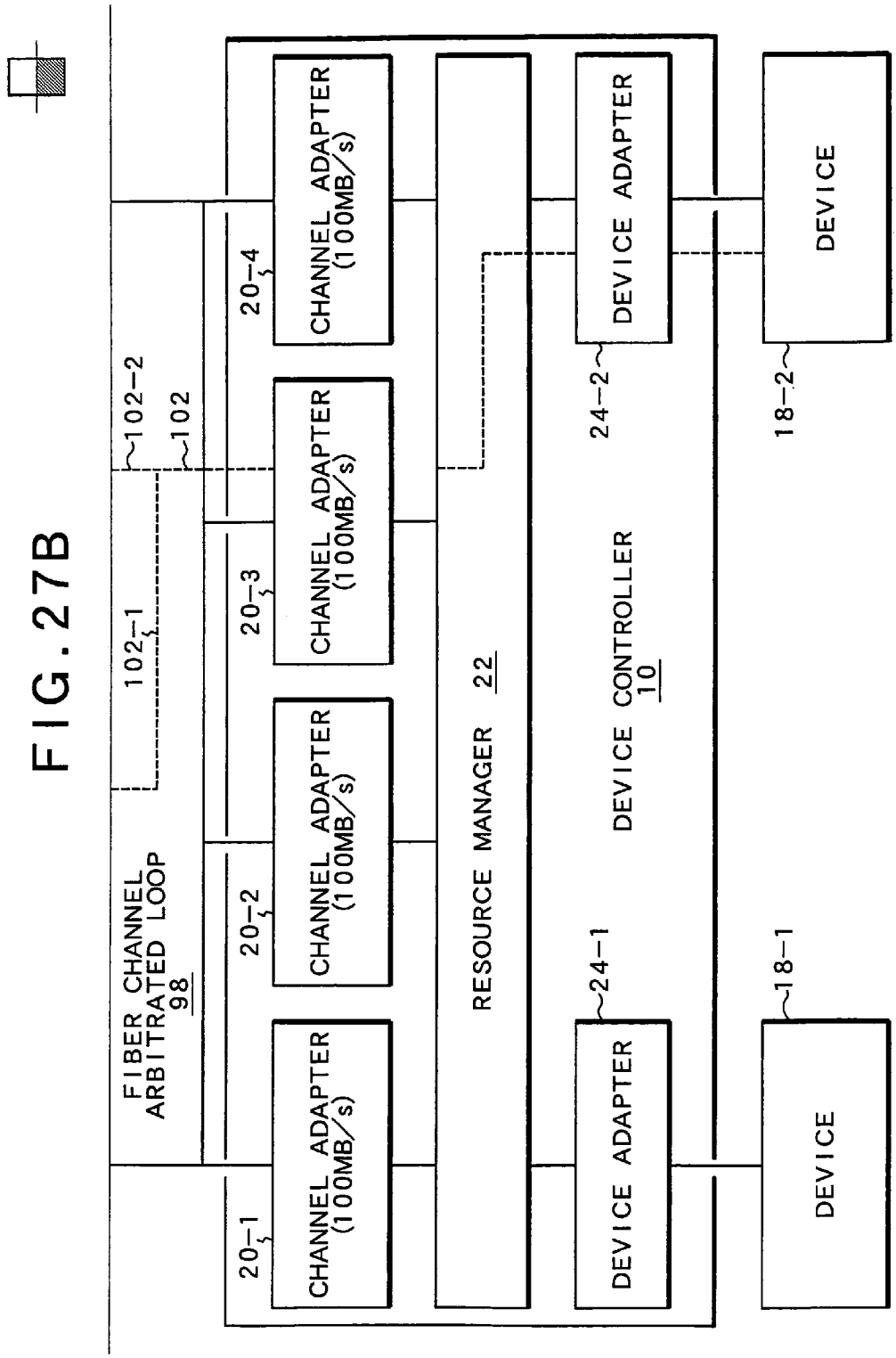

FIG. 28

106 HOST ADAPTER MANAGEMENT TABLE

| HOST ADAPTER NUMBER | TRANSFER ENDING POSITION |
|---|---|
| HOST ADAPTER 54-1 | — — — |
| HOST ADAPTER 54-2 | 100th BYTE OF DATA TRANSFER OF OPERATION 1 |
| HOST ADAPTER 54-3 | 100th BYTE OF DATA TRANSFER OF OPERATION 2 |
| HOST ADAPTER 54-4 | — — — |

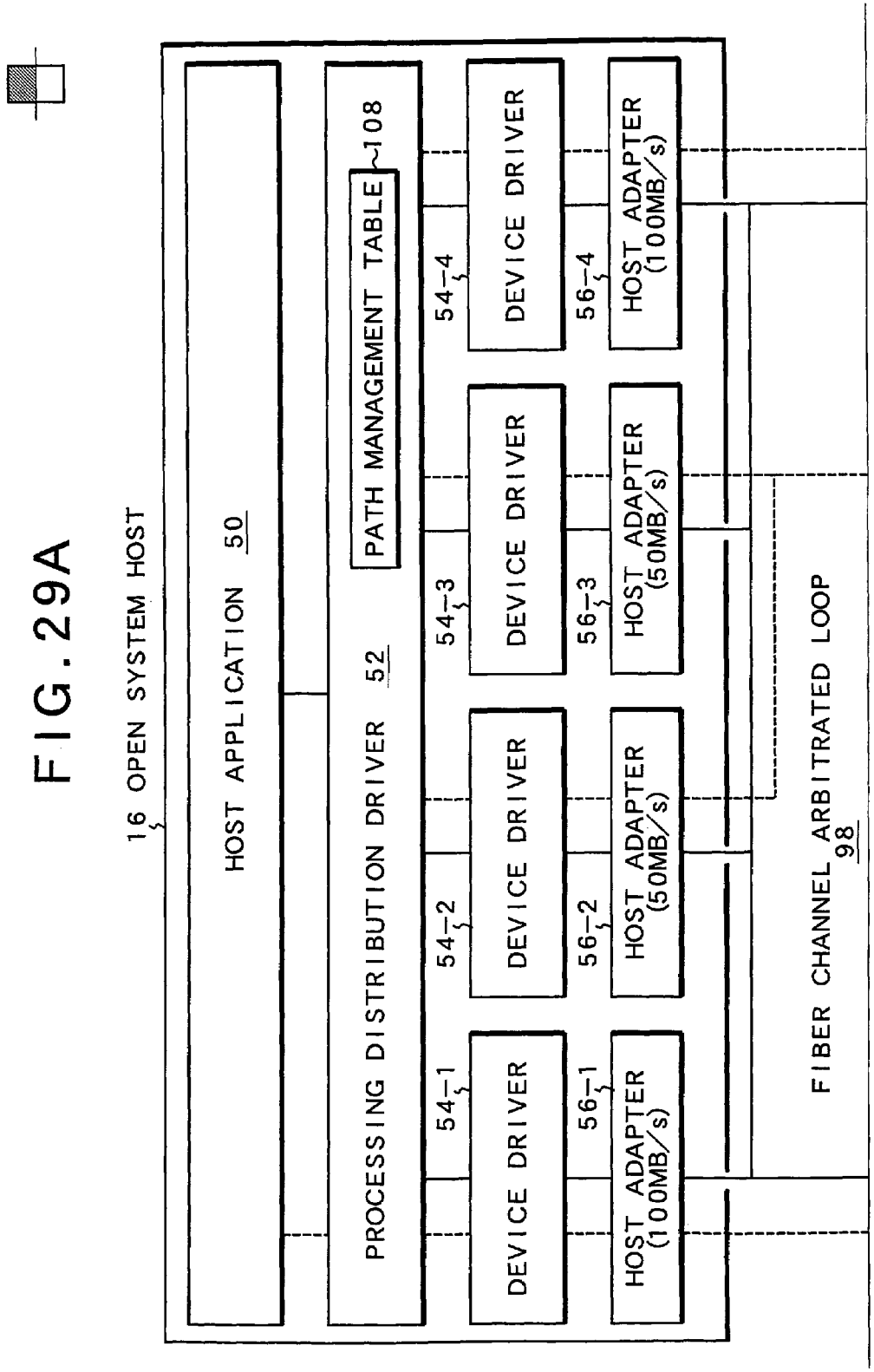

FIG. 30

108 PATH MANAGEMENT TABLE

110 DEVICE DRIVER MANAGEMENT TABLE

| DEVICE DRIVER | 52-1 | 52-2 | 52-3 | 52-4 |
|---|---|---|---|---|
| STATES OF USE | DURING USE | DURING USE | DURING USE | EMPTY |

112 CHANNEL ADAPTER MANGEMENT TABLE

| CHANNEL ADAPTER | 20-1 | 20-2 | 20-3 | 20-4 |
|---|---|---|---|---|
| STATES OF USE | DURING USE | DURING USE | DURING USE | EMPTY |

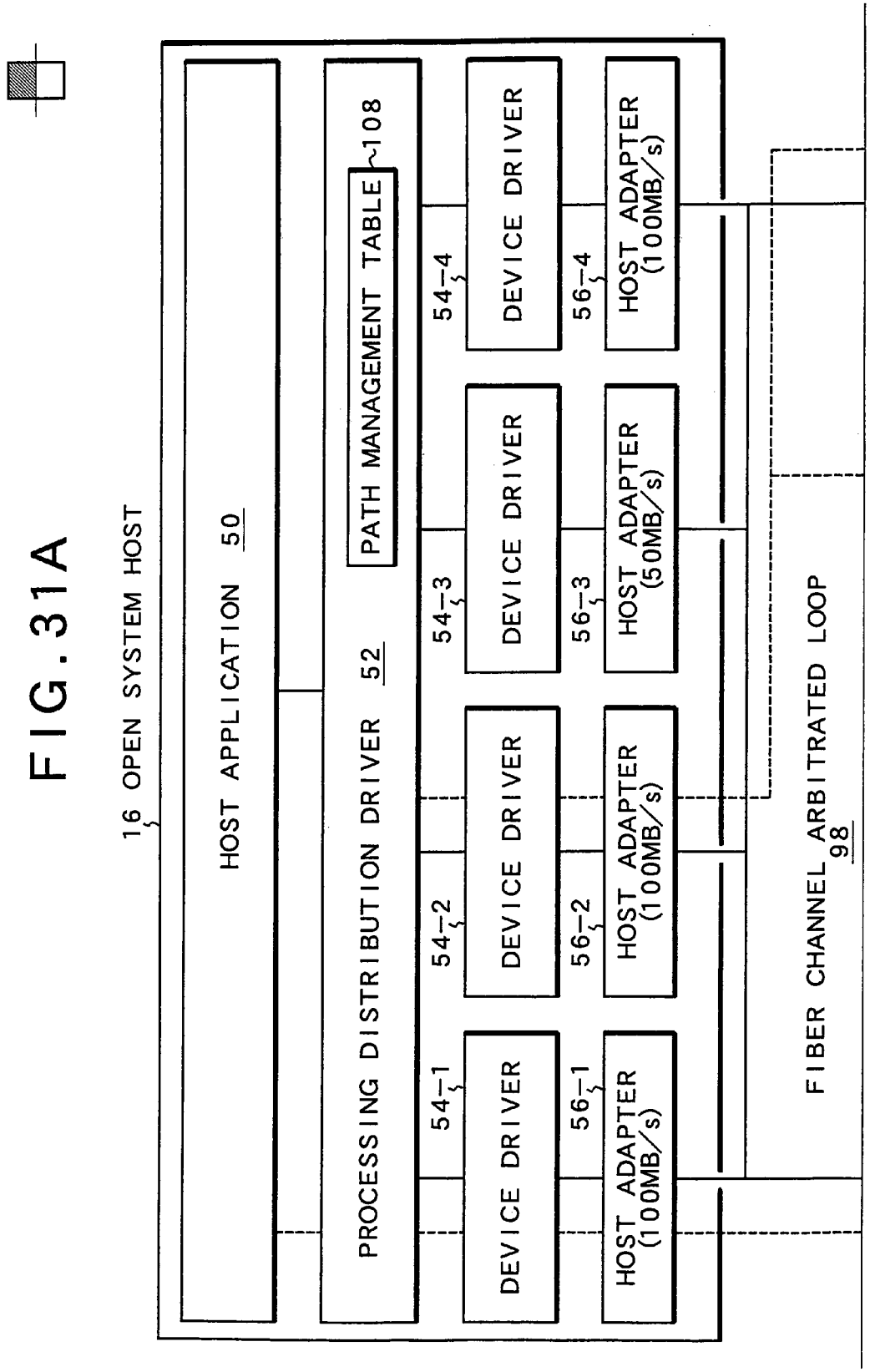

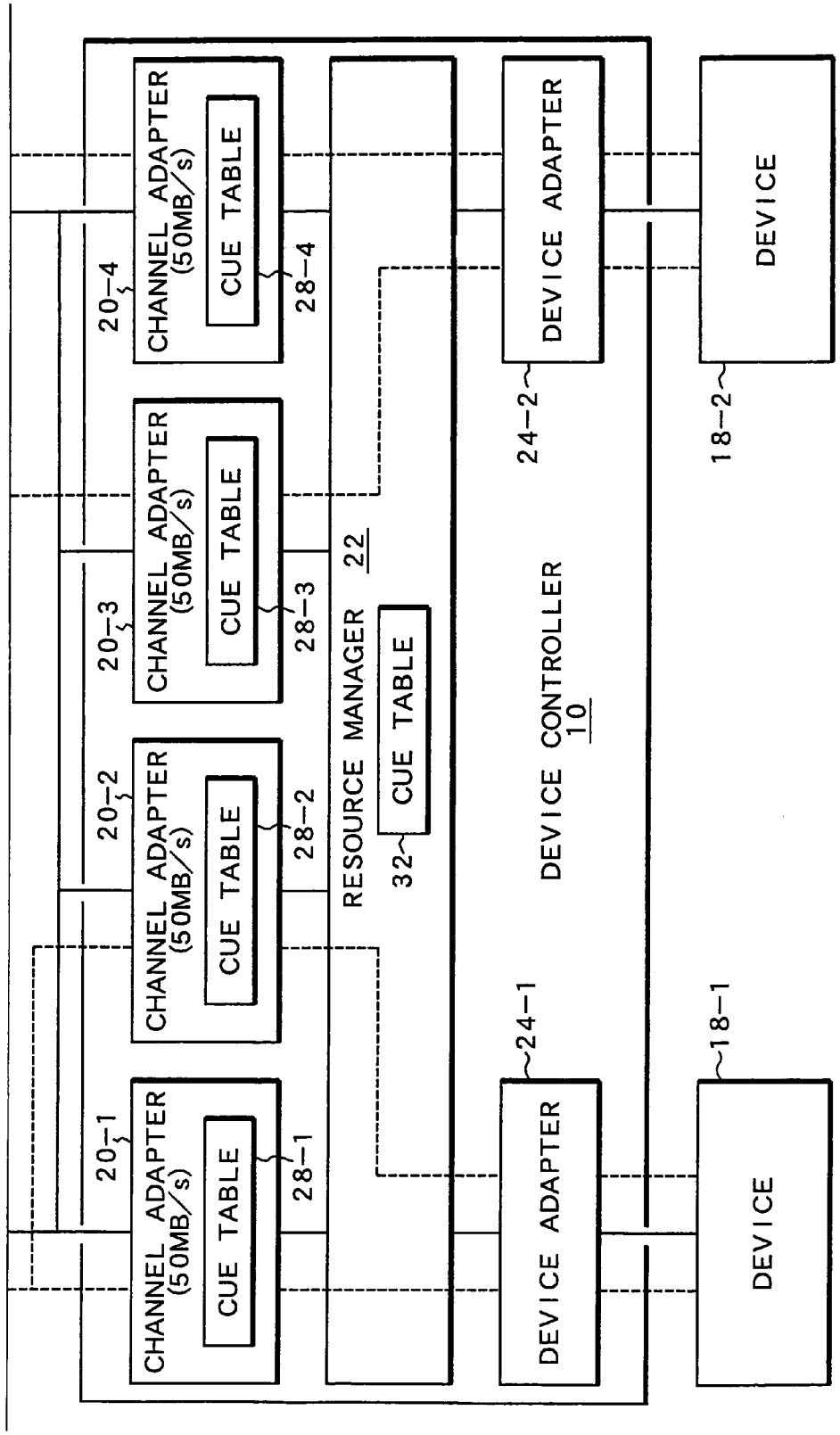

FIG.32

108 PATH MANAGEMENT TABLE

110 DEVICE DRIVER MANAGEMENT TABLE

| DEVICE DRIVER | 52-1 | 52-2 | 52-3 | 52-4 |
|---|---|---|---|---|
| STATES OF USE | DURING USE | DURING USE | EMPTY | EMPTY |

114 CHANNEL ADAPTER MANGEMENT TABLE

| CHANNEL ADAPTER | 20-1 | 20-2 | 20-3 | 20-4 |
|---|---|---|---|---|
| STATES OF USE | DURING USE | DURING USE | DURING USE | DURING USE |
| NUMBER OF CUE | 10 | 5 | 3 | 1 |

DEVICE CONTROLLER AND INPUT/OUTPUT SYSTEM

This application is a Divisional of application Ser. No. 09/930,158, filed Aug. 16, 2001, now U.S. Pat. No. 6,792,482, which is a continuation of International Application PCT/JP99/03366, filed Jun. 24, 1999, both of which are incorporated by reference herein.

BACKGROUND OF THE INVENTION

1. Technical Field

The present invention relates to a device controller and an input/output system for processing an input/output request for a physical device such as a disk array from various hosts such as a main frame or a open system host, and more particularly to a device controller and an input/output system for optimizing cuing for an increase in the input/output request, the correspondence of a sequential access attended with path switching, switching to a standby system during the generation of faults, and furthermore, maintenance of a transfer rate for a channel fault, respectively.

2. Background Art

Currently, a device controller for controlling an input/output processing for a device such as a disk array has been improved in function, performance and reliability. Importance has been attached to the fact that the device controller can be connected to a host system in various fields such as a UNIX or a personal computer in addition to a conventional large-sized computer. However, there have been some problems to be solved in order to connect the device controller to various hosts. Referring to a first problem, an input/output request (I/O command) is issued to the device controller simultaneously from various hosts so that a load concentrates on a queue management resource for storing and managing the input/output request from the hosts, thereby giving a bottleneck. The device controller comprises a channel adapter for each port for physically connecting a plurality of hosts, a resource manager for collectively processing the input/output requests sent from the hosts, and a device adapter for controlling each physical device. The contents of the input/output requests sent from the hosts are analyzed by the channel adapter and the requests are exactly transferred to the resource manager. The resource manager stores the input/output request sent from the channel adapter in a cue table (queue) provided on a cue control section in the resource manager and sequentially issues the input/output request to the device adapter to be an object. The device adapter issues the input/output request to the device and returns a response to the resource manager. The resource manager carries out the exclusive management of an input/output during an operation in the device controller, the cue management of the input/output request for the device, and array control if the device controller is an array disk. Thus, the contents of the input/output requests sent from the hosts are analyzed by the channel adapter and the requests are exactly transferred to the resource manager. In such circumstances that the number of hosts simultaneously issuing a plurality of input/output requests is increased, the input/output requests of the hosts are accumulated in a cue control section in the resource manager, and the overhead of the cue control to be carried out by the resource manager becomes a bottleneck in the device controller.

Moreover, in the case in which the device controller according to the present invention is connected to open system hosts as various hosts, it is desirable that an input/output request sent from a host application should be divided into a plurality of paths through a processing distribution driver to take a load balance and to build such an environment that a specific path does not become a bottleneck. The input/output request sent from the host application of the open system host is distributed into each of the device drivers of the paths through the processing distribution driver, and furthermore, the input/output request sent from each host adapter is issued to the device controller. Thus, the paths are built by a load distribution driver, thereby reducing the bottleneck of the paths connected to the host and the device controller. However, there is one problem. More specifically, the input/output requests are distributed so that sequential recognition which has conventionally been operated in the device controller cannot be carried out. A conventional sequential input/output request is decided to be a sequential input/output request when the address of the input/output request is ensured and is found to have the continuity of an address by a comparison with a last command. When the device controller decides the sequential input/output request, it is possible to implement an operation mode effective for the sequential input/output request for a prefetch operation, plural area simultaneous read and write or the like. However, the input/output request takes the load balance by the processing distribution driver. Therefore, when the input/output requests are issued separately through the paths, a mechanism for detecting the sequential input/output request is not operated.

In the case in which the device controller is connected to the open system host to build the input/output system, the path is divided redundantly into an operation system path and a standby system path in order to enhance the reliability of the system. For example, a host application input/output request provided in the open system host is issued to the device driver of the operation system path by a path switching driver and is transferred to the host adapter of the device controller. In the case in which a fault is generated on a path connected to the device driver of the operation system, the use of the operation system path on which the fault is generated is stopped by the path switching driver and the issuance of the input/output request is transferred to the device driver set to the standby system. However, path connected to the standby system device driver breaks down while it has not been used for a long period of time. When the operation system breaks down so that the processing is transferred to the standby system, such a fault that the standby system is not operated might be generated.

In the case in which the input/output request sent from the host application of the open system host is divided redundantly into the operation system path and the standby system path and is issued to the device controller, a countermeasure against a release processing of a reserve linked to the device controller is not clear if a fault is generated on the operation system path and the standby system path is started to be utilized when the operation system path is used to maintain a specific device in a reserve state. More specifically, the input/output request sent from the host application provided in the open system host is issued to the device driver of the operation system by the path switching driver. When a fault is generated on the operation system path connected to the device driver, the path switching driver stops the use of the path of the operation system and the issuance of the input/output request is started in the device driver set through the standby system path. At this time, however, in the case in which the host application reserves a specific device through the device driver of the operation system, a processing reservation conflict is to be responded to the path provided under the standby system device driver which acts as another path so that redundancy of the path is blocked because the device controller controls the reserve for each path.

In the open system host, the input/output request sent from the host application is distributed into a plurality of paths through the processing distribution driver, thereby taking a load balance. Moreover, in the case in which one path of the device driver breaks down, residual paths can be used to distribute the input/output request sent from the host application through the processing distribution driver, thereby taking a load balance. However, a host system causing a fault on a path decreases the number of paths to be an object of processing distribution due to the fault as compared with other normal host systems. Referring to the whole system, therefore, there is a problem in that an input/output processing becomes a path bottleneck so that performance is deteriorated. In the input/output system for processing an input/output request sent from a host to a physical device through the device controller, furthermore, there is a problem in that a lower transfer rate is applied if a difference is made between the transfer rate of a host adapter on the host side and the transfer rate of a channel adapter on the device controller side.

DISCLOSURE OF INVENTION

The present invention provides a device controller in which a cue control section is provided in a channel adapter, requests sent from a host are once stored in the channel adapter, and some of them are transferred to a resource manager, thereby decreasing the number of cues to be controlled by the resource manager.

The present invention provides a device controller capable of recognizing that sequential input/output requests are sequential on the device controller side or not even if they are issued from a host application separately in order to take a load balance.

The present invention provides an input/output system which is reliably operated when a processing is changed from an operation system path to a standby system path.

The present invention provides an input/output system in which even if a processing distribution path breaks down, a load balance equivalent to that before the generation of a fault can be implemented, thereby preventing a deterioration in performance.

The present invention provides an input/output system capable of rebuilding a reserve state even if a conversion to another path is carried out in such a state that the reserve of a device is established.

The present invention provides an input/output system capable of maintaining a higher transfer rate even if a difference is made on channel transfer rates between a host and a device controller.

Distribution Cue Control

The present invention provides a device controller having a plurality of various hosts connected thereto and serving to process an input/output request from the hosts to a device, comprising a plurality of channel adapters for accepting the input/output request sent from the hosts, a plurality of device adapters for issuing the input/output request to the device, and a resource manager for carrying out whole input/output control from the hosts between the channel adapters and the device adapters. Referring to such a device controller, the present invention is characterized by a first cue table provided in each of the channel adapters and serving to store a plurality of input/output requests from the hosts, a first cue control section provided in each of the channel adapters and serving to issue, to the resource manager, the input/output requests sent from the hosts which are stored in the first cue table, a second cue table provided in the resource manager and serving to store the input/output requests sent from the hosts which are issued from the channel adapters, and a second cue control section provided in the resource manager and serving to issue, to the device adapter, the input/output requests sent from the hosts which are stored in the second cue table. Consequently, even if a plurality of input/output requests are received from the hosts at the same time, they are once stored in the channel adapter and some of them are transferred to the resource manager. Therefore, it is possible to substantially reduce the number of inputs and outputs handled by the cue control of the resource manager and to prevent the overhead of the cue control to be carried out by the resource manager from being a bottleneck in the device controller. Consequently, processing performance can be enhanced.

The first cue control section of each of the channel adapters fetches one or more input/output requests in a unit from the input/output requests sent from the hosts which are stored in the first cue table and gives a request for a processing to the resource manager. Moreover, the first cue control section of each of the channel adapters fetches the input/output requests sent from the hosts which are stored in the first cue table and gives a request for a processing to the resource manager when receiving an end report of the issued input/output requests issued from the resource manager as the timing of the input/output request. Furthermore, the first cue control section of each of the channel adapters may obtain an inquiry whether or not an input/output request can be accepted to the resource manager at a constant time interval and an acceptable response, thereby fetching the input/output requests sent from the hosts which are stored in the first cue table to give a request for a processing to the resource manager.

The second cue control section provided in the resource manager sets a limit to the number of inputs/outputs of the hosts which can be stored in the second cue table, accepts the input/output requests from the channel adapter which is less than the limited number and stores them in the second cue table, and rejects acceptance of the input/output requests sent from the channel adapter which is equal to or more than the limited number and stores them in the first cue table in the channel adapter. In this case, the second cue control section provided in the resource manager may calculate a busy ratio of the second cue table, increases the limited number of the input/output requests which can be cued if the busy ratio is increased, and decreases the limited number of the input/output requests which can be cued if the busy ratio is reduced. The busy ratio is a value obtained by dividing the number of all the input/output requests cued at the present time by the maximum number of the input/output requests which can be cued. Consequently, the number of the input/output requests which can be cued from each channel adapter to the resource manager can be dynamically changed corresponding to the degree of the processing of the input/output requests through the resource manager. Thus, the cuing on the channel adapter side can avoid the full and the overtime of the input/output request sent from the hosts.

In the device controller according to the present invention, moreover, the first cue control section of the channel adapter and the second cue control section of the resource manager control the first cue table of the channel adapter and the second cue table of the resource manager in a section of a physical device.

The present invention further provides a device control method in which a device controller for connecting a plurality of various hosts to a device is provided with a plurality of channel adapters for accepting an input/output request from a host, a plurality of device adapters for issuing an input/output request to the device, and a resource manager for carrying out whole input/output control from the host between the channel adapters and the device adapters, and the input/output requests from the hosts to the physical device are processed, comprising:

a first cue control step of storing the input/output request sent from the host which is accepted in the channel adapters in a first cue table provided in each of the channel adapters and issuing, to the resource manager, the input/output request sent from the host which is stored in the first cue table; and a second cue control step of storing the input/output request sent from the host which is issued from the channel adapter in a second cue table of the resource manager and issuing, to the device adapter, the input/output request sent from the host which is stored in the second cue table.

Detection of Sequential Input/Output Request

The present invention provides a device controller to be operated in such an environment that an input/output request of an application of a host is distributed to a plurality of device drivers for taking a load balance through a processing distribution driver and an input/output request to which each of the device drivers is allocated is issued, comprising a sequential detecting table for storing an address and a data length of the input/output request received from the host, and a sequential detecting section for predicting a next address if a new input/output request is received and is a sequential input/output request based on an address and a data length of an input/output request registered in the sequential detecting table and for comparing the next address with an address of the new input/output request to recognize presence of sequential. Consequently, even if the sequential input/output requests of the host application are separated by the distribution processing of taking the load balance of the paths through the processing distribution driver and are issued to the device controller, it is possible to recognize the sequential input/output request on the device controller side and to implement an effective operation mode for the sequential input/output requests such as a prefetch operation or plural area simultaneous read and write. The sequential detecting section finds a prediction address obtained by adding a data length to an address of the input/output request registered in the sequential detecting table as a next prediction address if the input/output request is sequential, and recognizes the input/output request to be a sequential input/output request if the prediction address is identical to the address of the new input/output request. Moreover, the sequential detecting section calculates, as a next prediction address of the sequential input/output request, a plurality of prediction addresses having a value obtained by sequentially multiplying a data length by 1 to the number n of channel paths and adding a value thus obtained for an address of an input/output request registered in the sequential detecting table, that is, prediction address=address+data length×(1 to n) when the number of the channel paths with the host is n, and recognizes the sequential input/output request if it is decided that any of the prediction addresses is identical to the address of the new input/output request. Consequently, the following is considered. More specifically, in the case in which the sequential input/output requests are not distributed to specific channel adapters through the processing distribution driver but to other channel adapters, a next input/output request is not always sequential for one channel adapter but an input/output request after the next comes to the same channel adapter, for example.

Moreover, each of the channel adapters for recognizing the sequential input/output is provided with a plurality of sequential detecting tables corresponding to the sequential input/output requests when a plurality of sequential input/output requests are operated in the host application at the same time in an environment of the host, and the sequential detecting section detects a sequential multiple operation by sequentially referring to the sequential detecting tables. In this case, the sequential detecting section stores an address and a data length of a new input/output request in the sequential detecting table used for recognizing the sequential when recognizing a new input/output request to be sequential by referring to any of the sequential detecting tables. Consequently, also in the case in which the sequential input/output requests are operated in a plurality of host applications at the same time, the multiple operation of the sequential input/output requests for the table can be recognized by causing the channel adapters to have the sequential detecting tables corresponding to the sequential input/output requests.

In the device controller according to the present invention, basically, each of the channel adapters for receiving an input/output request issued from each device driver of the host is provided with the sequential detecting table and the sequential detecting section. According to another configuration, in the device controller according to the present invention, a common table for sequential detection for collectively storing a set of an address and data of the input/output request sent from the host is provided in a common area to which the channel adapters can refer, and presence of sequential of a new input/output request is recognized in the sequential detecting section of the channel adapter with reference to the common table for sequential detection. Furthermore, the sequential detecting section obtains a prediction address obtained by adding a data length to an address of an input/output request registered in the sequential detecting table as a next prediction address when an input/output request is sequential, and recognizes the input/output request to be a sequential input/output request if the prediction address is not decided to be identical to an address of a new input/output request but has an approximation. In consideration of the case in which the data length of the sequential data created in the host application is variable, consequently, a new input/output request is recognized to be sequential if the address of the new input/output request is not identical to the prediction address calculated from the address and the data length in the sequential detecting table but has an approximation. For example, if the prediction address is:

prediction address=address 2000+data length 5=2005, and the address of the new input/output request has an approximation of:

2000<new address<2005, the new input/output request is recognized to be a sequential input/output request.

Redundancy of Path

The present invention provides an input/output system having redundancy in which a device is connected to a host through a device controller, an input/output request of a host application in the host is usually issued to a device driver of an operation system path through a path switching driver, use of a fault operation system path is stopped through the path switching driver to transfer issuance of an input/output request to a device driver of a standby system path when a fault is generated on the operation system path, wherein a standby system path confirming section for issuing a path confirmation command is provided under the device driver of the standby system path in order to confirm that the standby system path is normally operated or not in the host. During the normal operation in which the input/output request is issued to the operation system path, therefore, it is possible to ascertain whether or not a command is issued to the standby system path and the standby system path is normally operated. Even if a fault is generated in the standby system path, the fault can be confirmed. Therefore, a proper countermeasure such as repair can be taken and the operation of the standby system can be guaranteed when the operation system has a fault and the processing is transferred to the standby system. The standby system path confirming section issues, as the path confirmation command, a command for confirming all path functions including data transfer in a read direction and data transfer in a write direction in the standby system path at a constant time interval. By issuing the command for confirming all the functions of the standby system path, thus, the operation of the standby system can be guaranteed reliably. Moreover, the standby system path confirming section may issue a command for maintaining a state of control information of the device controller as the path confirmation command. As a command for maintaining the state of control information of the device controller, for example, a state notice command is issued and a response of a fault notice command is given from the device controller. By issuing the state notice command for a system error as the path confirmation command, thus, the state notice command originally issued from the operation system path due to a system error can be replaced with the standby system path in addition to the confirmation of the operation of the standby system path. Correspondingly, there is an advantage that the ratio of use of the operation system path can be reduced. Moreover, the standby system path confirming section may issue a part of a normal command to be issued to the operation system path as the path confirmation command to the standby system path. For example, the operation of the standby system path can be confirmed by issuing a command to the standby system path every 100 times. In this case, any command may be issued to the standby system path. By issuing a part of the normal command of the operation system to the standby system for the purpose of path confirmation, thus, there is an advantage that the command to be used for the confirmation of the standby system path does not become an unnecessary overtime of the device controller differently from the case in which a special path confirmation command is issued to the standby system path. Moreover, the standby system path confirming section issues a cross check command for checking that data written to an operation system path can be read through a standby system path or not or data written to the standby system path can be read through the operation system path or not at a constant time interval, thereby confirming system integrity. By carrying out the cross check for checking that data written to the operation system path can be read through the standby system path or not or data written to the standby system path can be read through the operation system path or not at a constant time interval, it is also possible to confirm the integrity of a data sharing system itself in addition to the confirmation of the operation of the standby system path.

Reserve Control and Fault Path Switching

The present invention provides an input/output system for connecting a physical device to a host through a device controller, usually issuing an input/output request of a host application in the host to a device driver of an operation system path through a path switching driver, and stopping use of a fault operation system path through the path switching driver to transfer issuance of an input/output request to a device driver of a standby system path when a fault is generated on the operation system path, wherein cooperation with reserve control is properly carried out. For this purpose, a reserve control section provided in the host issues a command for releasing the reserve to the standby system path if the host application has already reserved a physical device through the operation system path when the issuance of the input/output request to the standby system path is transferred. Corresponding to the reserve control section on the host side, the reserve control section provided in the device controller releases a reserve state of a physical device which has already been maintained through the operation system path when receiving a command for releasing the reserve from the standby system path. Consequently, even if the host application has already reserved the specific physical device by the operation system path when the processing is transferred to the standby system path due to the fault of the operation system path, the reserve state of the physical device through the existing operation system path can be released by the reserve release command sent from the standby system path to be a destination and the reserve state of the specific physical device can be rebuilt newly by the subsequent standby system path. Also in the case in which the processing distribution driver is provided in the host to take the load balance of the paths, the reserve state can be rebuilt even if the processing is similarly transferred to another path in such a state that the reserve state of the device is established. First of all, the present invention provides an input/output system for connecting a physical device to a host through a device controller, distributing a host application input/output request to a plurality of paths in order to take a load balance through a processing distribution driver in the host, stopping use of a fault path through the processing distribution driver to distribute an input/output request to another path when a fault is generated in a specific path, and furthermore, stopping a distribution processing of the processing distribution driver to issue a reserve command to a device driver of another specific path when a reserve command is issued from a high order host application to the processing distribution driver, and then restarting the distribution processing of the processing distribution driver when a reserve release command is issued from the high order host application. Referring to the input/output system according to the present invention, a reserve control section provided in the host issues a command for releasing the reserve from another path if the host application has already reserved the physical device through the fault path when the use of the fault path is stopped and the processing is transferred to another path. Corresponding to the reserve control section, a reserve processing section is provided in the device controller to release the reserve state of the physical device which has already been maintained through the fault path when receiving a command for releasing the reserve from another path.

Countermeasure Against Path Failure of Processing Distribution for Plural Paths

The present invention provides an input/output system for connecting a device to a host through a device controller and distributing an input/output request of a host application in the host to a device driver of an operation system of a plurality of paths through a processing distribution driver, thereby implementing a load balance. Referring to the input/output system according to the present invention, thus, the host connects a device driver of a standby system to the processing distribution driver, and uses the device driver of the standby system to implement a load balance through device drivers of a plurality of paths which is equivalent to that obtained before generation of a fault when the fault is generated in one path of the device driver of the operation system. Moreover, the device controller sets an ID related with a specific physical device to each of channel adapters of a plurality of paths of the operation system and a channel adapter of one path of the standby system and the channel adapter gives an access to a physical device related with the ID from the host in response to an input/output request having the same ID as the set ID. Consequently, in the case in which one path of the device driver of the operation system causes a fault, the device driver of the standby system can be used as a new path in place of the fault path and the same number of paths as that obtained before the generation of the fault can be maintained to implement the same load balance, and a path bottleneck is not generated. Moreover, the present invention is intended for an input/output system comprising a processing distribution driver for connecting a physical device to hosts having at least two systems through a device controller, and distributing an input/output request of a host application provided in each of the hosts to device drivers of an operation system on a plurality of paths to implement a load balance. In this case, the present invention is characterized in that each of the hosts connects a device driver of a standby system to the processing distribution driver and uses the device driver of the standby system to implement a load balance through device drivers on a plurality of paths which is equivalent to that obtained before a fault is generated when the fault is generated in one path of the device driver of the operation system. Moreover, the device controller is provided with channel adapters of a plurality of paths of the operation system for each of the systems of the hosts and with a channel adapter of the standby system for accepting two paths of the standby system of each of the hosts through one path of a sharing standby channel, an ID related with a specific physical device for each system is set to the channel adapter of the operation system, two IDs related with a physical device of each system are set to the channel adapter of the standby system, and the channel adapter gives an access from the host to the physical device related with the ID in response to an input/output request having the same ID as the set ID. In the case in which one path of the device driver of the operation system causes a fault, consequently, each host system uses the path of the device driver of the standby system so that the same number of paths as that obtained before the generation of the fault can be maintained and the same load balance can be implemented. Furthermore, the channel adapter of the standby system of the device controller is shared by one path for two paths of the standby system in each host system. Therefore, there is an advantage that the number of the channel adapters of the standby system can be decreased and the effective utilization of the resource can be implemented.

Optimization of Channel Transfer Rate

The present invention provides an input/output system to be operated in such an environment that one host adapter on a host side is connected to a plurality of channel adapters of a device controller through a fiber channel, wherein when a transfer rate of the channel adapter is lower than a transfer rate of the host adapter, a plurality of operation requests on the host side are distributed to the channel adapters through a processing distribution driver. Consequently, even if the transfer rate of the channel adapter on the device controller side is low, the host adapter on the host side can be maintained to have a high transfer rate. Moreover, the present invention provides an input/output system to be operated in such an environment that a plurality of host adapters on a host side are connected to one channel adapter of a device controller through a fiber channel, wherein when a transfer rate of the host adapter is lower than a transfer rate of the channel adapter, a plurality of operation requests on the host side are distributed to the host adapters through a processing distribution driver, and an access is given to the channel adapter from the host adapters. Consequently, even if the transfer rate of the host adapter on the host side is low, the channel adapter on the device controller side can be maintained to have a high transfer rate. Furthermore, the present invention provides an input/output system to be operated in such an environment that a plurality of host adapters on a host side are connected to one channel adapter of a device controller through a fiber channel, wherein a table for managing any host adapter and any channel adapter which are being used is provided, a distribution processing driver or a device driver sets "used" to a resource of the table during a command processing and sets "empty" when the command processing is ended, and the processing distribution driver retrieves, from the table, a combination of the host adapter and the channel adapter which are empty and uses the combination, thereby issuing a command to give an access to a physical device. By managing the empty situations of the host adapter on the host side and the channel adapter on the device controller side, thus, it is possible to flexibly select a path sent from the host for the device controller and to efficiently utilize the resource, thereby contributing to an enhancement in performance. Moreover, the present invention provides an input/output system to be operated in such an environment that a plurality of host adapters on a host side are connected to one channel adapter of a device controller through a fiber channel, wherein a table for managing any host adapter and any channel adapter which are being used is provided, a distribution processing driver or a device driver sets "used" and the number of cues of a cue table provided for each resource to the resource of the table during a command processing and sets "empty" or the number of cues which is decreased by one when the command processing is ended, and the processing distribution driver retrieves, from the table, a combination of the host adapter and the channel adapter which are empty and uses the combination, thereby issuing a command to give an access to a physical device, and retrieves a combination of the host adapter and the channel adapter which has the smallest number of cues and uses the combination when the table is not empty, thereby issuing a command to give an access to the physical device. By adding the number of cues of the cue table provided for each resource as well as "used and "empty" of information in the table managed by the distribution processing driver, thus, the distribution processing driver carries out a processing to execute a command for a resource having the smallest number of cues, thereby efficiently utilizing the resource and enhancing the performance.

BRIEF DESCRIPTION OF THE DRAWINGS

FIGS. 1A and 1B are block diagrams using a device controller according to the present invention in which distribution cue control is carried out;

FIG. 4 is a diagram illustrating a cue full report table provided in the resource manager shown in FIGS. 1A and 1B;

FIGS. 5A and 5B are time charts showing a device control processing in FIGS. 1A and 1B;

FIG. 6 is a flow chart showing a control processing for the channel adapter in FIGS. 1A and 1B;

FIG. 10 is a flow chart showing the storage decision processing for the cue table in FIG. 8 based on a busy ratio;

FIGS. 11A and 11B are block diagrams showing the device controller according to the present invention which recognizes a sequential input/output request to be distributed into a plurality of paths;

FIGS. 12A and 12B are flow charts showing a sequential detection processing through a channel adapter in FIGS. 11A and 11B;

FIGS. 13A and 13B are block diagrams showing the device controller according to the present invention which recognizes a plurality of sequential inputs/outputs distributed into a plurality of paths;

FIGS. 14A and 14B are block diagrams showing the device controller according to the present invention in which a sequential detection table is shared;

FIGS. 16A and 16B are block diagrams showing an input/output system according to the present invention which confirms the operation of a standby system path in which the path has a redundancy;

FIGS. 17A and 17B are functional block diagrams for reserve control when a conversion to the standby system path is carried out through a path switching driver when a fault is generated on the operation system path;

FIG. 18 is a diagram illustrating a reserve release management table provided in the device controller of FIGS. 17A and 17B;

FIGS. 19A and 19B are time charts showing fault path switching and reserve control processings in FIGS. 17A and 17B;

FIGS. 20A and 20B are functional block diagrams showing reserve control to be carried out when using a processing distribution driver;

FIGS. 22A and 22B are block diagrams showing the input/output system according to the present invention in which the device driver of the standby system is provided in the processing distribution driver;

FIG. 23 is a diagram illustrating an ID management table provided in the device controller of FIGS. 22A and 22B;

FIG. 26 is a diagram illustrating a management table provided in a processing distribution driver and the device driver in FIGS. 25A and 25B;

FIGS. 27A and 27B are block diagrams showing the input/output system according to the present invention in which the path transfer rate is optimized in the case in which the transfer rate on the host side is low and that on the device controller side is high;

FIG. 28 is a diagram illustrating a management table provided in the processing distribution driver of FIGS. 27A and 27B;

FIGS. 29A and 29B are block diagrams showing the input/output system according to the present invention in which the empty states of the host adapter on the host side and the channel adapter on the controller side are managed to dynamically select a path;

FIG. 30 is a diagram illustrating a path management table provided in the processing distribution driver of FIGS. 29A and 29B;

FIGS. 31A and 31B are block diagrams showing the input/output system according to the present invention in which the empty states of the host adapter on the host side and the channel adapter on the device controller side and the number of cues are managed to dynamically select a path; and FIG. 32 is a diagram illustrating a path management table provided in the processing distribution driver of FIGS. 31A and 31B.

BEST MODE FOR CARRYING OUT THE INVENTION DISTRIBUTION CUE CONTROL

Figure 2:
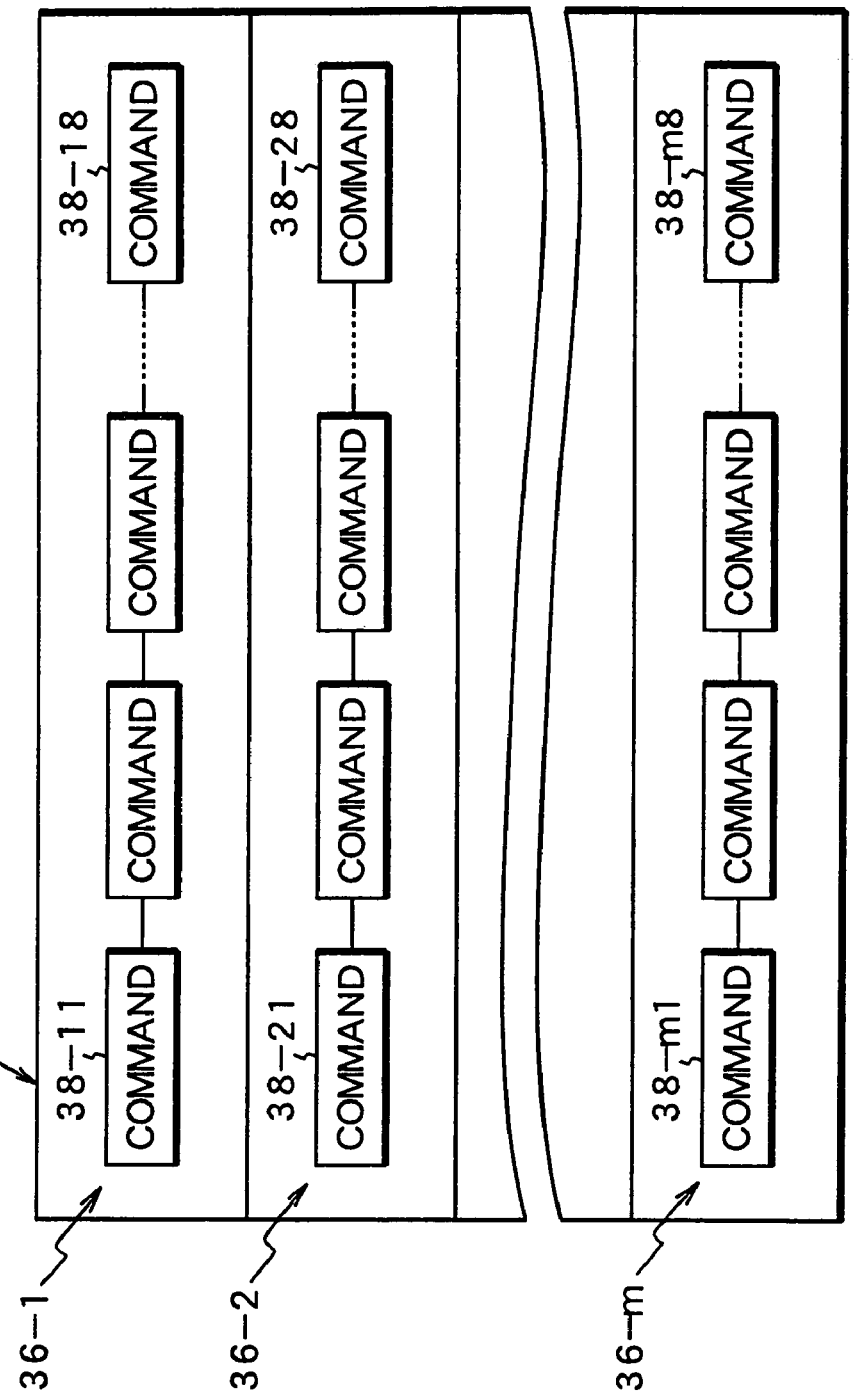
FIG. 2 is a diagram illustrating a cue table provided in a channel adapter shown in FIGS. 1A and 1B.

FIGS. 1A and 1B are block diagrams showing a computer system comprising a device controller according to the present invention in which distribution cue control is carried out. A main frame 12, various hosts 14, and furthermore, an open system host 16 are connected to a device controller 10 according to the present invention, and a command for an input/output request to physical devices 18-1 to 18-m connected to the device controller 10 is accepted and processed. The device controller 10 is constituted by channel adapters 20-1 to 20-n, a resource manager 22 and device adapters 24-1 to 24-m. More specifically, the device controller 10 is provided with the channel adapters 20-1 to 20-n for ports which are physically connected from each host of the main frame 12, the host 14 and the open system host 16, and a command of an input-output request sent from each host is analyzed by the channel adapters 20-1 to 20-n and is subjected to cuing if necessary and is then transferred to the resource manager 22. The resource manager 22 cues the command of the input/output request sent from the channel adapter 20-1 to 20-n side and then issues a command subjected to the cuing to the device adapter 24-1 to 24-m side sequentially. The device adapters 24-1 to 24-m issue the command of the input-output request sent from the resource manager 22 to the corresponding device 18-1 to 18-m side and returns a response to the resource manager 22. The control operation of the resource manager 22 implies the exclusive management of an input/output in the control of the device operation and the cue management of a command to the device side, and furthermore, array control is carried out if the devices 18-1 to 18-m form a disk array. Referring to such a device controller 10 in the present invention, the channel adapters 20-1 to 20-n are provided with cue control sections (first cue control sections) 26-1 to 26-n and cue tables (first cue tables) 28-1 to 28-n respectively. In the same manner as in the conventional art, moreover, the resource manager 22 is provided with a cue control section (second cue control section) 30 and a cue table (second cue table) 32, and furthermore, a cue full report table 34 is provided corresponding to the provision of the cue control sections 26-1 to 26-n on the channel adapters 20-1 to 20-n side in the present invention. In the device controller 10 according to the present invention, thus, the function of the cue control is distributed and provided in each of the channel adapters 20-1 to 20-n in addition to the cue control of the resource manager 22. Consequently, the commands of input/output requests sent from the hosts are once stored in the channel adapter 20-1 to 20-n side and some of them are sent to the resource manager 22 and a command is issued to the device adapters 24-1 to 24-m based on the cue control. Also in the case in which the commands of the input/output requests are simultaneously issued from a plurality of hosts to the device controller 10, consequently, the cuing of the resource manager 22 gives an overtime so that the bottleneck of the control processing can be avoided. In the open system host 16, a processing distribution driver 52 is provided subsequently to the host application 50, and the processing distribution driver 52 issues commands distributed into plural paths of device drivers 54-1 to 54-i positioned in a lower part to take a load balance for the input/output request sent from the host application 50. Host adapters 56-1 to 56-i are provided subsequently to the device drivers 54-1 to 54-i to build a plurality of channel paths between the channel adapters 20-3 to 20-n of the device controller 10.

FIG. 2 shows the structure of the cue table 28-1 of the channel adapter 20-1 provided in the device controller 10 of FIGS. 1A and 1B. The cue table 28-1 to be the first cue table which is provided in the channel adapter 20-1 is divided into table areas 36-1 to 36-m corresponding to the physical devices 18-1 to 18-m. In the table areas 36-1 to 36-m, for example, the table area 36-1 corresponding to a head device 18-1 can store a plurality of commands sent from the host and can store eight commands 38-11 to 38-18 at a maximum as shown. In this respect, table areas 38-28 to 38-m8 corresponding to the devices 18-2 to 18-m carry out the same processing.

Figure 3:
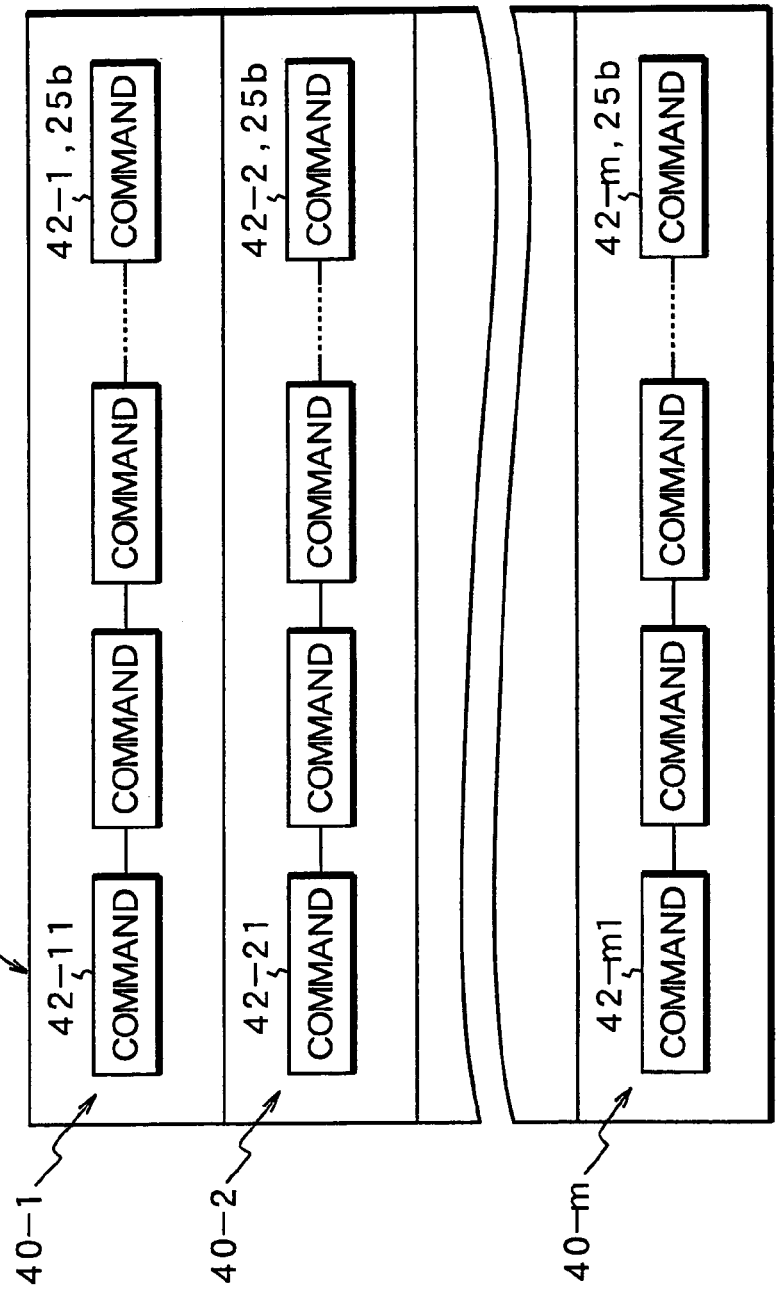
FIG. 3 is a diagram illustrating a cue table provided in a resource manager shown in FIGS. 1A and 1B.

FIG. 3 shows the structure of the cue table 32 to be the second cue table provided in the resource manager 22 of FIGS. 1A and 1B. In the same manner as the cue table 26-1 of the channel adapter shown in FIG. 3, the cue table 32 of the resource manager 22 is also divided into table areas 40-1 to 40-m corresponding to the physical devices 18-1 to 18-m. Referring to the table areas 40-1 to 40-m, for example, the head table area 40-1 can store 256 commands 42-11 to 42-1, 256 at a maximum which are the input/output requests from the host as shown. This respect is the same as in the residual table areas 40-2 to 40-m.

FIG. 4 shows the structure of the cue full report table 34 provided in the resource manager 22 of FIGS. 1A and 1B. The cue full table 34 registers information about "cue full reported" indicating the completion of a cue full report for the channel adapter which rejects the acceptance of a command when the command cued on the channel adapter 20-1 to 20-n side is issued and cue full is caused on the resource manager 22 side to reject the acceptance. For this reason, the cue full report table 34 is divided into table areas 44-1 to 44-m corresponding to the physical devices 18-1 to 18-m in FIG. 1A. By taking, as an example, any of the table areas 44-1 to 44-m which corresponds to the head device 18-1, data areas 48-11 to 48-1n are provided for channel adapter numbers 46-11 to 46-1n corresponding to the channel adapters 20-1 to 20-n in FIGS. 1A and 1B, respectively. For example, in the case in which the rejection of the acceptance for the command issuance is carried out for the channel adapter 20-2 in FIGS. 1A and 1B through the resource manager 22, "cue full reported" is stored as information indicating that cue full report has been given is stored in the data area 48-2, for example. As a matter of course, the information of "cue full reported" to be stored in the data areas 44-11 to 44-1n may be ON/OFF of a flag or the like and a proper code indicating that the cue full has been reported. Such a structure of the table area 44-1 is the same as that of each of the residual table areas 44-2 to 44-m.

Figure 5B:
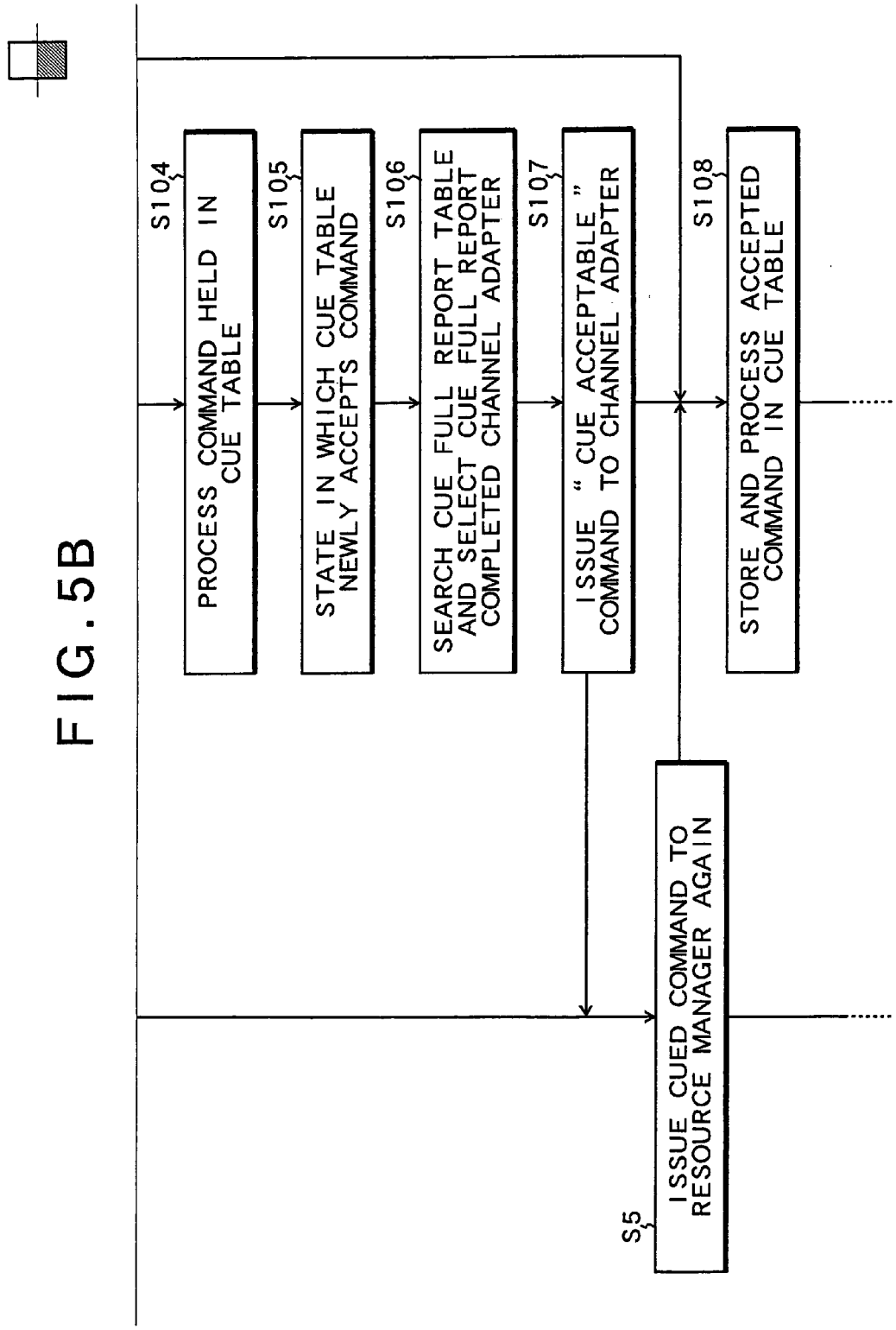

FIGS. 5A and 5B are time charts showing a control processing between the channel adapter and the resource manager which are provided in the device controller 10 of FIGS. 1A and 1B. For simplicity of the description, a control processing between the channel adapter 20-1 and the resource manager 22 is taken as an example. When a command is accepted from a host at Step S1 in the channel adapter 20-1, the cue control section 26-1 carries out cuing in which the accepted command is stored in its own cue table 28-1. Subsequently, the cue control section 26-1 of the channel adapter 20-1 issues a command to the resource manager 22 at Step S3 and it is inquired whether or not the command sent from the host can be accepted on the resource manager 22 side. A timing in which it is inquired whether or not the command can be accepted on the resource manager 22 side has a constant time interval which will be apparent in the following description or the inquiry is carried out when the report of end of a command which has already been issued is given from the resource manager 22. The resource manager 22 accepting the command issuance at the Step S3 of the channel adapter 20-1 checks that the command can be accepted or not as in Step S101. If the command can be accepted, the processing proceeds to Step S108 where the command is accepted and the command thus accepted is stored in the cue table 32 and is then processed. On the other hand, in the case in which an unprocessed command stored in the cue table 32 satisfies a predetermined condition and the command acceptance cannot be carried out, the processing proceeds to Step S102 where cue full is reported to the channel adapter 20-1 to be a request source. Upon receipt of the report of cue full from the resource manager 22, the channel adapter 20-1 cues the command to the cue table 28-1 again at Step S4. The resource manager 22 gives the cue full report to the channel adapter 20-1 at Step S103 and the cue full report table 34 is then updated at the Step S103. More specifically, in the cue full report table 34 in FIG. 4, an updating processing of writing the "cue full reported" to the data area 48-m1 having the channel adapter number 46-m1 of the table area 44-m corresponding to the device 18-m which is an object of the command is carried out, for example. At Step S104, next, a command processing of sequentially fetching the accepted commands held in the cue table 32 and transferring the commands to any of the device adapters 24-1 to 24-m in an object area is carried out. By the issuance of the command to the device adapter side, the cue table 32 is brought into such a state that a command is newly accepted as in Step S105. At Step S106, the resource manager 22 searches the cue full report table 34 and selects the channel adapter to which the cue full has been reported. At this time, in the case in which the cue full has been reported to only the channel adapter 20-1, for example, the channel adapter 20-1 is selected as a channel adapter to which the cue full has been reported, and a cue acceptable command is issued to the channel adapter 20-1 selected at Step S107. The channel adapter 20-1 receiving the cue acceptable command from the resource manager 22 issues a corresponding command which has been cued at Step S5 to the resource manager 22 again. The resource manager 22 accepts the command issued again at Step S108, and the accepted command is stored in the cue table 32 and is given to the input/output request processing for the device. If a plurality of cue full report completed channel adapters are selected in the same device area by the search of the cue full report table 34 in the Step S106, a cue full report completed channel adapter which is the oldest on a time basis is selected and a cue acceptable command is issued.

FIG. 6 is a flow chart showing a channel adapter processing in each of the channel adapters 20-1 to 20-n in FIGS. 1A and 1B which execute the processing together with the resource manager 22 as shown in FIGS. 5A and 5B. The channel adapter first checks the presence of command receipt from the host at Step S1 and stores the command received from the host in its own cue table at Step S2. As a matter of course, the processing of Step S2 is skipped to proceed to Step S3 if the command is not received. At the Step S3, the passage of a predetermined constant time is checked. After the constant time passes, the processing proceeds to Step S4 where the command stored in the cue table is fetched and is issued to the resource manager and it is inquired whether or not the command can be accepted. In this case, the command is fetched from the cue table when one command is to be fetched and issued at each time or a plurality of predetermined commands are simultaneously fetched and issued. For the inquiry to the resource manager by the command issuance at the Step S4, the presence of a cue full report is checked at Step S5. If there is no cue full report, the command can be accepted. Therefore, the processing proceeds to Step S8 where the command stored in the cue table is issued to the resource manager 22. When the cue full report of acceptance rejection is received from the resource manager at the Step S5, a corresponding command is stored in the cue table again at Step S6. At Step S7, the presence of a cue acceptable command indicative of command acceptable from the resource manager is checked. If the cue acceptable command is decided from the resource manager at the Step S7 after it is stored again in the cue table, the processing proceeds to Step S8 where the command stored in the cue table is issued and transferred to the resource manager again. The processings of the Steps S1 to S8 are repeated by interruption based on a predetermined time cycle until an end indication is sent at Step S9.

Figure 7:
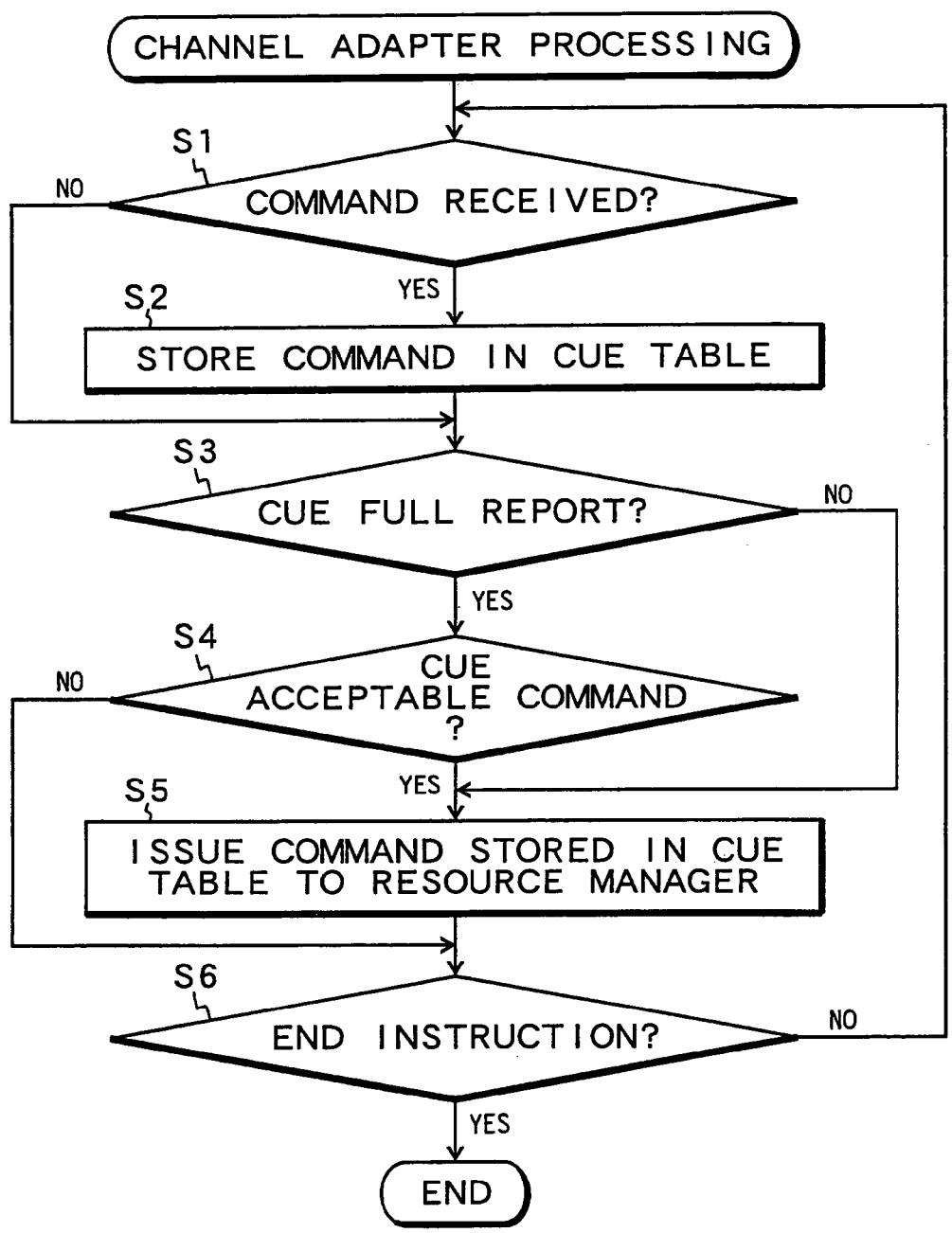
FIG. 7 is a flow chart showing another control processing for the channel adapter in FIGS. 1A and 1B.

FIG. 7 is a flow chart according to another embodiment of the channel adapter control processing in FIGS. 1A and 1B. In the channel adapter processing of FIG. 6, a command acceptance is inquired on the resource manager side for each constant time at the Step S3. The processing of FIG. 7 is characterized in that a new command is issued to the resource manager in a timing in which the end report of the command which has already been issued from the resource manager is received. At the Step S1, when a command is received from a host, the command received at the Step S2 is stored in the cue table. Subsequently, the presence of the cue full report from the resource manager is checked at the Step S3 and the processing proceeds to the Step S6 if there is no cue full report where the command sorted in the cuing table is issued to the resource manager in one or plural units. On the other hand, if the cue full report is given at the Step S3, the presence of the cue acceptable command of the resource manager is checked at the Step S4. When a command sent from the host which has already been accepted is issued to the device adapter side, one or more cue tables become empty so that the command acceptable state is brought in the resource manager. Consequently, the cue acceptable command is issued to the report completed channel adapter with reference to the cue full report table. Accordingly, if the cue acceptable command is issued at the Step S4, the end report of the command which has already been issued can be recognized and the processing proceeds to the Step S5 where the command stored in the cue table is issued to the resource manager in one or plural units. The processings of the Steps S1 to S5 are repeated by interruption in a predetermined time cycle or the like until an end designation is given at the Step S6.

FIGS. 8A and 8B are flow charts of the control processing of the resource manager 22 in FIGS. 1A and 1B. The resource manager 22 checks the presence of command receipt from the channel adapter side at Step S1 and executes a storage and decision processing of the cue table at Step S2 when the command is received. The details of the storage and decision processing will be apparent in the following description. As a result of the storage and decision processing, if there is no cue full at Step S3, the processing proceeds to Step S4 where the accepted command is stored in the cue table 32. If the cue full is set at the Step S3, the processing proceeds to Step S5 where the cue full is reported to the channel adapter to be an issue source to update the cue full report table 34. Subsequently, if the device adapter side is empty at Step S6, the command of the cue table 32 is issued to the empty device adapter at Step S7. A state in which the command can be accepted from the channel adapter is brought by the command issuance to the device adapter side. At Step S8, consequently, the cue full report table 34 is searched. If there is a cue full report destination at Step S9, the cue acceptable command is issued to the channel adapter to be a report destination at Step S10. The processings of the Steps S1 to S10 are repeated until an end designation is given at Step S11.

Figure 8:
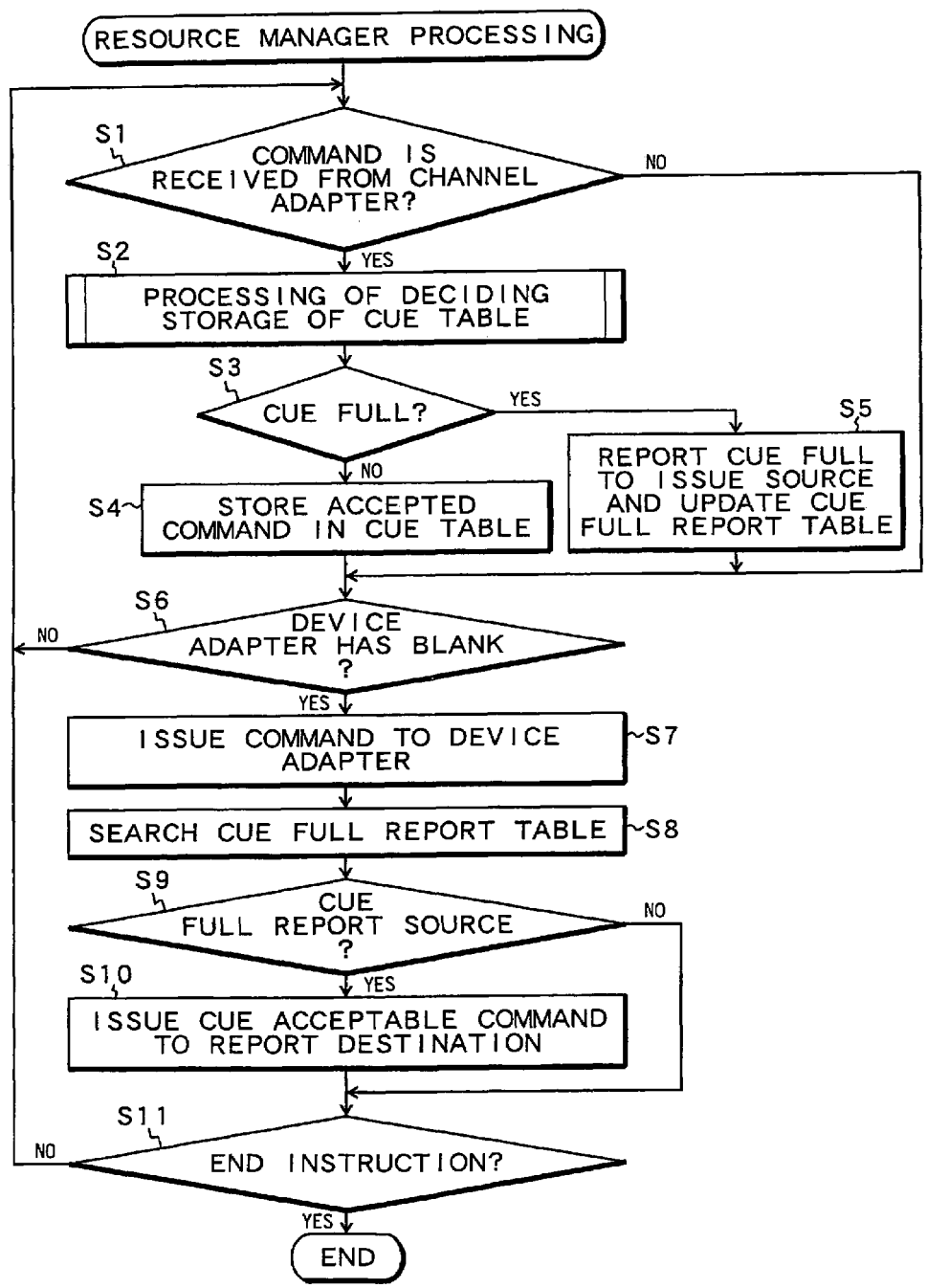
FIG. 8 is a flow chart showing a control processing for the resource manager in FIGS. 1A and 1B.
Figure 9:
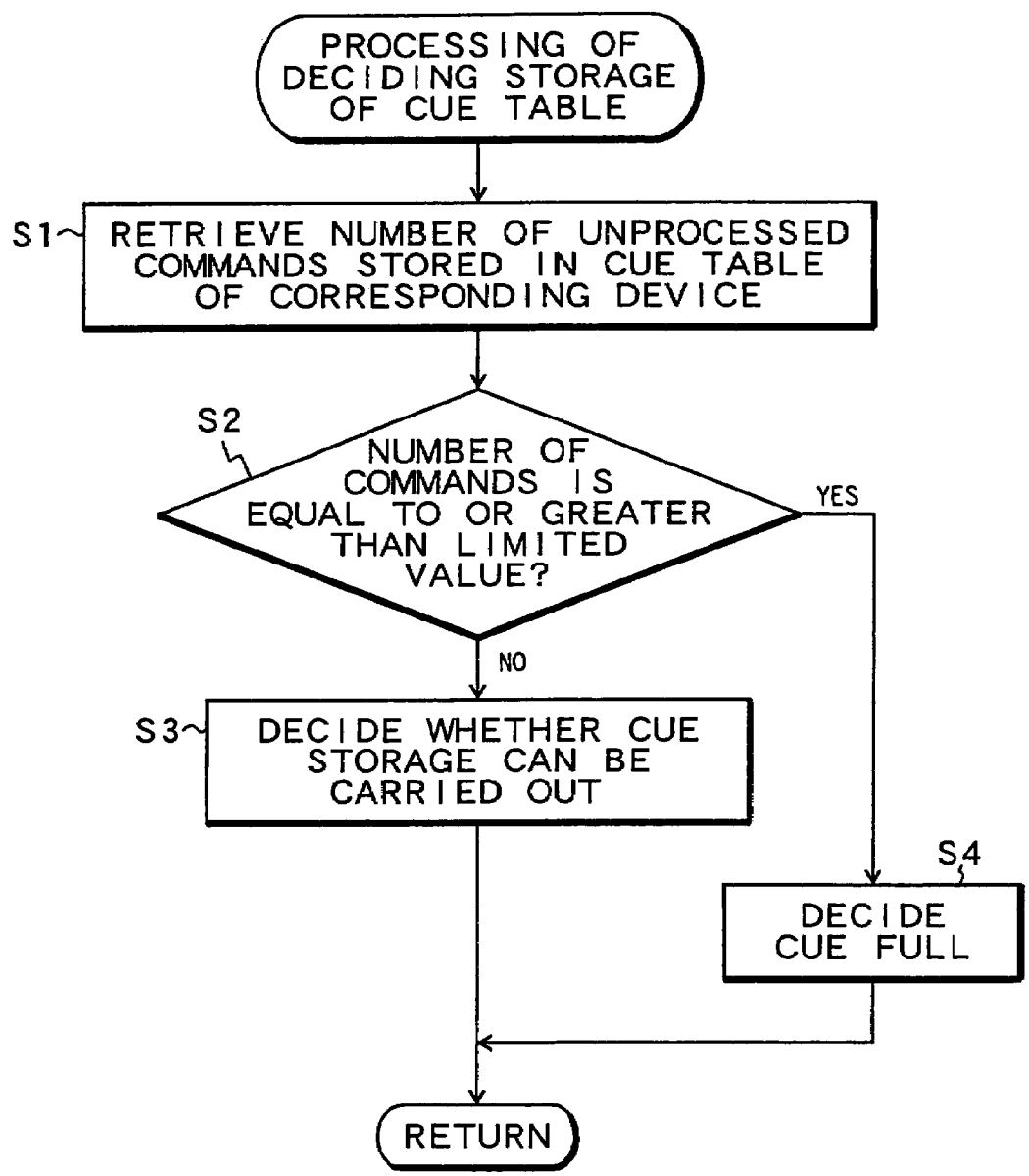
FIG. 9 is a flow chart showing a cue table storage decision processing in FIG. 8.

FIG. 9 is a flow chart showing a cue table storage and decision processing in the Step S2 of FIG. 8. In the cue table storage and decision processing, the number of unprocessed commands which are stored in the cue table of a corresponding device is retrieved at the Step S1 and it is checked that the number of commands thus retrieved is equal to or more than a predetermined limit value or not at Step S2. If the number of unprocessed commands is less than the limit value, it is decided that cue storage can be carried out at the Step S3. On the other hand, if the number of the unprocessed commands is equal to or more than the limit value at the Step S2, the cue full is decided at the Step S4.

FIG. 10 shows another embodiment of the cue table storage and decision processing at the Step S2 in FIG. 8. The decision processing is characterized in that the limited number of acceptances of the host to the cue table 32 of the recourse manager 22 is dynamically changed based on the busy ratio of the cue table 32. More specifically, when the number of unprocessed commands which are stored in the cue table of a corresponding device is retrieved at Step S1, the processing proceeds to Step S2 where the number of unprocessed and stored commands is divided by the maximum value of the number of commands which can be stored in the cue table, thereby calculating a busy ratio. At Step S3, subsequently, it is checked that the busy ratio is reduced or not. If the busy ratio is reduced, the command acceptance has a margin so that the limited number of the commands to be cued is increased at Step S4. To the contrary, if the busy ratio is increased, the cuing has no margin and the limited number of the commands to be cued is decreased at Step S5. In this way, it is decided whether or not the number of unprocessed commands sent from the command accepted at this time is equal to or more than a limited value at Step S6 on the basis of the limited value of the commands which is increased or decreased at the Step S4 based on the busy ratio. If the number is less than the limited value, it is decided that the cue storage can be carried out at Step S7. If the number is equal to or more than the limited value, the cue full is decided at Step S8. As a result, the limited value of the number of commands received from the cue tables 28-1 to 28-n of the channel adapters 20-1 to 20-n is changed based on the busy ratio indicative of the situation of the actual storage of the cue table 32. Consequently, the command can be processed more efficiently than the case in which the limited number is set fixedly. In particular, in the case in which the command is efficiently issued from the resource manager 22 to the device side and the vacancy of the cue table of the resource manager 22 is decreased so that the busy ratio is reduced, the limited number is dynamically increased so that the commands cued on the channel adapter 20-1 to 20-n side can be transferred efficiently to the cue table 32 of the resource manager and it is possible to prevent such a situation that the curing on the channel adapter 20-1 to 20-n side becomes a bottleneck due to an overtime.

Recognition of Sequential Input/Output Request

As shown in FIGS. 1A and 1B, the device controller 10 according to the present invention is also connected to the open system host 16 in various hosts. FIGS. 11A and 11B are block diagrams showing the case in which the device controller 10 according to the present invention is connected to the open system host 16 in FIGS. 1A and 1B. Input/output requests given from host applications 50-1 and 50-2 provided in the open system host 16 are distributed into the device drivers 54-1 to 54-n through the distribution processing driver 52 to take a load balance, and issue the commands for the input/output requests distributed into the channel adapters 20-1 to 20-n of the device controller 10 through the respective host adapters 56-1 to 56-n. By the distribution of the input/output request sent from the host application through the distribution processing driver 52, it is possible to employ such a structure that the bottleneck of a path for connecting the open system host 16 and the device controller 10 is decreased. In the case in which the input/output requests are distributed into a plurality of paths through the distribution processing driver 52, however, there is one problem. In other words, it is impossible to recognize a sequential input/output request which has conventionally been operated in the device controller 10 through the distribution of the input/output requests. The conventional sequential input/output request ensures an address in the input/output request on the device controller 10 side, compares the address with an address of a last command and decides the sequential input/output request when the address has a continuity. When the sequential input/output request is decided in the device controller 10, it is possible to implement an effective operation mode for the sequential input/output request such as prefetch, simultaneous read and write of plural areas. However, when the distribution processing driver 52 is provided in the open system host 16 to separately distribute and issue the sequential input/output request to a plurality of paths as shown in FIGS. 1A and 1B, the conventional detecting mechanism for the sequential input/output requests in the device controller 10 cannot be operated and the sequential input/output requests cannot be recognized. In order to recognize the sequential input/output requests distributed and issued to the paths through the open system host 16 in the present invention, therefore, sequential detecting sections 60-1 to 60-n and sequential detecting tables 62-1 to 62-n are provided in the channel adapters 20-1 to 20-n respectively in the embodiment shown in FIGS. 11A and 11B. The sequential detecting tables 62-1 to 62-n store addresses and data lengths attached to the input/output requests sent from the open system host 16 received by the respective channel adapters 20-1 to 20-n. For example, when the host applications 50-1 and 50-2 of the open system host 16 issue the sequential input/output requests indicated by the addresses and the data lengths to the device controller 10 while distributing them through the distribution processing device 52, the addresses and the data lengths attached to the input/output requests received by the channel adapters as in the sequential detecting tables 62-1 to 62-n of the channel adapters 20-1 to 20-n are stored. The data length is represented by a unit of kilobyte, for example. Upon receipt of a new input/output request from the open system host 16, the sequential detecting sections 60-1 to 60-n provided in the channel adapters 20-1 to 20-n predict a next address from addresses and data lengths which are registered in the sequential detecting tables 62-1 to 62-n, compares the address with an address of the new input/output request and recognizes the presence of the sequential input/output request. For example, when a command having a data length of "5" with an address "2010" is accepted as a new input/output request sent from the host application 50-2 in the channel adapter 20-1, for example, a prediction address obtained by adding the data length to an input/output request address registered in the sequential detecting table 62-1 is acquired. If it is decided that the prediction address is identical to the address of the new input/output request, the command is recognized to be a sequential input/output request. For example, since a first address of the sequential detecting table 62-1 is "1000" and has a data length of "10", predication address=1000+10=1010 is calculated and compared with an address of "2010" of a new input/output request. In this case, they are not coincident with each other. If they are not coincident with each other, an address "2005" and a data length "5" in a next input/output request are read, predication address=2005+5=2010 is calculated and is compared with an address of "2010" in a new input/output request.

In this case, the prediction address is identical to the address of the new input/output request. Therefore, an input-output request received at the present time can be recognized to be a sequential input/output request. Furthermore, in the case in which the sequential detecting sections 60-1 to 60-n do not recognize a sequential access in which a prediction address obtained from the addresses and data lengths of previous input/output requests registered in the sequential detecting tables 62-1 to 62-n are identical to the address of a new input/output request, the data length added to the address of the sequential detecting table is sequentially increased from 1 till the number n of paths together with the open system host 16 to obtain a plurality of prediction addresses, and they are compared with the address of a new input/output request and it is decided whether or not they are identical to each other. If they are identical to each other, the input/output request is regarded to be a sequential input/output request. This is one of the sequential input/output requests sent from the host applications 50-1 and 50-2 and it is considered that the respective input/output requests are not always issued to the same channel adapter by the distribution of the distribution processing driver 52. For example, the address of "2000" and the data length of "5" in the input/output request which has been accepted are stored in the head of the sequential detecting table 62-2 of the channel adapter 20-2. If the data length of "5" is accepted with an address of "2010" as a new input/output request in this state, for example, the following prediction address:

prediction address=2000+5=2005 is obtained and is not identical to the address of 2010 in the new input/output request. In this case, the sequential detecting section 60-2 uses the following equation:

prediction address=address+data length×$i$ and calculates a plurality of prediction addresses while changing i one by one up to a maximum path number of n between i=1 to n and the open system host 16. In this case, if i=2 is set, prediction address=2000+5×2=2010 is obtained and is equal to the address "2010" of the new input/output request. Consequently, it is possible to recognize the input/output request newly received by the channel adapter 20-2 to be a sequential access.

Figure 12B:
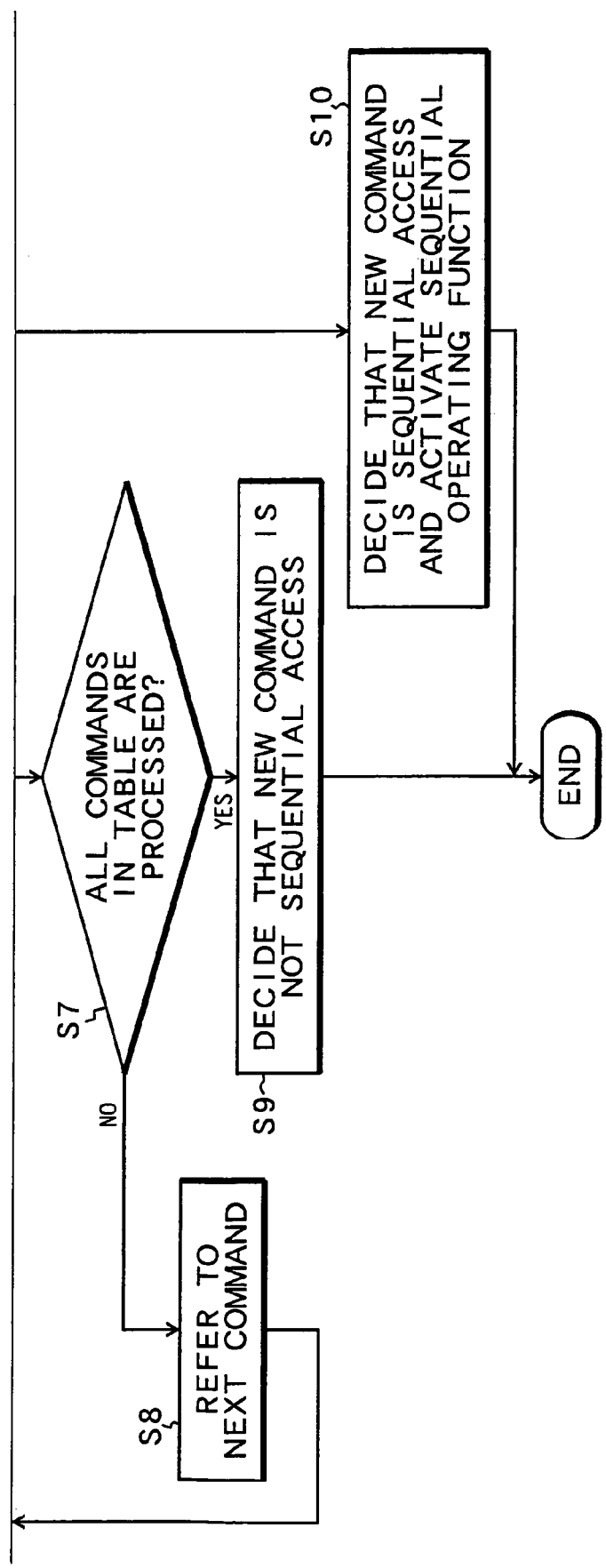

FIGS. 12A and 12B are flow charts showing a sequential detection processing for one of the channel adapters 20-1 to 20-n provided in the device controller 10 according to the embodiment of FIGS. 11A and 11B. The sequential detection processing is executed by interruption in a predetermined time cycle, for example. When the sequential detection processing is started, the presence of receipt of a command from the open system host 16 is checked at Step S1. If the command is received, the address and data length in the command are stored in the sequential detecting table at Step S2. Subsequently, an addition value (Aold+i. LD) is obtained, as a prediction address, with i=1 from an address Aold and a data length LD in a previous command written to the sequential detecting table at Step S3 and coincidence with a new address Anew of a newly accepted command is decided. If the address coincidence is decided at Step S4, the processing proceeds to Step S10 where a new command is decided to be a sequential access to activate a sequential operation function. On the other hand, in the case in which address non-coincidence is decided at the Step S4, the processing proceeds to Step S5 where it is decided whether or not i is added to the maximum path number n together with the open system host 16. If i is not added to the maximum path number n, it is incremented by one at Step S6 and the processing is returned to the Step S3 again where a prediction address is obtained from an addition value with i=2 and coincidence with a new address is decided. The processings at the Steps S3 to S6 are repeated until i=1 to maximum path number n is reached. Even if i reaches the maximum path number n and address coincidence cannot be obtained, the processing proceeds to Step S72 where it is decided whether or not all commands in the sequential detecting table are processed. If the commands are unprocessed, the processing proceeds to Step S8 where a prediction address to be an addition value is calculated from an address Aold and a data length LD in a new command at Step S3 with reference to a next command and coincidence with a new address Anew is decided. By the processings of the Steps S3 to S8, in the case in which all commands registered in the sequential detecting table are completely processed and address coincidence cannot be obtained, the processing proceeds to Step S9 where a new command is decided to be no sequential access.

Figure 13A:
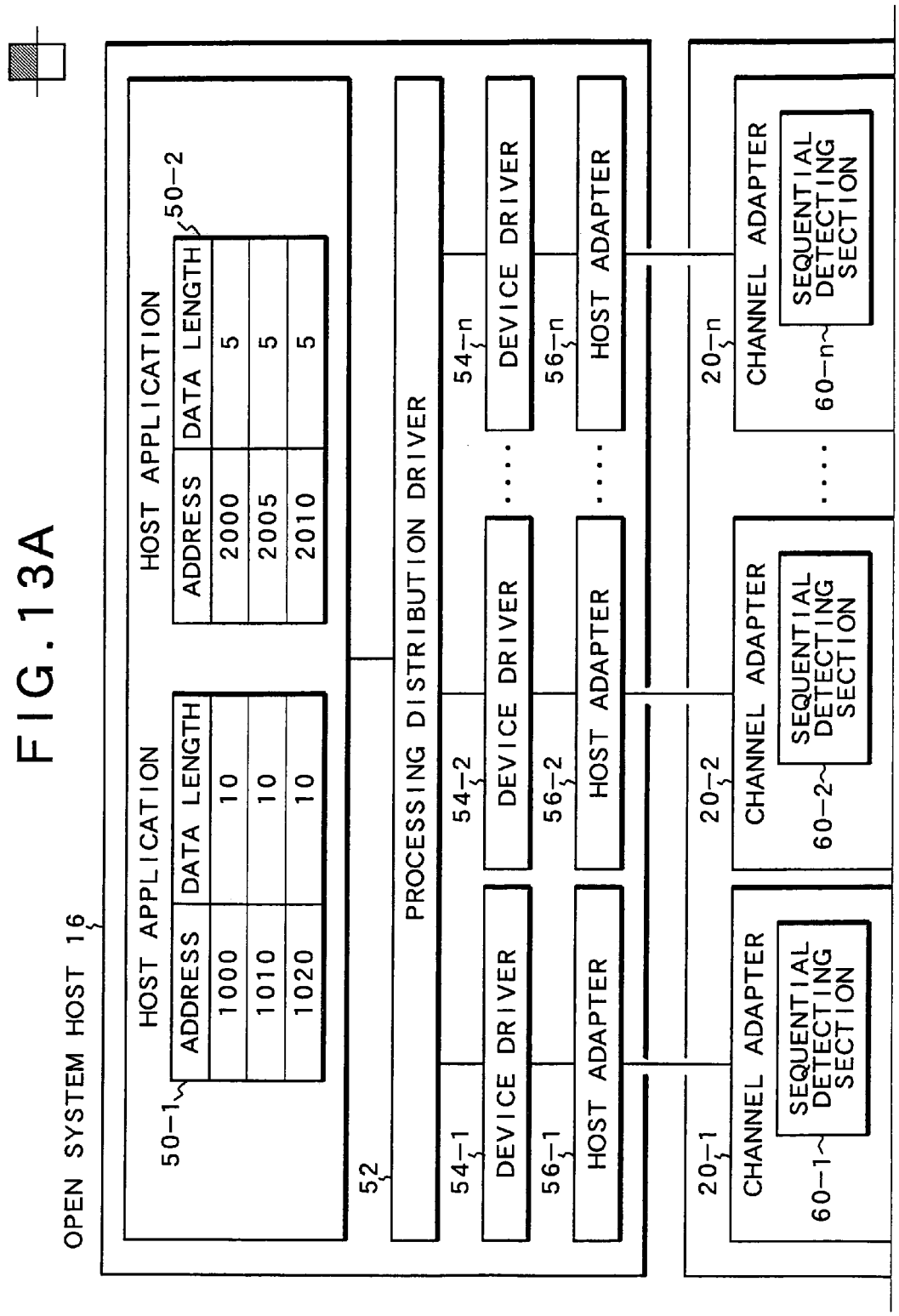

FIGS. 13A and 13B show an embodiment of the device controller 10 in which host applications provided in the open system host 16, for example, two host applications 50-1 and 50-2 are operated at the same time, thereby simultaneously issuing two sequential input/output requests. Thus, in the case in which the two host applications 50-1 and 50-2 provided in the open system host 16 issue two sequential inputs/output requests at the same time, the channel adapters 20-1 to 20-n of the device controller 10 are provided with two sequential detecting tables equivalent to the number of the host applications 50-1 and 50-2 of the open system host 16 which are operated at the same time, that is, the number corresponding to two applications, for example, sequential detecting tables 62-11 and 62-12, 62-21 and 62-22, . . . , 62-n1 and 62-n2 and a multiple table structure is thus formed. The sequential detecting sections 60-1 to 60-n are the same as those in the embodiment shown in FIGS. 12A and 12B. In the case in which the sequential access cannot be recognized in one of the two sequential detecting tables, another table is used to recognize the sequential access in the same manner. Moreover, in the case in which the sequential detecting sections 60-1 to 60-n recognize the sequential access with reference to one of the sequential detecting tables, an address and a data length in a newly received input/output request are stored in the sequential detecting table which is referred to recognize the sequential access. In the processing of recognizing the sequential input/output request in this case, if a prediction address obtained by adding a data length to an address of a table is equal to a new address, the input/output request is recognized to be a sequential input/output request in the same manner as in the embodiment shown in FIGS. 11A and 11B. Furthermore, a path number with the open system host 16 is increased one by one within a range of 1 to n and is multiplied by a data length LD and a value thus obtained is added, and a plurality of prediction addresses thus obtained are compared with the address of the table. More specifically, the sequential detection processing itself is the same as that of the flow chart shown in FIGS. 12A and 12B and is different therefrom in that a new table is used to repeat the same processing when all commands in one sequential detecting table are processed and address coincidence cannot be obtained at step S7. While the case in which the two host applications 50-1 and 50-2 issue input/output requests at the same time in the open system host 16 is taken as an example in the embodiment shown in FIGS. 13A and 13B, the simultaneous operation of any number of (two or more) host applications may be carried out. The number of sequential detecting tables to be provided in the channel adapters 20-1 to 20-n is increased corresponding to the number of host applications to be operated at the same time.

Figure 15:
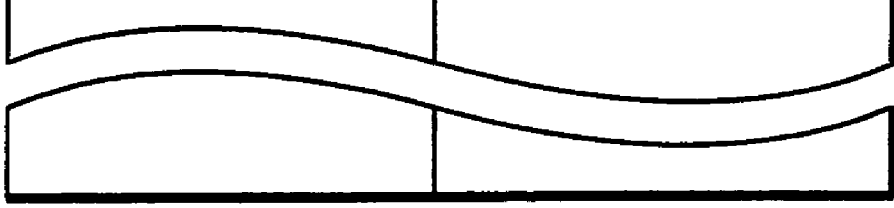
FIG. 15 is a diagram illustrating a common table for sequential detection in FIGS. 14A and 14B.

FIGS. 14A and 14B show another embodiment in which sequential input/output requests based on a host application sent from the open system host 16 are separately distributed by the distribution processing driver 52 and are issued to the device controller 10. While the same sequential detecting sections 60-1 and 60-n as those in the embodiment shown in FIGS. 11A and 11B are provided in the channel adapters 20-1 to 20-n in the present embodiment, a sequential detecting table is not provided in each of the channel adapters 20-1 to 20-n but is separately provided as a sequential detecting common table 64 in a common area in which all the channel adapters 20-1 to 20-n are accessible. The sequential detecting common table 64 stores an address and a data length of an input/output request sent from the open system host 16 accepted in the channel adapters 20-1 to 20-n and has table contents shown in FIG. 15, for example. Thus, the sequential detecting common table 64 is collected together in a common area so that the memory area of the common table can be more saved than the case in which it is separately provided in the channel adapters 20-1 to 20-n. To the contrary, it is necessary to carry out exclusive control in the case in which the reference of a plurality of channel adapters is caused to compete as compared with the case in which the channel adapters 20-1 to 20-n are distributed and provided. In some cases, therefore, a little time is correspondingly taken for the processing of recognizing a sequential access.

Redundant Path

Figure 16B:
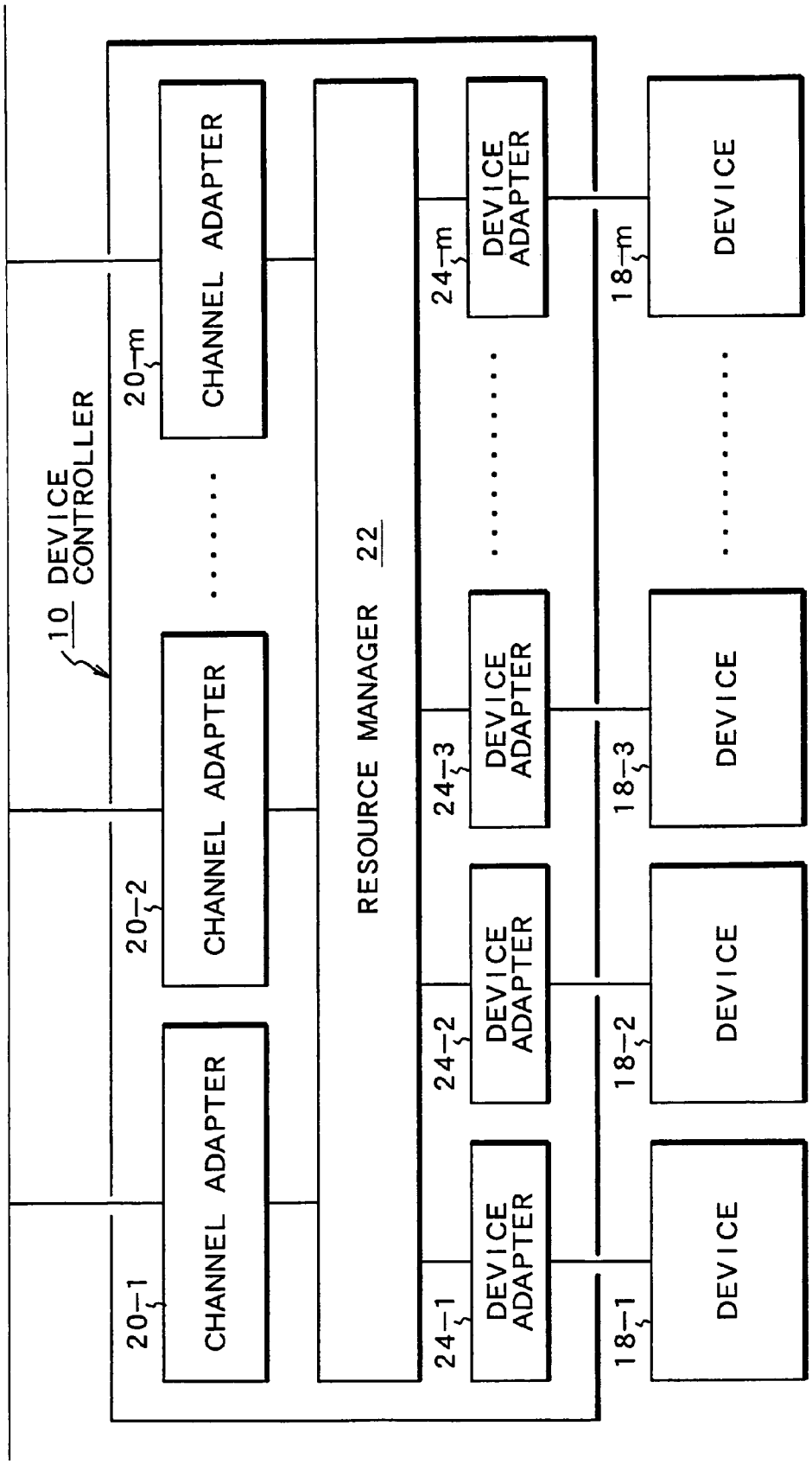

FIGS. 16A and 16B are block diagrams showing the input/output system according to the present invention which confirms the operation of a standby system path when a path from a host to a device controller is made redundant. In the open system host 16, a path switching driver 70 is provided subsequently to a host application 50, a host driver 54-1 is provided as an operation system path 74 under the path switching driver 70, and furthermore, device drivers 54-2 to 54-n are provided as standby system paths 76-1 to 76-(n−1) in order to cause a path to be redundant for the device controller 10. Subsequently to the device drivers 54-1 to 54-n, host adapters 56-1 to 56-n are provided and are connected to the channel adapters 20-1 to 20-n of the device controller 10, respectively. The device controller 10 is provided with a resource manager 22 for carrying out device control, device adapters 24-1 to 24-n are provided subsequently to the resource manager 22 and physical devices 18-1 to 18-n are connected thereto. In the case in which the path is caused to be redundant by the operation system path 74 and the standby system paths 76-1 to 76-(n−1), the input/output request of the host application 50 is normally issued to the device driver 54-1 of the operation system path 75 through the path switching driver 70, the input/output request is received by the channel adapter 20-1 of the device controller 10 through the host adapter 56-1 and an input/output request is issued to the device 18-1, for example, in a corresponding area under device control through the resource manager 22 and is then processed. On the other hand, the device drivers 54-2 to 54-n provided in the standby system paths 76-1 to 76-(n−1) are not usually used. In the case in which a fault is generated in the operation system path 74 connected to the device driver 54-1, the path switching driver 70 stops the use of the operation system path 74, the input/output request sent from the host application 50 is transferred to the device driver 54-2 set to be the standby system path 76-1, for example, and the processing of the standby system path 76-1 is started. However, the standby system path 76-1 is not usually used. In some cases in which the standby system path 76-1 has not been used for a long period of time and it is broken, therefore, it is not operated normally. In the present invention, a standby system path confirming section 72 is provided in the open system host 16. The standby system path confirming section 72 normally issues a path confirmation command to the device drivers 54-2 to 54-n of the standby system paths 76-1 to 76-(n−1) in order to confirm that the standby system paths 76-1 to 76-(n−1) are normally operated or not. There are four standby system path confirmation processings 1 to 4 through the issuance of the path confirmation command by the standby system path confirming section 72.

(Standby System Path Confirmation Processing 1)

In the path confirmation processing, the standby system path confirming section 72 issues, at a constant time interval, such a command that all the functions of the path can be confirmed under the device drivers 54-2 to 54-n of the standby system paths 76-1 to 76-(n−1). The commands capable of confirming that all the path functions of the standby system paths 76-1 to 76-(n−1) are normally operated or not include a read command for confirming data transfer in a read direction and a write command for confirming data transfer in a write direction. For example, in the case in which an interface is an SCSI, a test read and a test write for a CE area of the physical device 18-1 can be executed by using "Test Unit Ready" to be a path confirmation command, for example.

(Standby System Path Confirmation Processing 2)

In the confirmation processing, a command for maintaining a state of control information of the device controller 10 is used as a path confirmation command to be issued to the standby system paths 76-1 to 76-(n−1). For example, a state notice command for a system error is issued as the command for maintaining the state of control information of the device controller 10. The device controller 10 gives a response of a fault notice command to the state notice command. Such a state notice command for the device controller 10 is usually processed by command issuance for the test driver 54-1 of the operation system path 74 through the path switching driver 70. In the present invention, the state notice command issued to the operation system path 74 is used for the path confirmation command of each of the standby system paths 76-1 to 76-(n−1) to confirm that the standby system path is normally operated or not. At the same time, there is an advantage that the ratio of use of the operation system path 74 can be reduced correspondingly to the fact that the issuance of the state confirmation command is not required for the operation system path 74.

(Standby System Path Confirmation Processing 3)

In the confirmation processing, a part of commands which are usually issued to the operation system path 74 are issued to the standby system paths 76-1 to 76-(n−1). A usual command to be used for the confirmation of the standby system path may be any command to be issued to the operation system path 74. Referring to the issuance of a part of the commands of the operation system path 74 to the standby system, it is preferable that a command should be once issued to the standby system path after a command is issued to the operation system path 74 one hundred times, for example. By thus using a part of the commands issued to the operation system path 74 as a command for path confirmation of the standby system paths 76-1 to 76-(n−1), there is an advantage that an excessive overhead is not given even if the path confirmation command is issued for the device controller 10 because a part of the normal commands is used for the confirmation of the standby system path as compared with the case in which a special path confirmation command is issued in the standby system path confirmation processing 1.

(Standby System Path Confirmation Processing 4)

In the confirmation processing, a command for a cross check is issued in order to confirm that data written to the operation system path 74 at a constant time interval can be read through the standby system paths 76-1 to 76-(n−1) or not, and conversely, data written to the standby system paths 76-1 to 76-(n−1) can be read through the operation system path 74 or not. By such a cross check of the write and read using the operation system path and the standby system path, there is also an advantage that the presence of the normal operations of the standby system paths 76-1 to 76-(n−1) can be confirmed and the integrity of a system itself for data sharing through the operation system path and the standby system path can be confirmed.

By Any of the Standby System Path confirmation processings 1 to 4 or the combination thereof, in the case in which the standby system has not been used for a long period of time and the standby system path has a failure, it is possible to detect a fault through the confirmation of the standby system path, thereby taking a countermeasure such as quick repair, exchange or the like. As a result, in the case in which the fault is generated on the operation system path 74 connected to the test driver 54-1, the path switching driver 70 stops the use of the device driver 54-1 to start a processing of issuing an input/output request from the host application 50 to the device driver 54-2 of the standby system path 76, for example, in the standby system paths 76-1 to 76-(n−1). At this time, it can be confirmed that the standby system path 76-1 can be normally operated by the standby system path confirming section 72. Therefore, even if the issuance of the input/output request is transferred to the standby system path 76-1, the standby system path 76-1 is normally operated so that the input/output request sent from the host application 50 can be processed continuously on the device controller 10 side. Thus, high reliability can be obtained. While a plurality of standby system paths 76-1 to 76-(n–1) are provided for the path switching driver 70 in the embodiment shown in FIGS. 16A and 16B, at least one standby system may be provided if necessary.

Reserve Control and Path Switching During Generation of Fault

Figure 17B:
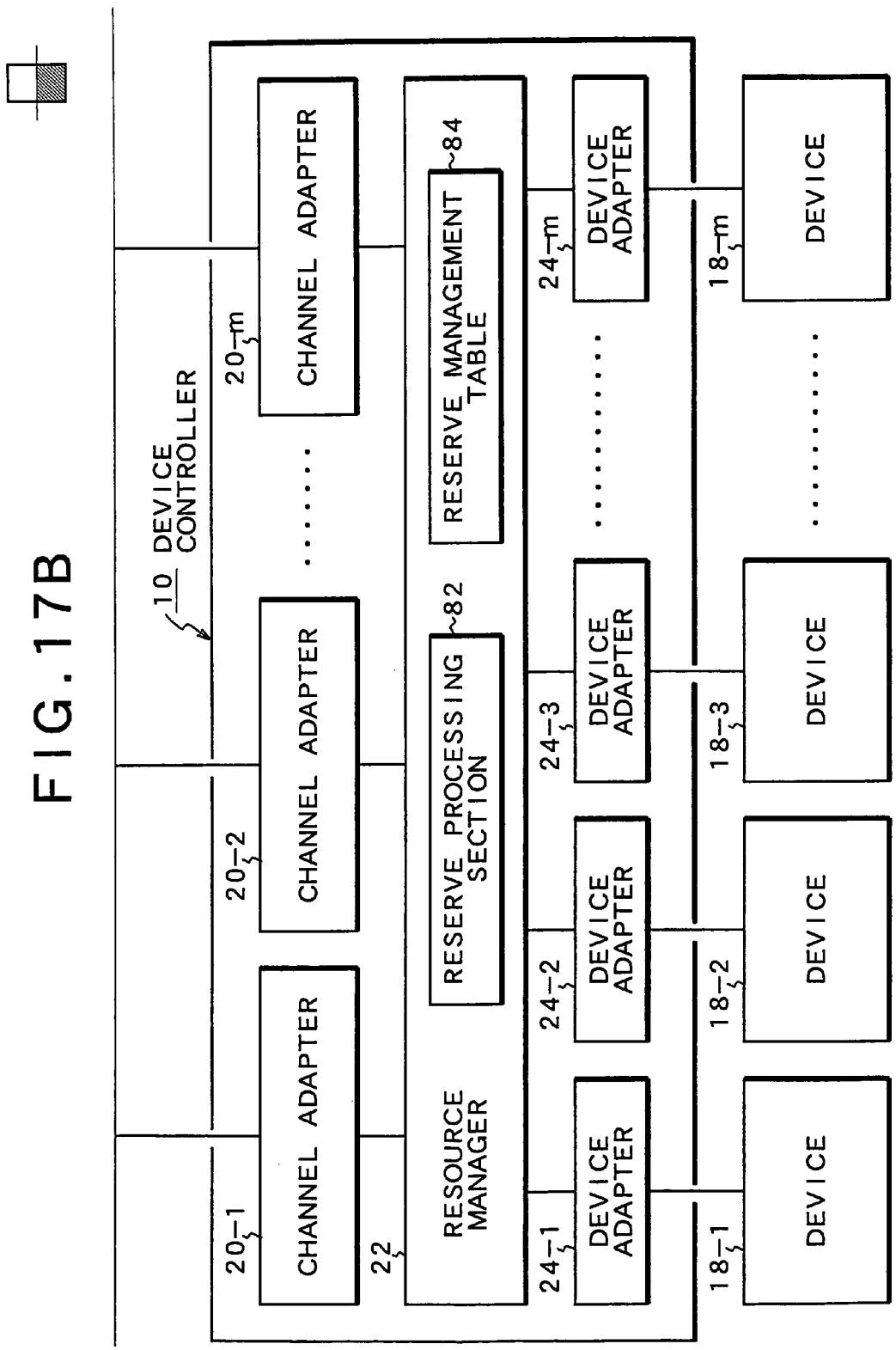

FIGS. 17A and 17B are functional block diagrams showing a reserve control processing to be carried out when the path switching driver in the host performs switching into a standby system path during the generation of a fault of the operation system path. The host application 50 of the open system host 16 normally issues a command for an input/output request to the device driver 54-1 of the operation system path 74 through the path switching driver 70. When a fault is generated on the operation system path, the path switching driver 70 stops the stop of the device driver 54-1 to transfer the issuance of the command for the input/output request from the host application 50 to the device driver 54-2 of the standby system path 76-1, for example, in the standby system paths 76-1 to 76-(n–1). On the other hand, a reserve control section 80 is provided as one of the functions of the host application 50. The reserve control section 80 issues a reserve command from the device driver 54-1 of the operation system path 74. The device controller 10 is provided with a reserve processing section 82 for executing the reserve processing of a specific device designated by a reserve command issued from the reserve control section 80 of the open system host 16, for example, a device 18-1, thereby fixing the input/output request sent from the host application 50 to only the device 18-1. In order to manage a reserve right for each device through the reserve processing section 82, the resource manager 22 is provided with a reserve management table 84.

FIG. 18 is a diagram illustrating the reserve management table 84. The reserve management table 84 maintains table areas 86-1, 86-2, . . . 86-m for the devices 18-1 to 18-m. Each of the table areas 86-1 to 86-m stores, as reserve management information, information indicating whether or not a reserve is being carried out, a channel adapter number accepting a reserve command and a host number carrying out a reserve request. For example, if the device 18 is set into a reserve state, the table area 86-1 corresponding to the device 18-1 registers "reserved" as the information indicating whether or not the reserve is being carried out, stores a channel adapter number of "20-1", and furthermore, registers a host number of "1". Since the device 18-2 is not being reserved, the table area 86-2 of the next device 18-2 stores "no reserve" as the information indicating whether or not the reserve is being carried out, and the channel adapter number and the host number are empty.

Referring to FIGS. 17A and 17B again, in the case in which the issuance of a command for an input/output request is transferred to the standby system path 76-1 due to the fault of the operation system path 74 and, for example, the device 18-1 has already been set in the reserve state by the issuance of the reserve command to the operation system path 74 at this time, the reserve control section 80 provided in the open system host 16 can issue a reserve release command for releasing the reserve of the device 18-1 set in the reserve state by the operation system path 74 through the device driver 54-2 of the standby system path 76-1 to be a destination. The reserve release command is accepted by the channel adapter 20-2 of the device controller 10 provided under the standby system path 76-1, and the reserve processing section 82 provided in the resource manager 22 can release the reserve state of the device 18-1 through the operation system path 74. At this time, the reserve processing section 82 refers to the reserve management table 84 in FIG. 18, and recognizes, from the table area 86-1, that the device 18-1 is set in the reserve state and recognizes that the reserve is carried out in the channel adapter 20-1 provided under the operation system path 74, and can thereby release the reserve state. Before the transfer, the reserve state of the device 18 can be released through the operation system path 74. Consequently, even if the reserve control section 80 of the host application 50 newly issues a reserve command specifying the device 18-1 to the standby system path 76-1 after the transfer, a processing reservation conflict is not caused in the device controller 10 but the device 18 can be set into the reserve state through the reserve command sent from the standby system path 76 again. On the other hand, when a release command for releasing the reserve state is issued from the reserve control section 80 of the host application 50, the reserve processing section 82 provided in the resource manager 22 of the device controller 10 recognizes an object device of the release command specified with reference to the reserve management table 84, thereby releasing the reserve state of the device.

Figure 19A:
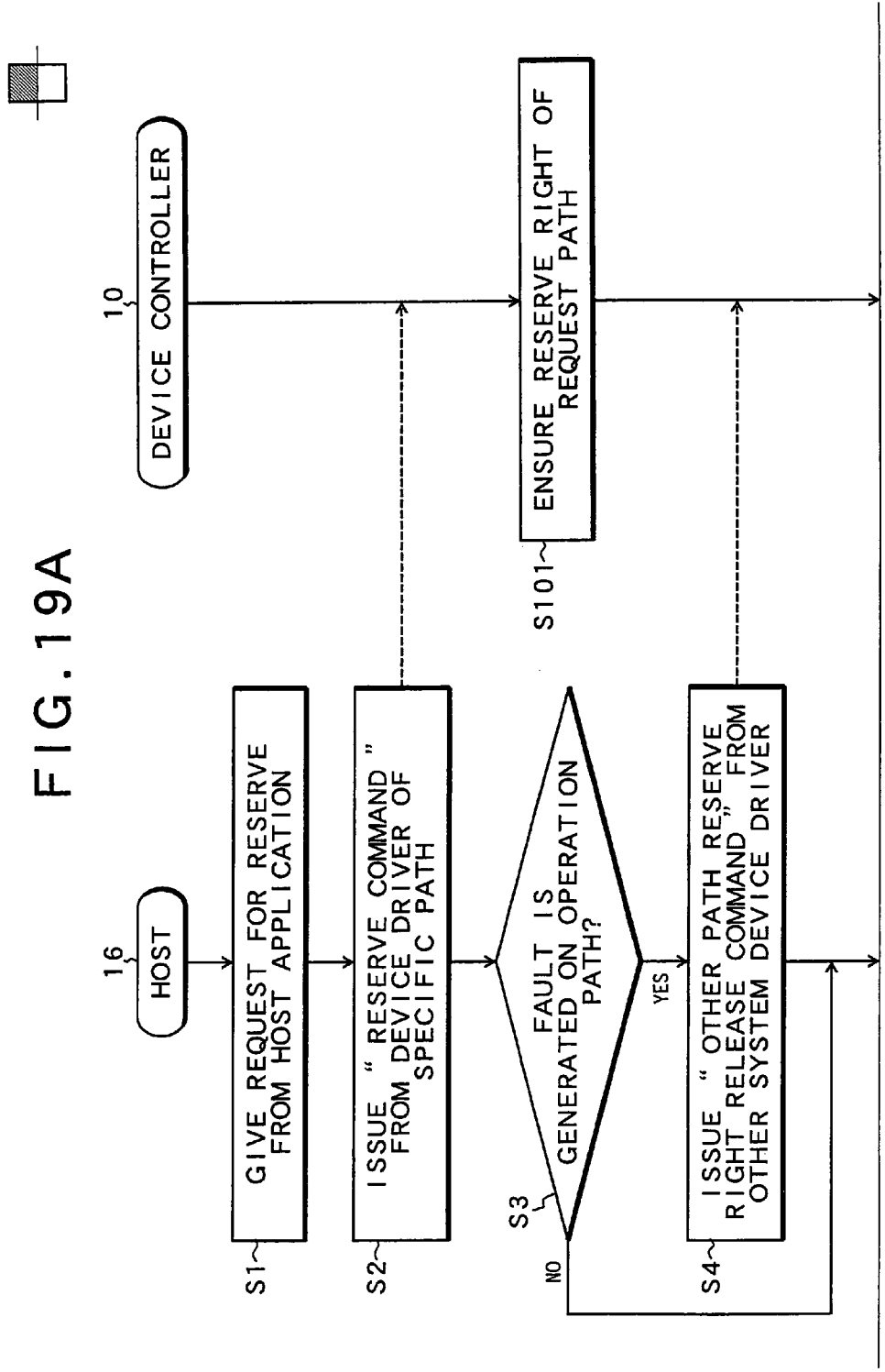

FIGS. 19A and 19B are flow charts showing the release processing for reserve control and reserve release to be carried out when a fault is generated on the operation path, and furthermore, a release processing in the reserved state according to the embodiment shown in FIGS. 17A and 17B. In the open system host 16 shown in FIGS. 17A and 17B, it is assumed that a reserve request is sent from the host application 50 as in Step S1, for example, in such a state that the path switching driver 70 issues an input/output request sent from the host application 50 through the operation system path 74 to the device controller 10 side, thereby carrying out an input/output processing. Upon receipt of the reserve request, the device driver 54-1 of the operation system path 74 issues a reserve command through the host adapter 56-1 to the device controller 10. The reserve command sent from the open system host 16 is accepted by the channel adapter 20-1 of the device controller 10, and the reserve processing section 82 of the resource manager 22 ensures the reserve right of a request path for the device 18-1, for example, and the input/output request sent from the subsequent host application 50 is executed on a fixed path from the operation system path 74 to the device 18-1 through the device controller 10. Thus, when a fault is generated in any part of the operation system path 74 in such a state that the device 18-1 is reserved on the operation system path 74, the path switching driver 70 of the open system host 16 transfers the issuance of the command for the input/output request from the operation system path 74 causing a fault to the device driver 54-2 of the standby system path 76-1, for example. With the transfer of the issuance of the command for the input/output request from the operation system path 74 to the standby system path 76-1, the reserve control section 80 issues "another path reserve right release command" to the device controller 10 for the device driver 54-2 of the standby system path 76-1 to be a destination at Step S4. The "another path reserve right release command" is accepted by the channel adapter 20-2 of the device controller 10 and is given to the reserve processing section 82 of the resource manager 22. The reserve processing section 82 refers to the reserve management table 84 in FIG. 18 at Step S102, recognizes that the device 18-1 is currently set in the reserve state and has the operation system path 74 based on a channel adapter number of "20-1" and a host number of "1", and the reserve right of the operation system path 74 is released based on the "another path reserve right release command". As a matter of course, if a fault is not generated on the operation system path 74 to be an operation path at Step S3, the issuance of the "another path reserve right release command" at Step S4 is skipped. Next, a "reserve command" is issued to the device controller 10 from the device driver 54-2 of the standby system path 76-1 to be a path after the transfer of an input/output request from the host application 50 at Step S5. The "reserve command" sent from the device driver 54-2 is accepted by the channel adapter 20-2 of the device controller 10, and a new path reserve right is ensured by setting the channel adapter number of "20-2" and the host number of "1" for the same device 18-1 through the reserve processing section 82 of the resource manager 22. Subsequently, when the reserve request release is received from the host application 50 at Step S6, a "release command" is issued to the device controller 10 from the device driver of a path finally issuing a reserve command, that is, the device driver 54-2 of the standby system path 76-1. The reserve processing section 82 of the device controller 10 accepting the "release command" recognizes the reserve right set to the standby system path 76-1 with reference to the reserve management table 84 and executes a release processing for delivering the reserve right.

FIGS. 20A and 20B are block diagrams showing another embodiment of the device control and the path switching during the generation of a fault according to the present invention. In the present embodiment, there is taken, as an example, the case in which a processing distribution driver for switching a plurality of paths is provided to maintain a load balance in an open system host. Subsequently to a host application 50 of an open system host 16, a processing distribution driver 52 is provided and path switching is carried out to maintain the load balance of an input/output request sent from the host application 50 for a plurality of paths 78-1 to 78-n provided under device drivers 54-1 to 54-n. In order to carry out the reserve control processing of the open system host 16 provided in the processing distribution driver 52, a reserve control section 80 is provided in the host, and furthermore, a resource manager 22 of a device controller 10 is provided with a reserve processing section 82 and a reserve management table 84. The reserve management table 84 is the same as that of FIG. 18. When a reserve request is sent from the host application 50, the reserve control section 80 provided in the open system host 16 halts the distribution processing of the processing distribution driver 52, issues a "reserve command" from the device driver of a specific path, for example, the device driver 54-1 to the device controller 10, ensures the reserve right of a request path through the reserve processing section 82 provided in the resource manager 22 of the device controller 10, and sets "reserved", a channel adapter number and a host number for the device set into a reserve state in the reserve management table 84. In the state of reserve right maintenance in which the distribution processing of the processing distribution driver 52 is halted and an input/output request is issued through the device driver of the specific path, when a fault is generated on the path, the reserve control section 80 stops the use of the device driver 54-1 of the fault path and transfers the issuance of a command for the input/output request to the device driver 54-2 of another normal path, for example, the path 78-1. For the path 78-1 generating the fault at this time, the reserve right is maintained. Therefore, the reserve control section 80 issues "another path reserve right release command" from the device driver 54-2 of another path 78-2 and releases the reserve right for the fault path which has maintained the reserve right in the device controller 10. In this way, when the reserve right of the fault path can be released, a reserve right on the new path 78-2 can be maintained without a processing reservation conflict on the device controller 10 side even if a "reserve command" is issued from the device driver 54-2 of the path 78-2 switched due to the fault. Moreover, if the reserve request release is given from the host application 50 after the switching to the new path 78-2 is carried out, the reserve control section 80 issues the "release command" from the device driver of a path finally issuing the reserve command, that is, the device driver 54-2 to the device controller 10, and carries out a release processing of releasing the reserve right of the path 78-2. When the processing of releasing the reserve right is thus completed, the distribution processing is restarted by the processing distribution driver 52 stopped in the state of the reserve right maintenance and the issuance of an input/output request is distributed to the device drivers 54-1 to 54-n of the paths 78-1 to 78-n to maintain a load balance.

Figure 21A:
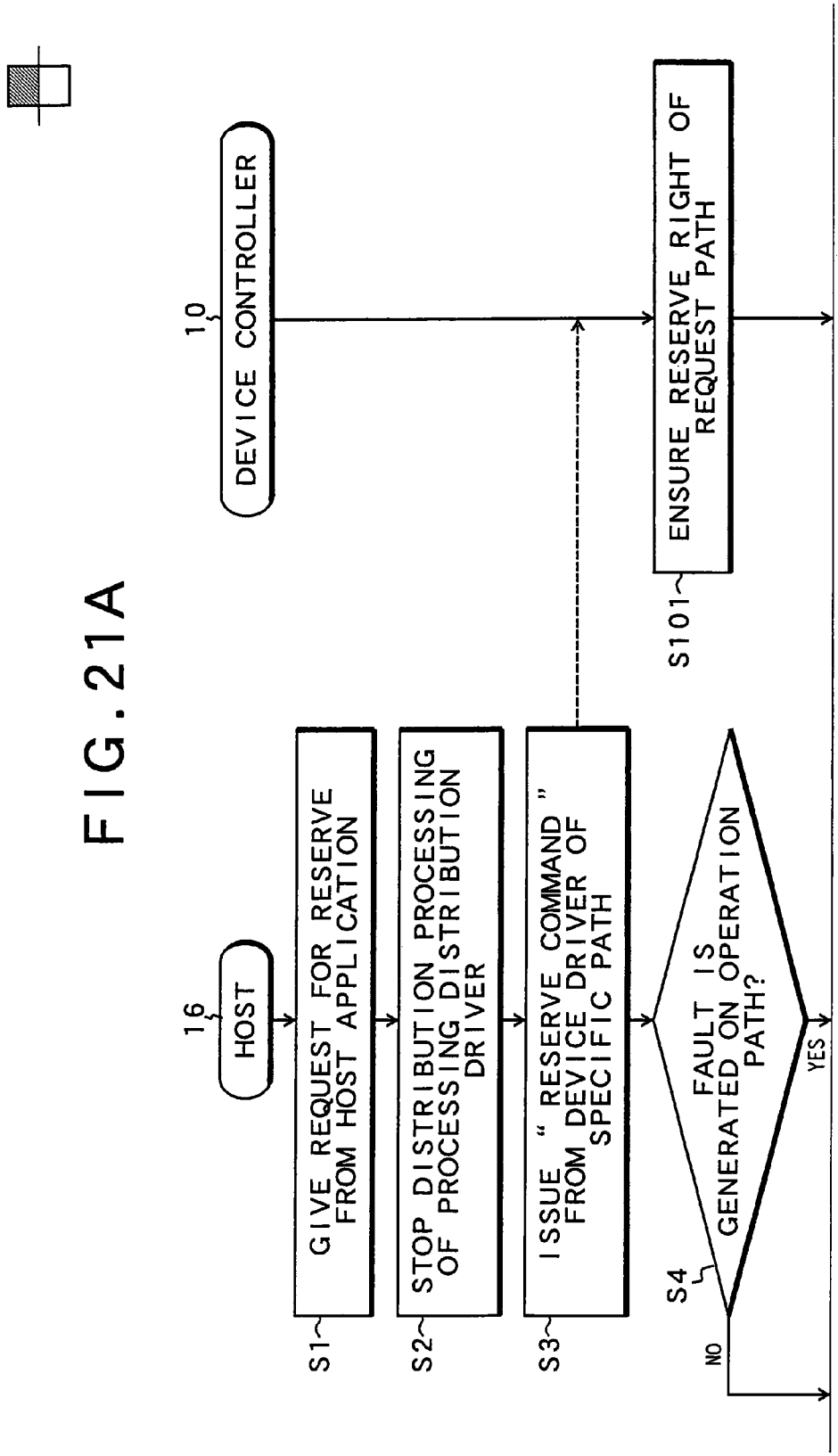
FIGS. 21A and 21B are time charts showing fault path switching and reserve control in FIGS. 20A and 20B.
Figure 21B:
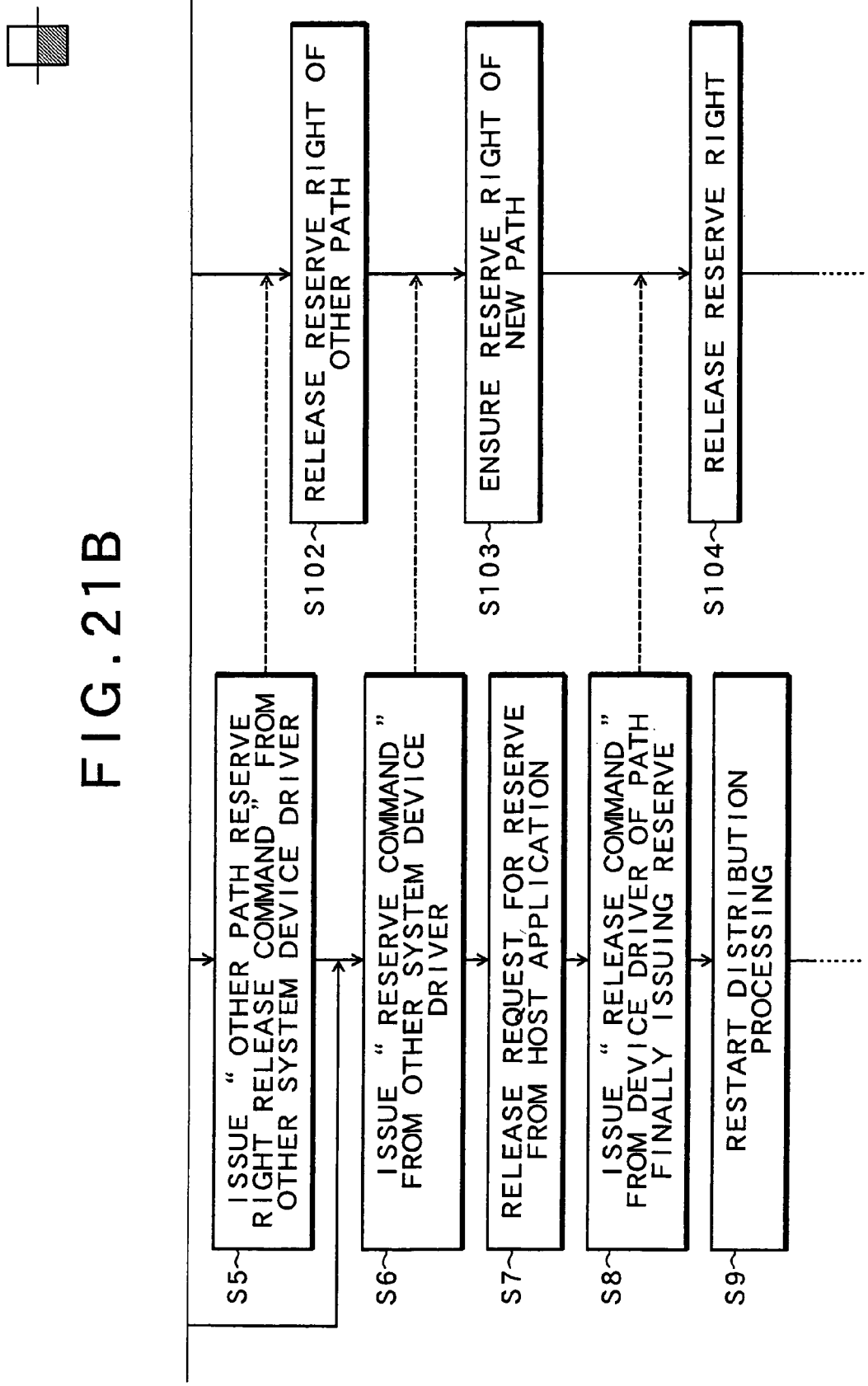

FIGS. 21A and 21B are flow charts showing the reserve control and the path switching during the generation of a fault in the case in which the processing distribution driver in FIGS. 20A and 20B is used. The flow chart is different from the case of the path switching driver 70 in FIGS. 17A and 17B in that when the open system host 16 gives a reserve request from the host application 50 at Step S1, the distribution processing of the processing distribution driver 52 is halted and a "reserve command" is issued from the device driver of a specific path at Step S3. Moreover, the flow chart is different from that of the path switching driver 70 in FIGS. 17A and 17B in that the reserve right of another path is released by the issuance of "another path reserve right release command" at Steps S5 and S6, a "reserve command" is issued to maintain the reserve right of a new path at Step S6, reserve request release is then given from the host application 50 at Step S7, a "release command" is issued based on the reserve request release at Step S8 to carry out the release processing of the reserve right and the distribution processing of the processing distribution driver 52 which has been halted is then restarted.

Countermeasure Against Path Failure of Processing Distribution for Plural Paths

Figure 22B:
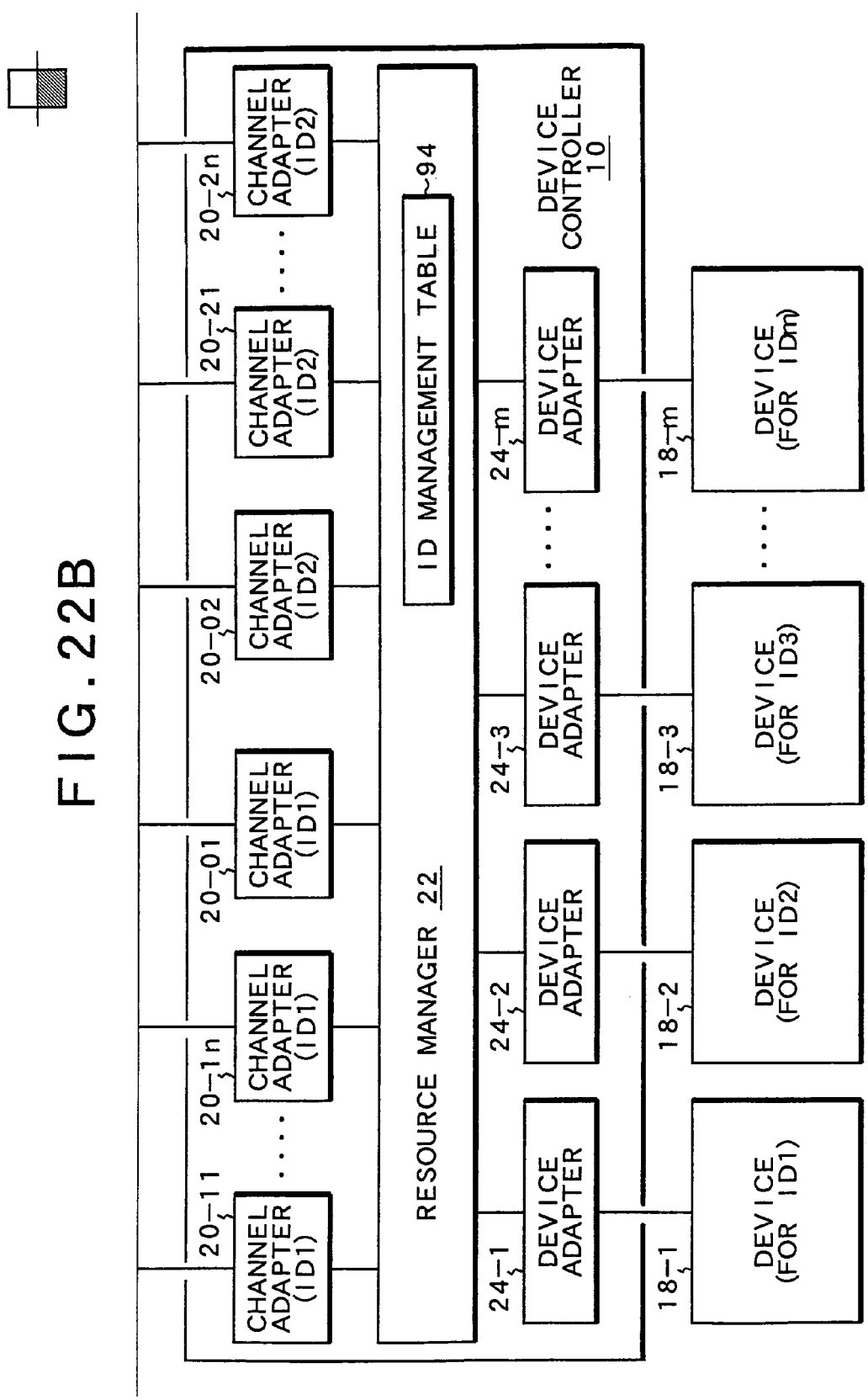

FIGS. 22A and 22B are block diagrams showing the input/output system according to the present invention in which the device driver of a standby system is provided in the processing distribution driver of an open system host. In the present embodiment, physical devices 18-1 to 18-m are connected to two systems of open system hosts 16-1 and 16-2 through the device controller 10. The open system hosts 16-1 and 16-2 distribute a processing to respective operation system paths 90-11 to 90-1n and 90-21 to 90-2n of the device drivers 54-11 to 54-1n and the device drivers 54-21 to 54-2n through the processing distribution drivers 52-1 and 52-2 for the input/output requests of the host applications 50-1 and 50-2 respectively, thereby implementing a load balance. Subsequently to the device drivers 54-11 to 54-1n and the device drivers 54-21 to 54-2n of the open system hosts 16-1 and 16-2, host adapters 56-11 to 56-1n and host adapters 56-21 to 56-2n are provided and connected to channel adapters 20-11 to 20-1n and channel adapters 20-21 to 20-2n in the device controller 10 through dedicated paths, respectively. The device controller 10 is provided with a resource manager 22 subsequently to the channel adapters 20-11 to 20-2n, and the physical devices 18-1 to 18-m are connected to the resource manager 22 through device adapters 24-1 to 24-n, respectively. In addition to such a structure that the input/output requests sent from the host applications 50-1 and 50-2 in the open system hosts 16-1 and 16-2 are distributed to the device drivers 54-11 to 54-1n and 54-21 to 54-2n of the operation system path through the processing distribution drivers 52-1 and 52-2, thereby maintaining a load balance, in the present invention, device drivers 54-01 and 54-02 building standby system paths 92-1 and 92-2 are newly provided for the processing distribution drivers 52-1 and 52-2 respectively. Host adapters 56-01 and 56-02 are provided for the device drivers 54-01 and 54-02 of the standby system, and channel adapters 20-01 and 20-02 of the standby system are correspondingly provided on the device controller 10 side. The resource manager 22 of the device controller 10 is provided with an ID management table 94. The ID management table 94 sets an ID to the channel adapters 20-11 to 20-2n provided in the device controller 10 with a division into each system of the open system hosts 16-1 and 16-2. More specifically, an "ID1" for relation to the device 18-1 is set to the channel adapters 20-11 to 20-1n of the device controller 10 corresponding to the operation system paths 90-11 to 90-1n of the open system host 16-1. On the other hand, an "ID2" for relation to the device 18-2 is set to the channel adapters 20-21 to 20-2n of the device controller 10 corresponding to the operation system paths 90-21 to 90-2n of the open system host 16-2. Similarly, the ID is set to the channel adapters 20-01 and 20-02 of the standby system provided in the device controller 10 corresponding to the standby system paths 92-1 and 92-2, and the same "ID1" for the relation to the device 18-1 as that of the channel adapters 20-11 to 20-1n of the operation system is set to the channel adapter 20-01 provided in the standby system path 92-1 of the open system host 16-1. On the other hand, the same "ID2" for the relation to the device 18-2 as that of the channel adapters 20-21 to 20-2n of the operation system is set to the channel adapter 20-02 of the standby system in the device controller 10 provided in the standby system path 92-2 of the open system host 16-2.

FIG. 23 is a diagram illustrating the ID management table 94 provided in the resource manager of the device controller 10. The ID management table 94 is provided with table areas 96-1 to 96-m corresponding to the devices 18-1 to 18-m. "1" is set as an ID to the table area 96-1 corresponding to the device 18-1, and furthermore, "20-01" of the standby system is set, in addition to "20-11 to 20-1n" of the operation system, as a channel adapter number. Moreover, "1" indicative of the open system host 16-1 is set as a host number. Referring to the table area 96-2 corresponding to the next device 18-2, "2" is set to the ID and "20-21 to 20-2n" of the operation system and "20-02" of the standby system are set to the channel adapter numbers, and furthermore, "2" indicative of the open system host 16-2 is set to the host number.

Next, description will be given to the processing operation of the input/output system shown in FIGS. 22A and 22B. In the normal operation state, the host applications 50-1 and 50-2 of the open system hosts 16-1 and 16-2 give an input/output request to the processing distribution drivers 52-1 and 52-2 respectively, and the processing distribution drivers 52-1 and 52-2 distribute a processing to implement a load balance for the device drivers 54-11 to 54-1n of the operation system paths 90-11 to 90-1n and the device drivers 54-21 to 54-2n of the operation system paths 90-21 to 90-2n in order to maintain the load balance. The processing distribution driver 52-1 of the open system host 16-1 will be taken as an example. When an input/output request is received from the host application 50-1, a command corresponding to the input/output request is issued by using the operation system path 90-11, for example, in order to maintain the load balance. An "ID1" set to the channel adapter 20-11 is attached to the command to be issued. Therefore, the channel adapter 20-11 of the device controller 10 accepts the command as a command 2 because the "ID1" of the command issued from the device driver 54-11 through the host adapter 56-11 is the same as the ID set to itself, delivers the command received by the resource manager 22, and issues a command to the device 18-1 related with the ID1 through the resource manager 22, thereby carrying out an access. In this respect, the processing distribution is similarly carried out through the processing distribution driver 52-2 on the open system host 16-2 side. When receiving an input/output request, the processing distribution driver 52-2 uses one of the device drivers 54-21 to 54-2n of the operation system to implement a load balance, issues a command having the "ID2" set to the channel adapters 20-21 to 20-2n of the operation system, and carries out an access for the device 18-2 related to the "ID2" on the device controller 10 side.

Next, description will be given to a processing to be carried out when a fault is generated on one path of the operation system. It is assumed that a fault is generated on the device driver 54-11 connected to the processing distribution driver 52-1 of the open system host 16-1 and the operation system path 90-11 provided thereunder. Due to the generation of the failure in the operation system path 90-11, the processing distribution driver 52-1 stops the issuance of a command using the device driver 54-11, and includes the device driver 54-01 newly provided in the standby system path 92-1 in a path to be replaced with the failure path of the operation system path. Therefore, the processing distribution for the input/output request sent from the host application 50-1 is carried out for the device drivers 54-01 and 54-12 to 54-1n having the same path number as that obtained before the generation of the failure, thereby maintaining a load balance. Consequently, even if a failure is generated on one path of the operation system path, the same load balance as that obtained before the generation of the failure can be implemented through the replacement of the standby system path. Even if a failure is generated on one path of the operation system, it is possible to maintain the performance of an input/output processing which is equivalent to that obtained before the generation of the failure without a path bottleneck as compared with the processing distribution of the open system host 16-2. Also in the case in which a failure is generated on one path of the operation system on the open system host 16-2 side, the device driver 56-02 of the standby system path 90-2 is used in place of the failure path so that the same load balance as that obtained before the generation of the failure can be implemented.

Figure 24A:
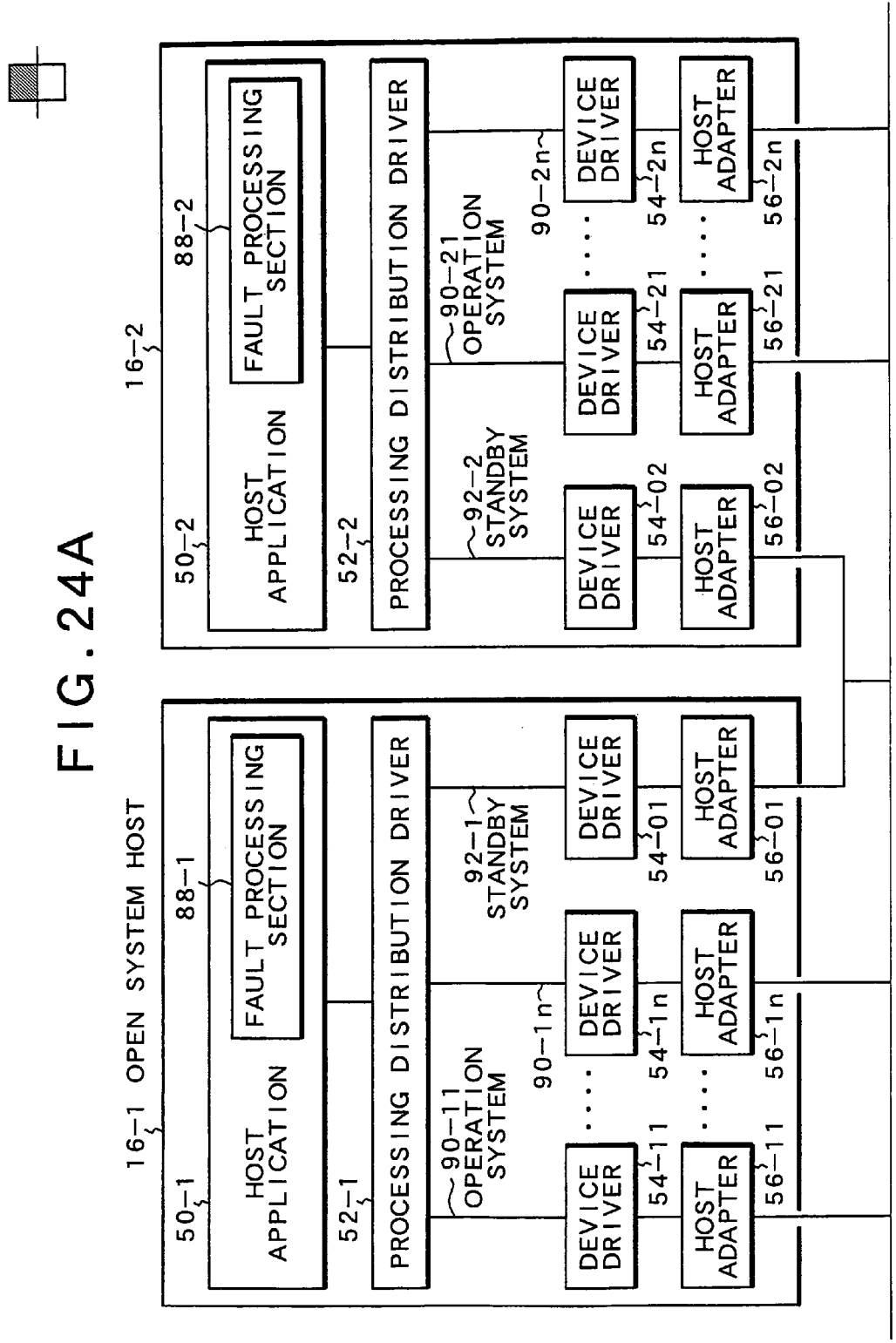
FIGS. 24A and 24B are block diagrams showing the input/output system according to the present invention in which the device driver of the standby system is provided in the processing distribution driver for a 2-system host.
Figure 24B:
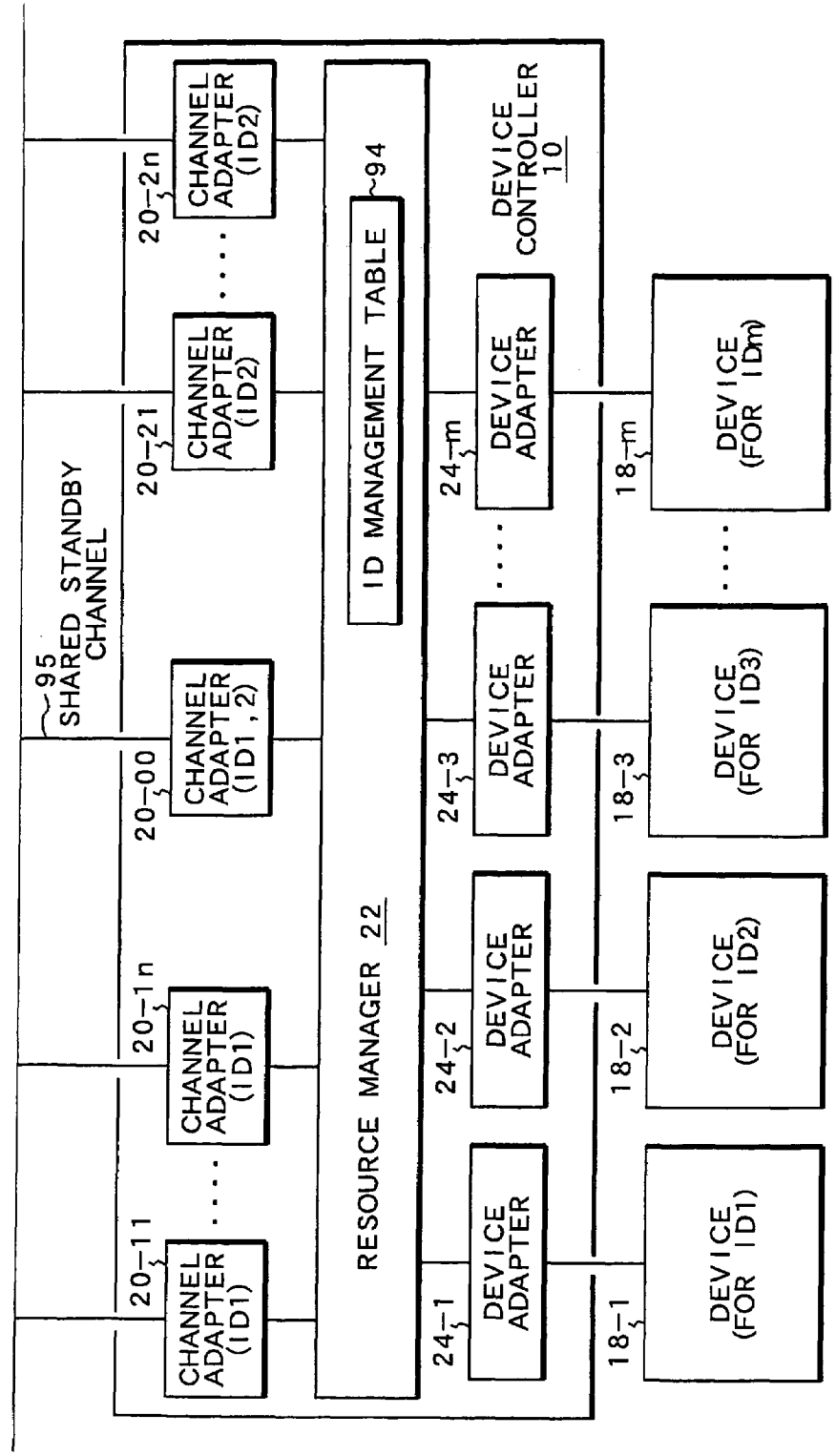

FIGS. 24A and 24B are characterized in that the channel adapter of the device controller 10 of the standby system provided separately is shared for hosts having two systems in the embodiment shown in FIGS. 22A and 22B. In the present embodiment, processing distribution drivers 52-1 and 52-2 in open system hosts 16-1 and 16-2, operation system device drivers 54-11 to 54-1n and 54-21 to 54-2n, standby system device drivers 54-01 and 54-02, and furthermore, host adapters 56-11 to 56-1n, 56-01, 56-02, and 56-21 to 56-2n are the same as those in the embodiment of FIGS. 22A and 22B. On the other hand, a standby system channel adapter provided in the device controller 10 is set to be a single channel adapter 20-00 in place of the channel adapters 20-01 and 20-02 for each system shown in FIGS. 22A and 22B. The host adapters 56-01 and 56-02 of the standby system paths 92-1 and 92-2 provided in the open system hosts 16-1 and 16-2 are connected to a shared channel adapter 20-00 of the standby system through one path, that is, a common standby path 95. In order to set an ID for the channel adapter 20-00 for sharing standby, moreover, it is necessary to effectively accept both a command for an ID1 sent from the standby system device driver 54-01 of the open system host 16-1 and a command for an ID2 sent from the standby system device driver 54-02 of the open system host 16-2 and to give a response. Therefore, the "ID1" and the "ID2" are set to respond to both of the open system hosts 16-1 and 16-2. For this reason, in the case in which the channel adapter 20-00 for sharing standby receives the command for the ID2 from the device driver 54-01 of the open system host 16-1, an access is given to the device 18-1 related with the "ID1" through the resource manager 22 and the device adapter 24-1. Moreover, in the case in which the command for the "ID2" is accepted from the device driver 54-02 of the open system host 16-2, an access is given to the device 18-2 related with the "ID2" through the resource manager 22 and the device adapter 24-2. The function of thus accepting the command having the "ID1" or "ID2" sent from each of the different standby system paths 92-1 and 92-2 of the open system hosts 16-1 and 16-2 and giving an access to the device 18-1 or 18-2 related with the I number can be referred to as "Shared inactive pass", for example. Thus, the present embodiment is the same as the embodiment shown in FIGS. 22A and 22B except that the channel adapter 20-00 for sharing standby to respond to a command by using the standby system paths of the two host systems in the device controller 10 to be one path is provided.

While there is taken, as an example, the case in which the load balance is implemented by the processing distribution of the input/output requests of the two systems of the open system hosts 16-1 and 16-2 and a command is issued to the device controller 10 in the embodiments shown in FIGS. 22A and 22B and FIGS. 24A and 24B, any number of open system hosts may be connected to the device controller 10 if necessary. In FIGS. 24A and 24B, moreover, the channel adapter of the device controller 10 is shared for the standby system paths from the open system hosts 16-1 and 16-2 of the two systems. In the case in which the number of the open system hosts is increased, furthermore, a plurality of standby system paths can be processed by one channel adapter for sharing standby to be one common path by setting an ID corresponding to the number of the systems of the open system host and a resource can be utilized effectively by decreasing the number of the channel adapters of the standby system.

Optimization of Channel Transfer Rate

Figure 25A:
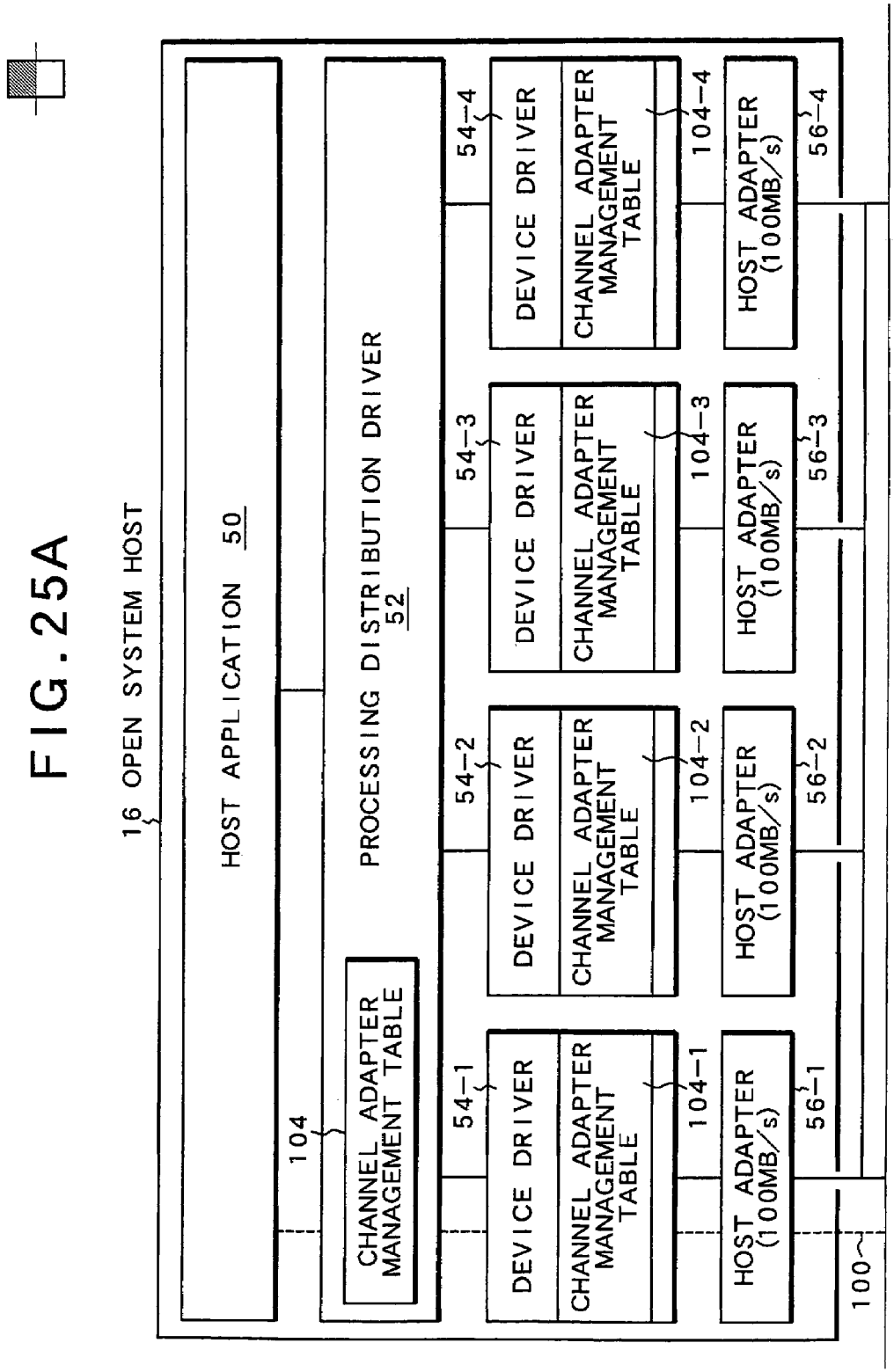
FIGS. 25A and 25B are block diagrams showing the input/output system according to the present invention in which a path transfer rate is optimized in the case in which a transfer rate on the host side is high and that on the device controller side is low.
Figure 25B:
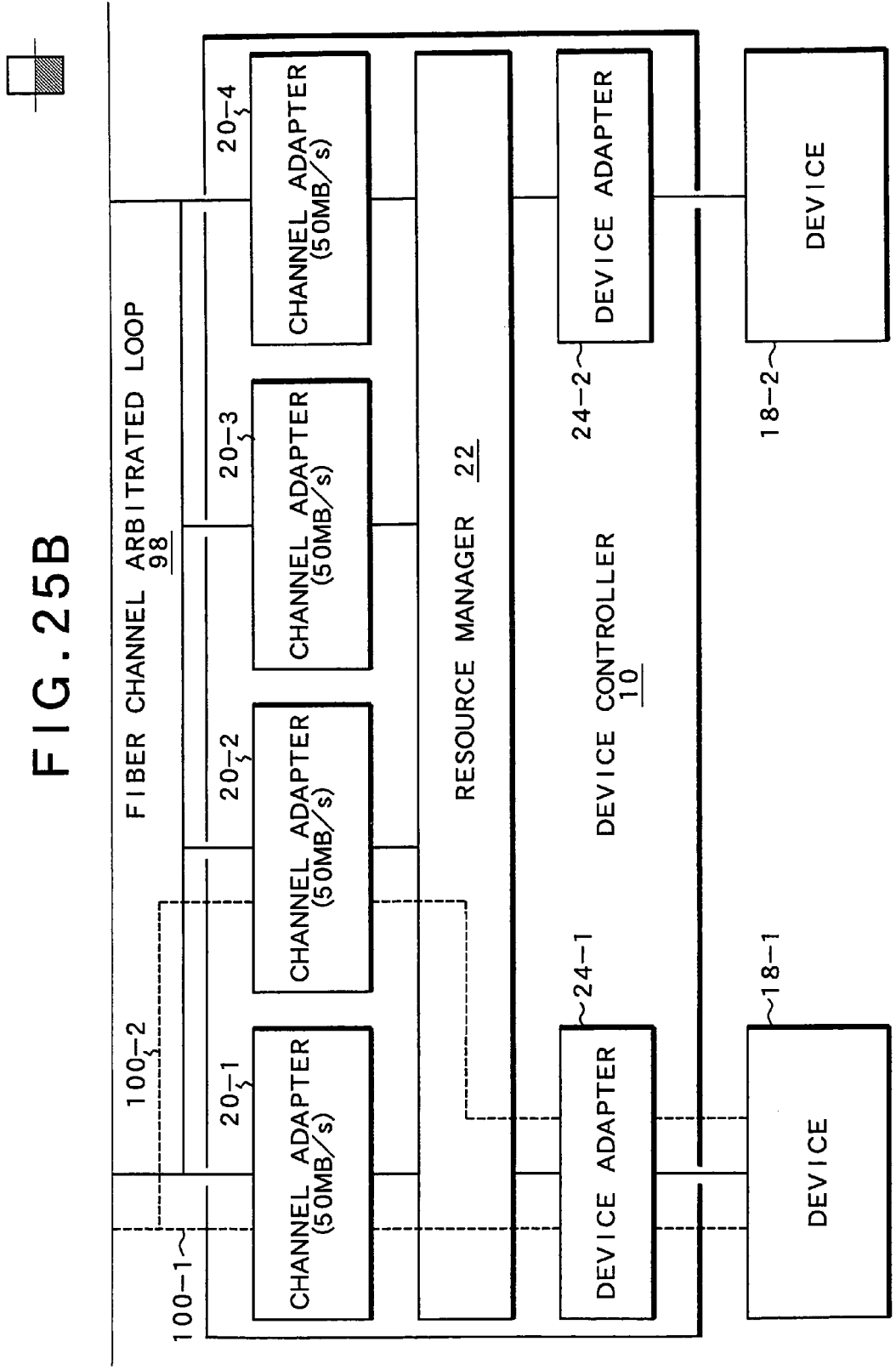

FIGS. 25A and 25B are block diagrams showing the input/output system according to the present invention in which a path transfer rate between channels is optimized when a transfer rate on the host side is high and a transfer rate on the device controller side is low. In the present embodiment, a fiber channel and arbitrated loop 98 is used to be a channel path between the open system host 16 and the device controller 10. The fiber channel and arbitrated loop 98 divides a data transfer unit between the open system host 16 and the device controller 10 into a frame of 2K byte or less. Differently from a conventional parallel SCSI, consequently, plural kinds of operations can be executed at the same time. The processing distribution driver 52 of the open system host 16 receives an input/output request in an operation unit from the host application 50, for example, and issues a command corresponding to the input/output request from the device drivers 54-1 to 54-4, and transfers the command from the host adapters 56-1 to 56-4 to the channel adapter 20-1 to 20-4 side of the device controller 10 through the fiber channel and arbitrated loop 98. The device controller 10 comprises the resource manager 22 subsequently to the channel adapters 20-1 to 20-4 and, for example, the devices 18-1 and 18-2 are connected to the resource manager 22 through the device adapters 24-1 and 24-2. It is assumed that the data transfer rates of the host adapters 56-1 to 56-4 provided on the open system host 16 side are 100 MB/s, while the data transfer rates of the channel adapters 20-1 to 20-4 provided in the device controller 10 are a half, that is, 50 MB/s. In the case in which the transfer rates of the channel adapters 20-1 to 20-4 on the device controller 10 side are thus low for the host adapters 56-1 to 56-4 on the host side, the data transfer through a 1 to 1 channel path of the host adapter and the channel adapter is always led to have a lower transfer rate of 50 MB/s and the host adapters 56-1 to 56-4 can originally have a transfer rate of 100 MB/s. However, only half performance can actually be displayed. Referring to the host adapter 56-1 on the open system host 16 side and the channel adapters 20-1 and 20-2 of the device controller 10 in the present invention, therefore, an access can be given to the channel adapter 20-1 from the host adapter 56-1 through a path 100-1, and at the same time, an access can be given to the channel adapter 20-2 from the host adapter 56-1 through a path 100-2. For the function of giving an access to the two channel adapters 20-1 and 20-2 through the host adapter 56-1, thus, a channel adapter management table 104 is provided in the processing distribution driver 52 on the open system host 16 side, and at the same time, a channel adapter management table 104-1 having the same contents is also provided in the device driver 54-1.

FIG. 26 is a diagram illustrating the channel adapter management tables 104 and 104-1 provided in the processing distribution driver 52 and the device driver 54-1 in FIGS. 25A and 25B. The channel adapter management tables 104 and 104-1 manage the degree of progress of two operations 1 and 2. Description will be given to a processing operation to be carried out when data for two processing are to be transferred to the two channel adapters 20-1 and 20-2 through the host adapter 56-1 shown in FIGS. 25A and 25B at the same time. The host application 50 of the open system host 16 outputs the operation 1 and the operation 2 as input/output requests for the device 18-1 to the processing distribution driver 52. As in the channel adapter management tables 104 and 104-1 shown in FIG. 26, the operation 1 is allocated to the channel adapter 20-1 and the operation 2 is allocated to the channel adapter 20-2. The operations 1 and 2 can be allocated freely to any of the channel adapters 20-1 to 20-4 through the device driver 54-1. In this case, they are allocated to the channel adapters 20-1 and 20-2. Subsequently, the processing distribution driver 52 repeats a processing of transferring data on the two operations 1 and 2 to the two channel adapters 20-1 and 20-2 through alternate paths 100-1 and 100-2 by time sharing at a transfer rate of 100 MB/s through a path 100 by the device driver 54-1 and the host adapter 56-1. As seen on the channel adapter 20-1 and 20-2 sides, therefore, the data are transferred from the host adapter 56-1 to the operation 1 and the operation 2 through the paths 100-1 and 100-2 at a transfer rate of 50 MB/s, respectively. At this time, the processing distribution driver 52 and the device driver 54-1 carry out a simultaneous transfer processing for the operations 1 and 2 while recognizing the degree of progress of the data transfer of the operation 1 to the channel adapter 20-1 and the degree of progress of the data transfer of the operation 2 to the channel adapter 20-2 with reference to the channel adapter management table shown in FIG. 26. While the two operations are divided into two parts in the host adapter 56-1 and data are transferred to the channel adapters 20-1 and 20-2 in the embodiment shown in FIGS. 25A and 25B, data transfer for one operation can also be divided into two parts. However, if one operation is divided into two parts to transfer data from the fiber channel and arbitrated loop 98, the technical problem of the fiber channel arises. Therefore, it is desirable that the two or more operations should be divided into operations units. In the embodiment shown in FIGS. 25A and 25B, moreover, the data transfer from the host adapter 56-1 is taken as an example. For the device drivers 54-2 to 54-4, similarly, it is possible to select two of the channel adapters 20-1 to 20-4 provided on the device controller 10 side and to simultaneously transfer two operations. Thus, even if the transfer rate on the host adapters 56-1 to 56-4 on the host side is higher than the transfer rate of the channel adapters 20-1 to 20-4 on the device controller 10 side, it is not led to the lower transfer rate but the data transfer to the device controller 10 can be carried out at the higher transfer rate of the host adapters 56-1 to 56-4.

Figure 27A:
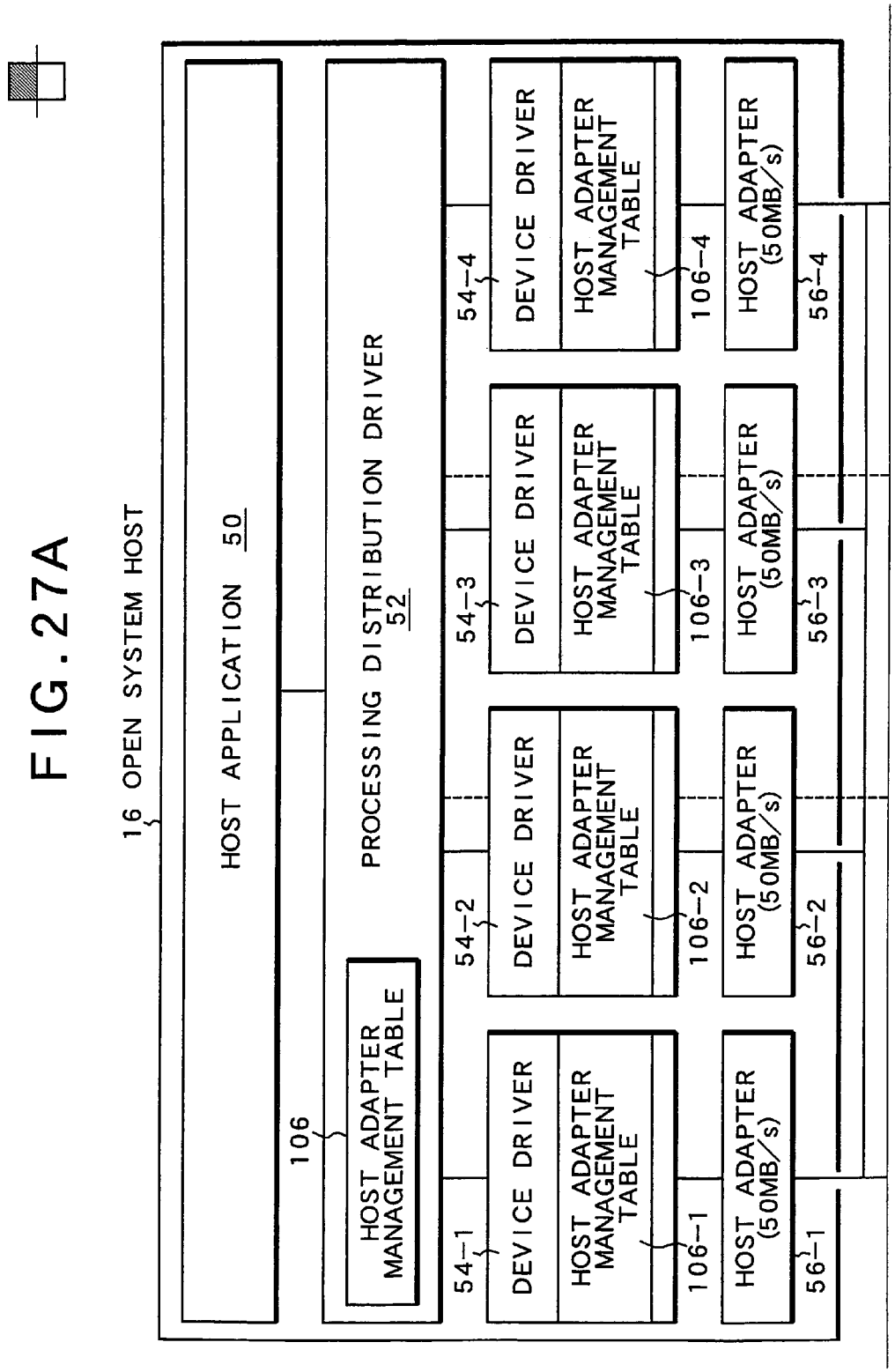

FIGS. 27A and 27B are block diagrams showing the input/output system according to the present invention in which a path transfer rate is optimized when the transfer rate on the host side is low and the transfer rate on the device controller side is high reversely to the embodiment of FIGS. 25A and 25B. In the present embodiment, the structures of the open system host 16 and the device controller 10 side are the same as those in FIGS. 25A and 25B and the transfer rates of the host adapters 56-1 to 56-4 on the host side are low, that is, 50 MB/s, while the transfer rates of the channel adapters 20-1 to 20-4 on the device controller 10 side are high, that is, 100 MB/s. Also in this case, the transfer rate is led to the lower transfer rate of 50 MB/s of the host adapter on the host side and is lowered in the data transfer through the 1 to 1 channel path in the host adapter and the channel adapter. In the present invention, therefore, an access can be given to the channel adapter 20-3 from the host adapter 56-2, and at the same time, an access can be given to the channel adapter 20-3 from the host adapter 56-3. The function of simultaneously giving an access to one channel adapter 20-3 from the two host adapters 56-2 and 56-3 through the paths 102-1 and 102-2 can be executed by the processing distribution driver 52 and the device drivers 54-2 and 54-3. For this reason, the processing distribution driver 52 is provided with a host adapter management table 106. Moreover, the device drivers 54-2 and 54-3 are also provided with host adapter management tables 106-2 and 106-3 having the same table contents. Consequently, the processing distribution driver 52 is constituted to carry out two or more processings, more specifically, two operations based on the host application 50 for the device drivers 54-2 and 54-3 at the same time.

FIG. 28 is a diagram illustrating the host adapter management tables 106, 106-2 and 106-3 in FIGS. 27A and 27B. The degree of progress of the operations 1 and 2 is managed on a table corresponding to the host adapters 56-2 and 56-3. When the input/output requests for the operations 1 and 2 are sent from the host application 50 at the same time, the processing distribution driver 52 refers to the host adapter management table 106 to send the input/output request for the operation 1 to the device driver 54-2 and to send the input/output request for the operation 2 to the device driver 54-3 at the same time, issues commands corresponding to the respective input/output requests, divides the commands into the paths 102-1 and 102 through the host adapters 56-2 and 56-3 and transfers and synthesizes the divided commands at a transfer rate of 50 MB/s respectively, and transmits the synthesized commands as a channel path 102 at a transfer rate of 100 MB/s to the channel adapter 20-3 of the device controller 10. The channel adapter 20-3 gives an access to the same device 18-2 for the data transfer of the operation 1 and the data transfer of the operation 2. Also in this case, if one operation is divided into two parts on the host side and the divided operations are transferred from the host adapters 56-2 and 56-3 to the channel adapter 20-3, a technical problem arises in the case in which the fiber channel and arbitrated loop 98 is used. Therefore, the two operations are distributed into the device drivers 54-2 and 54-3 through the processing distribution driver 52, and are transferred from the host adapters 56-2 and 56-3 to the same channel adapter 20-3, thereby maintaining a higher transfer rate of 100 MB/s on the channel adapter 20-3 side.

Figure 29B:
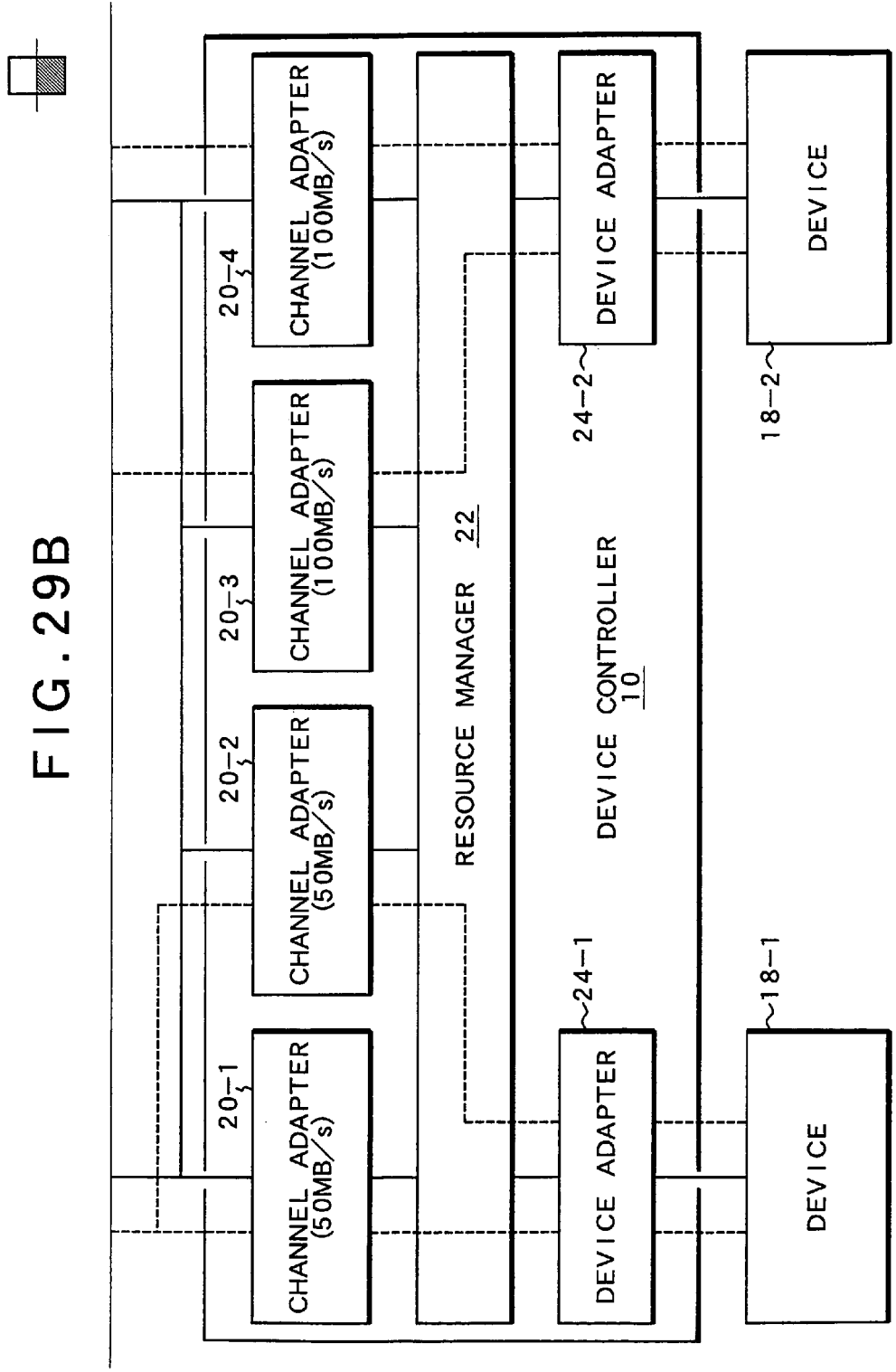

FIGS. 29A and 29B are block diagrams showing the input/output system according to the present invention in which the empty states of a host adapter on the host side and a channel adapter on the device controller side are managed to dynamically select a channel path. The open system host 16 and the device controller 10 are connected to each other through the fiber channel and arbitrated loop 98 in the same manner as in the embodiment shown in FIGS. 25A and 25B. The transfer rate of the host adapter 56-1 on the open system host 16 side is 100 MB/s and the transfer rates of the host adapters 56-2 and 56-3 are a half, that is, 50 MB/s. On the other hand, in the device controller 10, the transfer rates of the channel adapters 20-1 and 20-2 are 50 MB/s and the transfer rates of the channel adapters 20-3 and 20-4 are 100 MB/s. Between the host adapter 56-1 and the channel adapters 20-1 and 20-2, the two operations 1 and 2 according to the embodiment shown in FIGS. 25A and 25B are simultaneously transferred from the host side and channel transfer for a division into to the two channel adapters 20-1 and 20-2 is carried out on the device controller 10 side to maintain a high transfer rate of 100 MB/s in the host adapter 56-1. Between the host adapters 56-2 and 56-3 and the channel adapter 20-3, moreover, the two operations 1 and 2 having processings distributed on the host side according to the embodiment shown in FIGS. 34 and 35 are transferred to the host adapters 56-2 and 56-3 respectively, and are then synthesized into one path and are transferred to the channel adapter 20-3. Consequently, the operation of the channel adapter 20-3 having a high transfer rate of 100 MB/s is maintained. Furthermore, the host adapter 56-4 and the channel adapter 20-4 are set in an empty state. The use and empty states of the host adapters 56-1 to 56-4 in the open system host 16 and the channel adapters 20-1 to 20-4 in the device controller 10 are managed by a path management table 108 provided in the processing distribution driver 52.

FIG. 30 is a diagram illustrating the path management table 108 shown in FIGS. 29A and 29B. The path management table 108 is provided with a device driver management table 110 and a channel adapter management table 112. The situation of the use for each of the device drivers 54-1 to 54-4 is set to the device driver management table 110 and data on the input/output request of the operation are being transferred to the device drivers 54-1 to 54-3 and "used" is set thereto, and "empty" is set to the device driver 54-4. Referring to the channel adapter management table 112, similarly, the "used" is set to the situation of use of the channel adapters 20-1 to 20-3 and the "empty" is set to the channel adapter 20-4. Therefore, when receiving a new input/output request from the host application 50, the processing distribution driver 52 refers to the path management table 108 in FIG. 30 to recognize that the device driver 54-4 is empty based on the device driver management table 110 and to recognize that the channel adapter 20-4 is empty based on the channel adapter management table 112, finds the combination of the host adapter 56-4 and the channel adapter 20-4 in the empty state, and uses the host adapter 56-4 and channel adapter 20-4 thus found, thereby issuing a command from the device driver 54-4 to give an access to the device 18-2, for example. By thus managing the empty state of the paths on the host side and the device side through the processing distribution driver 52, the path to the device controller 10 can be selected flexibly and a resource can be utilized efficiently to enhance input/output performance.

FIGS. 31A and 31B are block diagrams showing the input/output system according to the present invention in which the number of cues is managed in addition to the empty state on the device controller side in FIGS. 29A and 29B to dynamically select a path. While a structure on the open system host 16 side is the same as that in the embodiment shown in FIGS. 29A and 29B, cue tables 28-1 to 28-4 are provided on the channel adapters 20-1 to 20-4 on the device controller 10 side respectively, and furthermore, an original cue table 32 is provided on the resource manager 22. Such a structure that the cue table is distributed and provided in the channel adapters 20-1 to 20-4 and the resource manager 22 is the same as that of the embodiment in FIGS. 1A and 1B. In the case in which the cue tables 28-1 to 28-4 are distributed and provided on the channel adapter 20-1 to 20-4 side, the number of cues in the cue tables 28-1 to 28-4 of the channel adapters 20-1 to 20-4 is set to the path management table 108 of the processing distribution driver 52.

FIG. 32 is a diagram illustrating the path management table 108 provided in the processing distribution driver 52 in FIGS. 31A and 31B. In the path management table 108, a device driver management table 110 is the same as the table in FIG. 39 and a channel adapter management table 114 sets the number of cues to be the number of unprocessed commands held in the respective cue tables 28-1 to 28-4 in addition to the situation of use. By thus setting the number of cues of the cue table to the channel adapter management table 114, when the processing distribution driver 52 receives a new input/output request, a channel adapter cannot be simply selected depending on the presence of vacancy if all the channel adapters 20-1 to 20-4 are set in the use state based on the set contents of the channel adapter management table 114 as shown in FIG. 32. In this case, the channel adapter 20-4 having the smallest number of cues is selected with reference to the number of cues, the combination with the device driver 54-4 in the empty state is found, and the combination of the device driver 54-4 and the channel adapter 20-4 is used to send an input/output request and to issue a command such that an access can be given to the device driver 54-4. Even if all the channel adapters 20-1 to 20-4 on the device controller 10 side are being used, thus, the processing distribution driver 52 processes to execute a command for a resource having the smallest number of cues, thereby efficiently utilizing the resource to enhance the input/output performance.

The present invention is not restricted to the above-mentioned embodiments and includes proper modifications which do not damage objects and advantages. Moreover, the present invention is not restricted to numeric values described in the embodiments.

INDUSTRIAL APPLICABILITY

According to the present invention, the channel adapter can also carry out cuing. Therefore, even if a plurality of input/output requests are received from a plurality of hosts at the same time, the input/output requests sent from the hosts are once stored in the channel adapter and some of them are transferred to the resource manager. Consequently, the number of inputs and outputs handled by the cue control of the resource manager can be reduced and overhead of the cue control to be carried out by the resource manager can be prevented from becoming a bottleneck in the device controller. Thus, processing performance can be enhanced.

According to the present invention, moreover, even if the sequential input/output requests of the hosts are separated by a distribution processing into a plurality of paths, the sequential input/output requests can be recognized on the device controller side and a countermeasure can be taken.

According to the present invention, furthermore, in the case in which the path from the open system host to the device controller is caused to be redundant, a command is issued to the standby system path to ascertain whether or not the standby system path can be normally operated during the normal operation in which the input/output request is issued to the operation system path. Even if a fault is generated on the standby system path, the fault can be confirmed. Therefore, a proper countermeasure such as repair can be taken. When a failure is generated on the operation system and the processing is converted into the standby system, the operation of the standby system can be guaranteed.

According to the present invention, moreover, even if the host application has already reserved a specific physical device through the operation system path when the standby system path is used due to the fault of the operation system path through the path switching driver in the host, the reserve state of the physical device through the existing operation system path can be released in response to a reserve release command sent from the standby system path to be a destination, and subsequently, the reserve state of the specific physical device can be rebuilt newly by the standby system path. Also in the case in which the processing distribution driver is provided in the host, the same processing is carried out.

According to the present invention, furthermore, in the case in which one path of the device driver of the operation system in the host causes a fault, the path of the device driver of the standby system is used to maintain the same number of paths as that before the fault is generated. Thus, an equivalent load balance can be implemented.

According to the present invention, moreover, it is possible to maintain a higher transfer rate even if a difference in a channel transfer rate is made between the host and the device controller.

What is claimed is:

1. A device controller to be operated in such an environment that an input/output request of an application provided in a host is distributed to a plurality of device drivers for taking a load balance through a processing distribution driver in the host and issuing the input/output request to which each of the device drivers is allocated, the device controller comprising:
   channel adapters, including:
      a detecting table storing information including a start address and a data length for each of the input/output requests received from the host; and
      a detecting unit calculating a start address of a sequential input/output request based on the information stored in the detecting table when a new input/output request is received and determining whether the new input/output request is a sequential input/output request by comparing the calculated start address with the start address of the new input/output request, wherein
   the detecting unit calculates, as the start address of the sequential input/output request, a plurality of start addresses having a value obtained by sequentially multiplying a data length by 1 to the number n of channel paths and adding a value thus obtained for a start address of an input/output request registered in the detecting table when the number of the channel paths with the host is n, and recognizes the sequential input/output request if it is decided that any of the start addresses is identical to the start address of the new input/output request.

2. A device controller to be operated in such an environment that an input/output request of an application provided in a host is distributed to a plurality of device drivers for taking a load balance through a processing distribution driver in the host and issuing the input/output request to which each of the device drivers is allocated, the device controller comprising:

channel adapters, including:

a detecting table storing information including a start address and a data length for each of the input/output requests received from the host; and a detecting unit calculating a start address of a sequential input/output request based on the information stored in the detecting table when a new input/output request is received and determining whether the new input/output request is a sequential input/output request by comparing the calculated start address with the start address of the new input/output request, wherein each of the channel adapters is provided with a plurality of detecting tables corresponding to each of the sequential input/output requests when a host application for giving a plurality of sequential input/output requests is operated at the same time in an environment of the host, and the detecting unit detects a sequential multiple operation by sequentially referring to each of the detecting tables.

3. The device controller according to claim 2, wherein the detecting unit stores a start address and a data length of a new input/output request in the detecting table when recognizing the new input/output request to be sequential by referring to any of the detecting tables.

4. The device controller according to claim 1 or 2, wherein each of channel adapters for receiving an input/output request issued from each device driver of the host is provided with the detecting unit, a common table for sequential detection for collectively storing a set of start addresses and data lengths for each of the input/output requests sent from the host is provided in a common area to which the channel adapters can refer, and presence of sequential of a new input/output request is recognized in the detecting unit of the channel adapter with reference to the common table for sequential detection.

5. The device controller according to claim 1 or 2 wherein the detecting unit calculates the start address by adding a data length to a start address of an input/output request registered in the detecting table as a start address of a sequential input/output request, and recognizes the input/output request to be a sequential input/output request if the start address is not decided to be identical to the start address of the new input/output request but has an approximation.

* * * * *

UNITED STATES PATENT AND TRADEMARK OFFICE
CERTIFICATE OF CORRECTION

PATENT NO. : 7,409,472 B2
APPLICATION NO. : 10/914335
DATED : August 5, 2008
INVENTOR(S) : Sawao Iwatani et al.

It is certified that error appears in the above-identified patent and that said Letters Patent is hereby corrected as shown below:

Column 36, Line 15, change "2" to --2,--.

Signed and Sealed this

Thirteenth Day of January, 2009

JON W. DUDAS
*Director of the United States Patent and Trademark Office*